US011667381B2

(12) United States Patent
Shimezawa et al.

(10) Patent No.: US 11,667,381 B2
(45) Date of Patent: Jun. 6, 2023

(54) CIRCUIT, TERMINAL DEVICE, BASE STATION DEVICE, AND METHOD

(71) Applicant: SONY CORPORATION, Tokyo (JP)

(72) Inventors: Kazuyuki Shimezawa, Kanagawa (JP); Hiromasa Uchiyama, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/083,817

(22) PCT Filed: Jul. 20, 2017

(86) PCT No.: PCT/JP2017/026198
§ 371 (c)(1),
(2) Date: Sep. 10, 2018

(87) PCT Pub. No.: WO2018/042927
PCT Pub. Date: Mar. 8, 2018

(65) Prior Publication Data
US 2019/0077508 A1  Mar. 14, 2019

(30) Foreign Application Priority Data
Sep. 2, 2016  (JP) .............................. JP2016-172196

(51) Int. Cl.
*B64C 39/02* (2023.01)
*H04W 24/10* (2009.01)
(Continued)

(52) U.S. Cl.
CPC ............ *B64C 39/024* (2013.01); *B64D 45/00* (2013.01); *B64F 1/00* (2013.01); *G05D 1/0011* (2013.01);
(Continued)

(58) Field of Classification Search
CPC ................ H04B 1/3822; H04B 7/0617; H04B 7/18506; H04W 24/08; H04W 24/10;
(Continued)

(56) References Cited

U.S. PATENT DOCUMENTS 9,467,922 B1 * 10/2016 Buchmueller ..... H04B 7/18506
9,537,561 B1 *  1/2017 Kotecha .................. H04W 8/00
(Continued)

FOREIGN PATENT DOCUMENTS

CN    104581783 A  *  4/2015
EP      3029996 A1  *  6/2016
(Continued)

OTHER PUBLICATIONS

Dimou, Konstantinos et al., "Handover within 3GPP LTE: design principles and performance", published in: 2009 IEEE 70th Vehicular Technology Conference Fall, Date of Conference: Sep. 20-23, 2009, 5 pages (Year: 2009).*

(Continued)

*Primary Examiner* — David A Testardi
(74) *Attorney, Agent, or Firm* — Oblon, McClelland, Maier & Neustadt, L.L.P.

(57) ABSTRACT

A circuit includes an acquisition unit configured to acquire information regarding a flight and a measurement report control unit configured to control a measurement report process on a reference signal transmitted from a base station device, on a basis of the information regarding the flight acquired by the acquisition unit.

16 Claims, 25 Drawing Sheets

(51) Int. Cl.
| | |
|---|---|
| *H04B 7/185* | (2006.01) |
| *H04B 17/382* | (2015.01) |
| *H04B 17/391* | (2015.01) |
| *H04B 17/24* | (2015.01) |
| *B64F 1/00* | (2006.01) |
| *B64D 45/00* | (2006.01) |
| *H04B 7/06* | (2006.01) |
| *G05D 1/00* | (2006.01) |

(52) U.S. Cl.
CPC ......... *G05D 1/0022* (2013.01); *H04B 7/0617* (2013.01); *H04B 7/18506* (2013.01); *H04B 7/18508* (2013.01); *H04B 7/18519* (2013.01); *H04B 17/24* (2015.01); *H04B 17/382* (2015.01); *H04B 17/391* (2015.01); *H04W 24/10* (2013.01); *B64C 2201/122* (2013.01)

(58) Field of Classification Search
CPC ............. H04W 36/0083; H04W 36/30; H04W 36/305; H04W 36/32; H04W 52/241; H04W 52/245; H04W 16/28; B64C 39/024; B64C 2201/146; G05D 1/0022; G08G 5/0069
See application file for complete search history.

(56) References Cited

U.S. PATENT DOCUMENTS

| | | | | |
|---|---|---|---|---|
| 2004/0185853 | A1* | 9/2004 | Kim | H04W 36/0083 455/438 |
| 2008/0207195 | A1* | 8/2008 | Ranta | H04W 24/10 455/423 |
| 2013/0242773 | A1* | 9/2013 | Wernersson | H04B 7/024 370/252 |
| 2014/0066068 | A1* | 3/2014 | Suzuki | H04W 36/245 455/436 |
| 2014/0172193 | A1* | 6/2014 | Levien | G08G 5/0082 701/2 |
| 2014/0172194 | A1* | 6/2014 | Levien | G08G 5/0069 701/2 |
| 2014/0187171 | A1* | 7/2014 | Xiao | H04B 7/0469 455/67.11 |
| 2014/0266896 | A1* | 9/2014 | Hyslop | H04B 7/18506 342/368 |
| 2015/0236779 | A1* | 8/2015 | Jalali | H04B 7/18508 342/367 |
| 2015/0282246 | A1* | 10/2015 | Teyeb | H04W 36/0072 370/312 |
| 2015/0358884 | A1* | 12/2015 | Nagasaka | H04W 48/18 370/230 |
| 2016/0029295 | A1* | 1/2016 | Nagasaka | H04W 48/18 370/237 |
| 2016/0047884 | A1* | 2/2016 | Zhang | H04B 7/0617 342/458 |
| 2016/0088498 | A1* | 3/2016 | Sharawi | G01R 29/10 370/241 |
| 2016/0112116 | A1* | 4/2016 | Jalali | H04W 24/10 370/252 |
| 2016/0134358 | A1* | 5/2016 | Jalali | H04B 7/18504 455/11.1 |
| 2016/0219560 | A1* | 7/2016 | Chen | H04W 72/0446 |
| 2016/0300493 | A1* | 10/2016 | Ubhi | H04B 7/18504 |
| 2016/0316374 | A1* | 10/2016 | Xu | H04W 16/14 |
| 2016/0328980 | A1* | 11/2016 | Sharma | G08G 5/0013 |
| 2016/0330771 | A1* | 11/2016 | Tan | H04W 16/14 |
| 2016/0337027 | A1* | 11/2016 | Jalali | H04B 7/18504 |
| 2016/0374080 | A1* | 12/2016 | Wei | H04L 5/0064 |
| 2017/0012697 | A1* | 1/2017 | Gong | B64C 39/024 |
| 2017/0094566 | A1* | 3/2017 | Yang | H04W 36/0061 |
| 2017/0123420 | A1* | 5/2017 | Shi | B64D 27/24 |
| 2017/0126309 | A1* | 5/2017 | Rupasinghe | H04B 7/024 |
| 2017/0127332 | A1* | 5/2017 | Axmon | H04W 36/0061 |
| 2017/0150373 | A1* | 5/2017 | Brennan | H04W 16/28 |
| 2017/0155456 | A1* | 6/2017 | Wennerlof | H04B 17/12 |
| 2017/0168480 | A1* | 6/2017 | Wanstedt | G07C 5/008 |
| 2017/0188252 | A1* | 6/2017 | Miao | H04W 24/10 |
| 2017/0295069 | A1* | 10/2017 | Sweet, III | B64C 39/024 |
| 2017/0352941 | A1* | 12/2017 | Peitzer | H01Q 1/1257 |
| 2017/0374587 | A1* | 12/2017 | Liu | H04L 5/0048 |
| 2018/0005535 | A1* | 1/2018 | Kalathil | B64C 39/024 |
| 2018/0017973 | A1* | 1/2018 | Teague | G08G 5/0069 |
| 2018/0019516 | A1* | 1/2018 | Teague | H04B 7/18504 |
| 2018/0076940 | A1* | 3/2018 | Zhou | H04W 16/28 |
| 2018/0302828 | A1* | 10/2018 | Fan | H04B 7/18504 |
| 2018/0376394 | A1* | 12/2018 | Hahn | H04W 72/12 |
| 2019/0025828 | A1* | 1/2019 | Kuhara | B60L 58/12 |
| 2019/0053135 | A1* | 2/2019 | Hahn | H04W 48/16 |
| 2019/0230569 | A1* | 7/2019 | Kim | H04W 36/30 |
| 2019/0306768 | A1* | 10/2019 | Kim | H04B 17/327 |
| 2020/0413267 | A1* | 12/2020 | Xue | H04W 24/02 |
| 2022/0256380 | A1* | 8/2022 | Futaki | H04W 24/10 |
| 2022/0260991 | A1* | 8/2022 | Yui | G06F 3/0488 |

FOREIGN PATENT DOCUMENTS

| | | |
|---|---|---|
| JP | 2006-74536 A | 3/2006 |
| JP | 2011-238990 A | 11/2011 |
| JP | 2016-58929 A | 4/2016 |
| JP | 2016-92450 A | 5/2016 |
| WO | WO 2013/129563 A1 | 9/2013 |

OTHER PUBLICATIONS

Davaasambuu, Battulga et al., "Self-Optimization of Handover Parameters for Long-Term Evolution with Dual Wireless Mobile Relay Nodes", Future Internet 2015, 7, Jun. 11, 2015, pp. 196-213 (Year: 2015).*

U.S. Appl. No. 62/359,169, filed Jul. 6, 2016, 118 pages (Year: 2016).*

Kim, Sang Gook et al., "Method to support efficient handover in cellular-based drone communications", 3GPP TSG-RAN WG2 Meeting #75, Last revised Jun. 29, 2016, effectively filed Jul. 6, 2016 as part of U.S. Appl. No. 62/359,169, pp. 97 to 102 (Year: 2016).*

Schulz, Bernhard, "LTE Transmission Modes and Beamforming", White Paper dated Jul. 2015, Rohde & Schwarz, 25 pages (Year: 2015).*

U.S. Appl. No. 62/362,844, filed Jul. 15, 2016 (60 pages) (Year: 2016).*

Sawahashi, Mamoru et al., "Coordinated multipoint transmission/reception techniques for LTE-advanced", IEEE Wireless Communications, Jun. 2010, pp. 26-34 (Year: 2010).*

Irmer, Ralf et al., "Coordinated multipoint: concepts, performance, and field trial results", IEEE Communications Magazine, Feb. 2011, pp. 102-111. (Year: 2011).*

Lee, Juho et al., "Coordinated multipoint transmission and reception in LTE-advanced systems", IEEE Communications Magazine, Nov. 2012, pp. 44-50. (Year: 2012).*

3GPP Technical Report, "3GPP TR 36.819", v11.2.0 (Sep. 2013), Sep. 2013, 70 pages (Year: 2013).*

Extended European Search Report dated Apr. 29, 2019 in European Patent Application No. 17845937.6, 8 pages.

* cited by examiner

FIG. 5

| | SUB CARRIER INTERVAL | NUMBER OF SUB CARRIERS PER RESOURCE BLOCK IN NR CELL | NUMBER OF SYMBOLS PER SUB FRAME | CP LENGTH TYPE |
|---|---|---|---|---|
| PARAMETER SET 0 | 15 kHz | 12 | 14 | TYPE 1 |
| PARAMETER SET 1 | 7.5 kHz | 24 | 7 | TYPE 1 |
| PARAMETER SET 2 | 30 kHz | 6 | 28 | TYPE 1 |
| PARAMETER SET 3 | 15 kHz | 12 | 12 | TYPE 2 |
| ... | ... | ... | ... | ... |

CIRCUIT, TERMINAL DEVICE, BASE STATION DEVICE, AND METHOD

TECHNICAL FIELD

The present disclosure relates to a circuit, a terminal device, a base station device, and a method.

BACKGROUND ART

In recent years, research and development related to drones have been carried out and are attracting interest. Drones are small unmanned aircraft also known as unmanned aerial vehicles (UAVs). According to the economic reports published by the US Association for Unmanned Vehicle Systems International, the market size of drones was about 82 billion dollars in 2025 only in the US, and 1 hundred thousand new jobs are estimated to be created. Drones can provide products and information using air space which has not been used for any means on land, sea, or air. Therefore, drones are also called the industrial revolution of the air and are considered to be important business areas in the future.

In general, drones are assumed to fly while performing wireless communication. Therefore, it is preferable to develop technologies enabling drones to perform stable wireless communication. With regard to wireless communication used by devices of which positions can be changed, many technologies have been developed so far. For example, Patent Literature 1 below discloses a technology for reducing a load of a communication network by collecting measurement results of speeds of wireless communication in accordance with positions of terminal devices. Further, Patent Literature 2 below discloses a technology for constructing a network in accordance with a disposition position of each sensor included in a sensor network.

CITATION LIST

Patent Literature

Patent Literature 1: JP 2016-92450A
Patent Literature 2: JP 2006-74536A

DISCLOSURE OF INVENTION

Technical Problem

However, wireless communication systems proposed in the foregoing patent literatures or the like are not designed on the assumption of devices such as drones which can fly freely in 3-dimensional space.

Accordingly, the present disclosure provides a structure of wireless communication for a device which can fly freely in 3-dimensional space.

Solution to Problem

According to the present disclosure, there is provided a circuit including: an acquisition unit configured to acquire information regarding a flight; and a measurement report control unit configured to control a measurement report process on a reference signal transmitted from a base station device, on a basis of the information regarding the flight acquired by the acquisition unit.

In addition, according to the present disclosure, there is provided a terminal device including: an acquisition unit configured to acquire information regarding a flight; and a measurement report control unit configured to control a measurement report process on a reference signal transmitted from a base station device, on a basis of the information regarding the flight acquired by the acquisition unit.

In addition, according to the present disclosure, there is provided a base station device including: a reference signal transmitting unit configured to transmit a reference signal; and a control unit configured to acquire information regarding a flight and control a process based on measurement information reported from a terminal device that performs a measurement report process on the reference signal on a basis of the acquired information regarding the flight.

In addition, according to the present disclosure, there is provided a method including: acquiring information regarding a flight; and controlling, by a processor, a measurement report process on a reference signal transmitted from a base station device, on a basis of the acquired information regarding the flight.

In addition, according to the present disclosure, there is provided a method including: transmitting a reference signal; and acquiring information regarding a flight and controlling a process based on measurement information reported from a terminal device that performs a measurement report process on the reference signal on a basis of the acquired information regarding the flight, by a processor.

Advantageous Effects of Invention

According to the present disclosure, as described above, it is possible to provide a structure of wireless communication for a device which can fly freely in 3-dimensional space. Note that the effects described above are not necessarily limitative. With or in the place of the above effects, there may be achieved any one of the effects described in this specification or other effects that may be grasped from this specification.

BRIEF DESCRIPTION OF DRAWINGS

FIG. 5 is a diagram illustrating examples of parameter sets related to a transmission signal in an NR cell.

DISCLOSURE OF INVENTION

Figure 1:
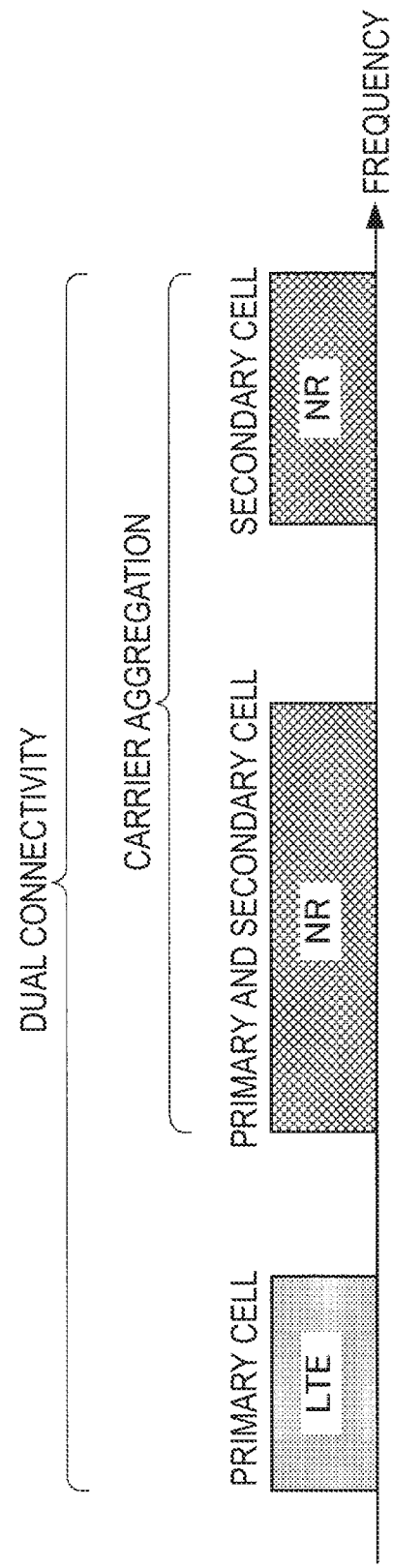
FIG. 1 is a diagram illustrating an example of setting of a component carrier according to a present embodiment.

Hereinafter, (a) preferred embodiment(s) of the present disclosure will be described in detail with reference to the appended drawings. Note that, in this specification and the appended drawings, structural elements that have substantially the same function and structure are denoted with the same reference numerals, and repeated explanation of these structural elements is omitted.

Further, in the present specification and the drawings, different letters are suffixed to the same reference numerals to distinguish elements which have substantially the same functional configuration. For example, a plurality of elements which have substantially the same functional configuration are distinguished such as base station devices 1A, 1B, and 1C, as necessary. Here, in a case in which it is not necessary to particularly distinguish a plurality of elements which have substantially the same functional configuration, only the same reference numeral is given. For example, in a case in which it is not necessary to particularly distinguish base station devices 1A, 1B, and 1C, the base station devices 1A, 1B, and 1C are simply referred to as the base station devices 1.

Note that the description will be made in the following order.
1. Introduction
2. Drone
2.1. Use cases
2.2. Wireless communication
2.3. Technical problem
3. Configuration example
3.1. Configuration example of system
3.2. Detailed configuration example of each device
4. Technical features
4.1. Overview
4.2. Flight-related information
4.3. First embodiment
4.4. Second embodiment
4.5. Supplement
5. Application examples
6. Conclusion

1. INTRODUCTION

<NR>

Wireless access schemes and wireless networks of cellular mobile communication (hereinafter also referred to as Long Term Evolution (LTE), LTE-Advanced (LTE-A), LTE-Advanced Pro (LTE-A Pro), New Radio (NR), New Radio Access Technology (NRAT), Evolved Universal Terrestrial Radio Access (EUTRA), or Further EUTRA (FEUTRA)) are under review in 3rd Generation Partnership Project (3GPP). Further, in the following description, LTE includes LTE-A, LTE-A Pro, and EUTRA, and NR includes NRAT and FEUTRA. In LTE and NR, a base station device (base station) is also referred to as an evolved Node B (eNodeB), and a terminal device (a mobile station, a mobile station device, or a terminal) is also referred to as a user equipment (UE). Note that a different name from the eNodeB may be used for the base station device in NR. For example, the base station device can also be referred to as a gNodeB. LTE and NR are cellular communication systems in which a plurality of areas covered by a base station device are arranged in a cell form. A single base station device may manage a plurality of cells.

NR is a different Radio Access Technology (RAT) from LTE as a wireless access scheme of the next generation of LTE. NR is an access technology capable of handling various use cases including Enhanced Mobile broadband (eMBB), Massive Machine Type Communications (mMTC), and ultra reliable and Low Latency Communications (URLLC). NR is reviewed for the purpose of a technology framework corresponding to use scenarios, request conditions, placement scenarios, and the like in such use cases. The details of the scenarios or request conditions of NR are disclosed in "3rd Generation Partnership Project; Technical Specification Group Radio Access Network; Study on Scenarios and Requirements for Next Generation Access Technologies; (Release 14), 3GPP TR 38.913 V0.2.0 (2016-02) http://www.3gpp.org/ftp//Specs/archive/38_series/38.913/38913-020.zip".

In LTE and NR, a predetermined time interval can be specified as a unit of a time at which data transmission is performed. The time interval is referred to as a transmission time interval (TTI). A base station device and a terminal device transmit and receive a physical channel and/or a physical signal on the basis of the TTI. For example, the details of the TTI in LTE is disclosed in "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 13), 3GPP TS 36.300 V13. 3.0. http://www.3gpp.org/ftp/Specs/archive/36_series/36. 300/36300-d30.zip."

Further, the TTI is used as a unit in which an order of data transmission is specified. For example, in the order of the data transmission, a hybrid automatic repeat request-acknowledgement (HARQ-ACK) report indicating whether received data is correctly received is transmitted after data is received and a time specified as an integer multiple of the TTI elapses. In this case, a time taken to transmit data (delay or latency) is decided depending on the TTI. In particular, since a request condition of the latency is different in accordance with a use case, the TTI is preferably changed in accordance with the use case. The order of the data transmission is disclosed in "3rd Generation Partnership Project; Technical Specification Group Radio Access Network; Evolved Universal Terrestrial Radio Access (E-UTRA); Physical layer procedures (Release 13), 3GPP TS 36.213 V13. 1.1. http://www.3 gpp.org/ftp/Specs/archive/36_series/36. 213/36213-d11.zip."

Technologies, functions, methods, configurations, and procedures to be described below and all other descriptions can be applied to LTE and NR unless particularly stated otherwise.

<Wireless Communication System in the Present Embodiment>

In the present embodiment, a wireless communication system includes at least a base station device 1 and a terminal device 2. The base station device 1 can accommodate multiple terminal devices. The base station device 1 can be connected with another base station device by means of an X2 interface. Further, the base station device 1 can be connected to an evolved packet core (EPC) by means of an S1 interface. Further, the base station device 1 can be connected to a mobility management entity (MME) by means of an S1-MME interface and can be connected to a serving gateway (S-GW) by means of an S1-U interface. The S1 interface supports many-to-many connection between the MME and/or the S-GW and the base station device 1. Further, in the present embodiment, the base station device 1 and the terminal device 2 each support LTE and/or NR.

<Wireless Access Technology According to Present Embodiment>

In the present embodiment, the base station device 1 and the terminal device 2 each support one or more wireless access technologies (RATs). For example, an RAT includes LTE and NR. A single RAT corresponds to a single cell (component carrier). That is, in a case in which a plurality of RATs are supported, the RATs each correspond to different cells. In the present embodiment, a cell is a combination of a downlink resource, an uplink resource, and/or a sidelink. Further, in the following description, a cell corresponding to LTE is referred to as an LTE cell and a cell corresponding to NR is referred to as an NR cell. Further, LTE is referred to as a first RAT and NR is referred to as a second RAT.

Downlink communication is communication from the base station device 1 to the terminal device 2. Uplink communication is communication from the terminal device 2 to the base station device 1. Sidelink communication is communication from the terminal device 2 to another terminal device 2.

The sidelink communication is defined for contiguous direct detection and contiguous direct communication between terminal devices. The sidelink communication, a frame configuration similar to that of the uplink and downlink can be used. Further, the sidelink communication can be restricted to some (sub sets) of uplink resources and/or downlink resources.

The base station device 1 and the terminal device 2 can support communication in which a set of one or more cells is used in a downlink, an uplink, and/or a sidelink. A set of a plurality of cells is also referred to as carrier aggregation or dual connectivity. The details of the carrier aggregation and the dual connectivity will be described below. Further, each cell uses a predetermined frequency bandwidth. A maximum value, a minimum value, and a settable value in the predetermined frequency bandwidth can be specified in advance.

FIG. 1 is a diagram illustrating an example of setting of a component carrier according to the present embodiment. In the example of FIG. 1, one LTE cell and two NR cells are set. One LTE cell is set as a primary cell. Two NR cells are set as a primary and secondary cell and a secondary cell. Two NR cells are integrated by the carrier aggregation. Further, the LTE cell and the NR cell are integrated by the dual connectivity. Note that the LTE cell and the NR cell may be integrated by carrier aggregation. In the example of FIG. 1, NR may not support some functions such as a function of performing standalone communication since connection can be assisted by an LTE cell which is a primary cell. The function of performing standalone communication includes a function necessary for initial connection.

Figure 2:
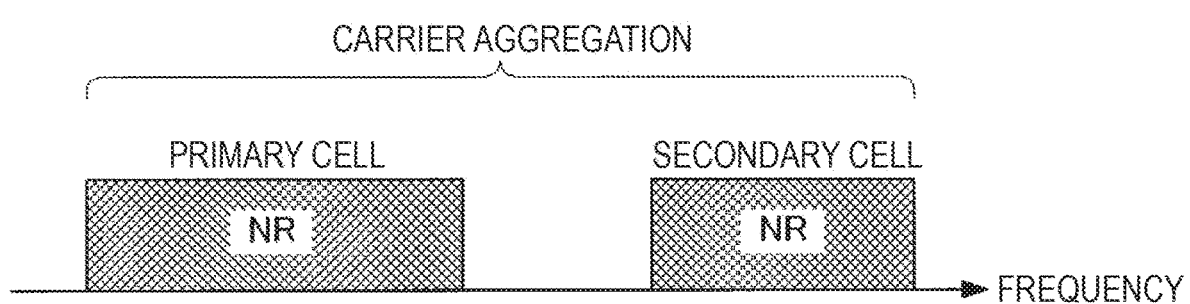
FIG. 2 is a diagram illustrating an example of setting of a component carrier according to a present embodiment.

FIG. 2 is a diagram illustrating an example of setting of a component carrier according to the present embodiment. In the example of FIG. 2, two NR cells are set. The two NR cells are set as a primary cell and a secondary cell, respectively, and are integrated by carrier aggregation. In this case, when the NR cell supports the function of performing standalone communication, assist of the LTE cell is not necessary. Note that the two NR cells may be integrated by dual connectivity.

<Radio Frame Configuration in Present Embodiment>

In the present embodiment, a radio frame configured with 10 ms (milliseconds) is specified. Each radio frame includes two half frames. A time interval of the half frame is 5 ms. Each half frame includes 5 sub frames. The time interval of the sub frame is 1 ms and is defined by two successive slots. The time interval of the slot is 0.5 ms. An i-th sub frame in the radio frame includes a (2×i)-th slot and a (2×i+1)-th slot. In other words, 10 sub frames are specified in each of the radio frames.

Sub frames include a downlink sub frame, an uplink sub frame, a special sub frame, a sidelink sub frame, and the like.

The downlink sub frame is a sub frame reserved for downlink transmission. The uplink sub frame is a sub frame reserved for uplink transmission. The special sub frame includes three fields. The three fields are a Downlink Pilot Time Slot (DwPTS), a Guard Period (GP), and an Uplink Pilot Time Slot (UpPTS). A total length of DwPTS, GP, and UpPTS is 1 ms. The DwPTS is a field reserved for downlink transmission. The UpPTS is a field reserved for uplink transmission. The GP is a field in which downlink transmission and uplink transmission are not performed. Further, the special sub frame may include only the DwPTS and the GP or may include only the GP and the UpPTS. The special sub frame is placed between the downlink sub frame and the uplink sub frame in TDD and used to perform switching from the downlink sub frame to the uplink sub frame. The sidelink sub frame is a sub frame reserved or set for sidelink communication. The sidelink is used for contiguous direct communication and contiguous direct detection between terminal devices.

A single radio frame includes a downlink sub frame, an uplink sub frame, a special sub frame, and/or a sidelink sub frame. Further, a single radio frame includes only a downlink sub frame, an uplink sub frame, a special sub frame, or a sidelink sub frame.

A plurality of radio frame configurations are supported. The radio frame configuration is specified by the frame configuration type. The frame configuration type 1 can be applied only to FDD. The frame configuration type 2 can be applied only to TDD. The frame configuration type 3 can be applied only to an operation of a licensed assisted access (LAA) secondary cell.

In the frame configuration type 2, a plurality of uplink-downlink configurations are specified. In the uplink-downlink configuration, each of 10 sub frames in one radio frame corresponds to one of the downlink sub frame, the uplink sub frame, and the special sub frame. The sub frame 0, the sub frame 5 and the DwPTS are constantly reserved for downlink transmission. The UpPTS and the sub frame just after the special sub frame are constantly reserved for uplink transmission.

In the frame configuration type 3, 10 sub frames in one radio frame are reserved for downlink transmission. The terminal device 2 treats each sub frame as an empty sub frame. Unless a predetermined signal, channel and/or downlink transmission is detected in a certain sub frame, the terminal device 2 assumes that there is no signal and/or channel in the sub frame. The downlink transmission is exclusively occupied by one or more consecutive sub frames. The first sub frame of the downlink transmission may be started from any one in that sub frame. The last sub frame of the downlink transmission may be either completely exclusively occupied or exclusively occupied by a time interval specified in the DwPTS.

Further, in the frame configuration type 3, 10 sub frames in one radio frame may be reserved for uplink transmission. Further, each of 10 sub frames in one radio frame may correspond to any one of the downlink sub frame, the uplink sub frame, the special sub frame, and the sidelink sub frame.

The base station device 1 may transmit a physical downlink channel and a physical downlink signal in the DwPTS of the special sub frame. The base station device 1 can restrict transmission of the PBCH in the DwPTS of the special sub frame. The terminal device 2 may transmit physical uplink channels and physical uplink signals in the UpPTS of the special sub frame. The terminal device 2 can restrict transmission of some of the physical uplink channels and the physical uplink signals in the UpPTS of the special sub frame.

<Frame Configuration of LTE in Present Embodiment>

Figure 3:
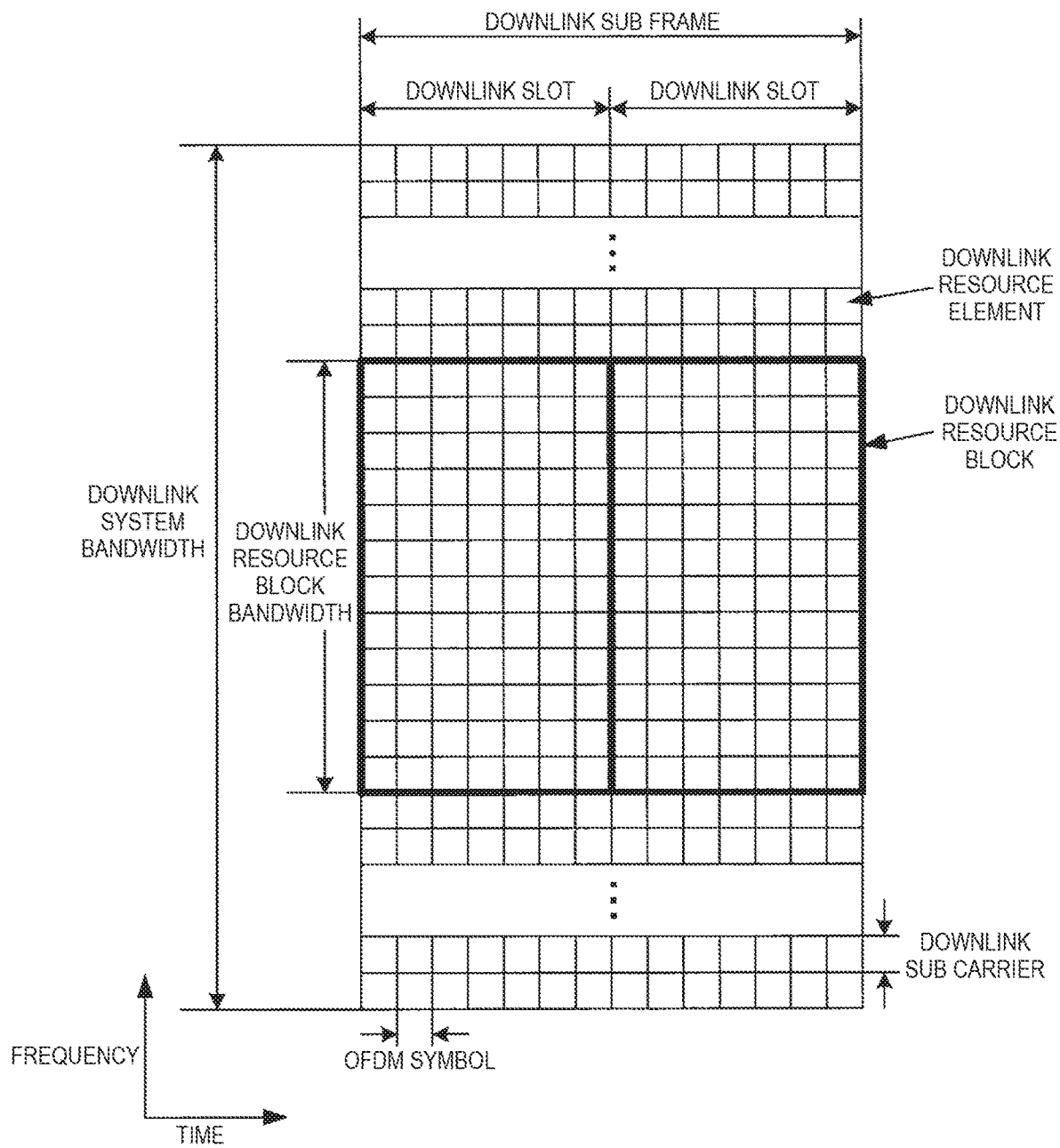
FIG. 3 is a diagram illustrating an example of a downlink sub frame of LTE according to the present embodiment.

FIG. 3 is a diagram illustrating an example of a downlink sub frame of LTE according to the present embodiment. The diagram illustrated in FIG. 3 is referred to as a downlink resource grid of LTE. The base station device 1 can transmit a physical downlink channel of LTE and/or a physical downlink signal of LTE in a downlink sub frame to the terminal device 2. The terminal device 2 can receive a physical downlink channel of LTE and/or a physical downlink signal of LTE in a downlink sub frame from the base station device 1.

Figure 4:
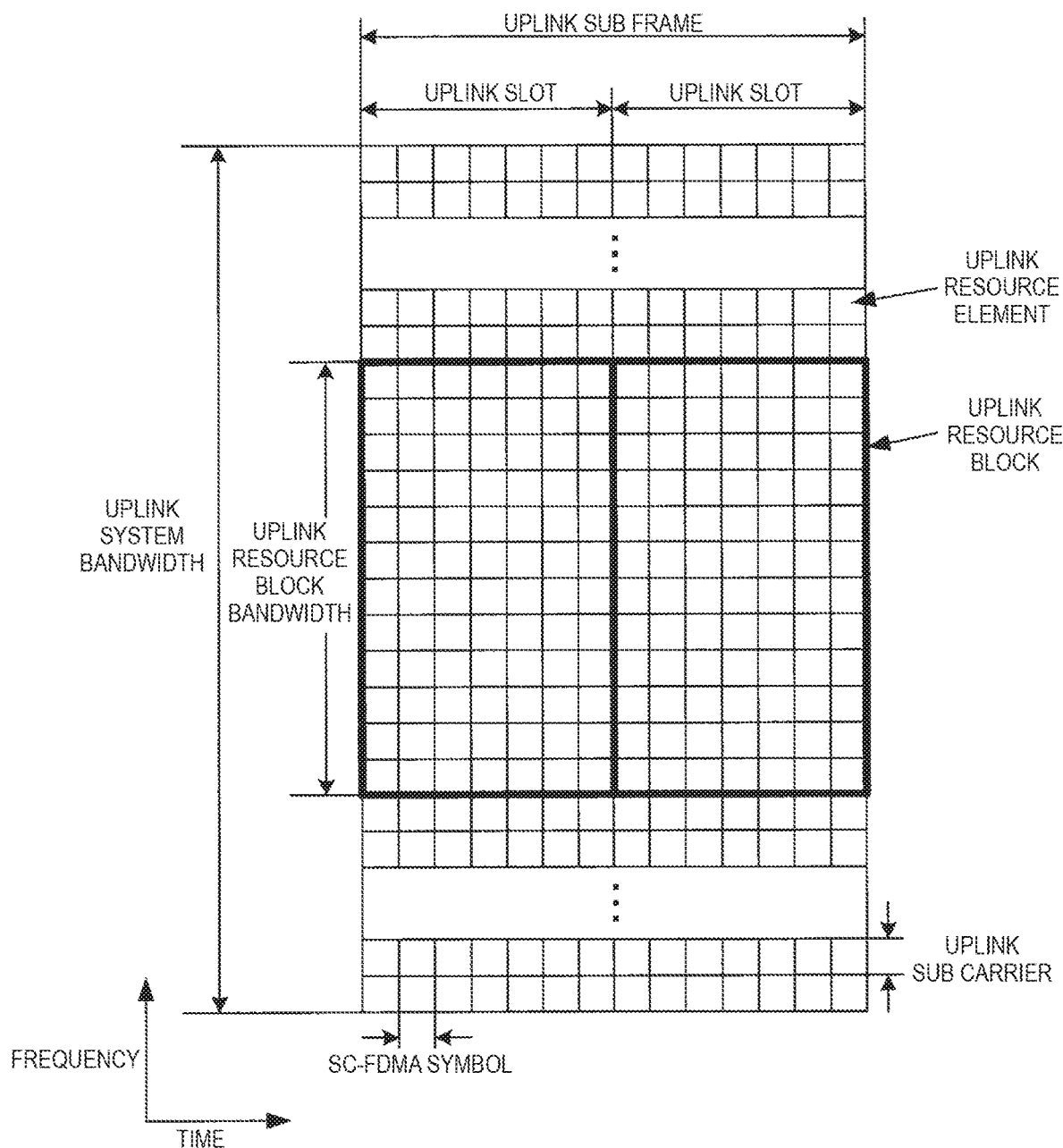
FIG. 4 is a diagram illustrating an example of an uplink sub frame of LTE according to the present embodiment.

FIG. 4 is a diagram illustrating an example of an uplink sub frame of LTE according to the present embodiment. The diagram illustrated in FIG. 4 is referred to as an uplink resource grid of LTE. The terminal device 2 can transmit a physical uplink channel of LTE and/or a physical uplink signal of LTE in an uplink sub frame to the base station device 1. The base station device 1 can receive a physical uplink channel of LTE and/or a physical uplink signal of LTE in an uplink sub frame from the terminal device 2.

In the present embodiment, the LTE physical resources can be defined as follows. One slot is defined by a plurality of symbols. The physical signal or the physical channel transmitted in each of the slots is represented by a resource grid. In the downlink, the resource grid is defined by a plurality of sub carriers in a frequency direction and a plurality of OFDM symbols in a time direction. In the uplink, the resource grid is defined by a plurality of sub carriers in the frequency direction and a plurality of SC-FDMA symbols in the time direction. The number of sub carriers or the number of resource blocks may be decided depending on a bandwidth of a cell. The number of symbols in one slot is decided by a type of cyclic prefix (CP). The type of CP is a normal CP or an extended CP. In the normal CP, the number of OFDM symbols or SC-FDMA symbols constituting one slot is 7. In the extended CP, the number of OFDM symbols or SC-FDMA symbols constituting one slot is 6. Each element in the resource grid is referred to as a resource element. The resource element is identified using an index (number) of a sub carrier and an index (number) of a symbol. Further, in the description of the present embodiment, the OFDM symbol or SC-FDMA symbol is also referred to simply as a symbol.

The resource blocks are used for mapping a certain physical channel (the PDSCH, the PUSCH, or the like) to resource elements. The resource blocks include virtual resource blocks and physical resource blocks. A certain physical channel is mapped to a virtual resource block. The virtual resource blocks are mapped to physical resource blocks. One physical resource block is defined by a predetermined number of consecutive symbols in the time domain. One physical resource block is defined from a predetermined number of consecutive sub carriers in the frequency domain. The number of symbols and the number of sub carriers in one physical resource block are decided on the basis of a parameter set in accordance with a type of CP, a sub carrier interval, and/or a higher layer in the cell. For example, in a case in which the type of CP is the normal CP, and the sub carrier interval is 15 kHz, the number of symbols in one physical resource block is 7, and the number of sub carriers is 12. In this case, one physical resource block includes (7×12) resource elements. The physical resource blocks are numbered from 0 in the frequency domain. Further, two resource blocks in one sub frame corresponding to the same physical resource block number are defined as a physical resource block pair (a PRB pair or an RB pair).

In each LTE cell, one predetermined parameter is used in a certain sub frame. For example, the predetermined parameter is a parameter related to a transmission signal. Parameters related to the transmission signal include a CP length, a sub carrier interval, the number of symbols in one sub frame (predetermined time length), the number of sub carriers in one resource block (predetermined frequency band), a multiple access scheme, a signal waveform, and the like.

That is, In the LTE cell, a downlink signal and an uplink signal are each generated using one predetermined parameter in a predetermined time length (for example, a sub frame). In other words, in the terminal device 2, it is assumed that a downlink signal to be transmitted from the base station device 1 and an uplink signal to be transmitted to the base station device 1 are each generated with a predetermined time length with one predetermined parameter. Further, the base station device 1 is set such that a downlink signal to be transmitted to the terminal device 2 and an uplink signal to be transmitted from the terminal device 2 are each generated with a predetermined time length with one predetermined parameter.

<Frame Configuration of NR in Present Embodiment>

In each NR cell, one or more predetermined parameters are used in a certain predetermined time length (for example, a sub frame). That is, in the NR cell, a downlink signal and an uplink signal are each generated using or more predetermined parameters in a predetermined time length. In other words, in the terminal device 2, it is assumed that a downlink signal to be transmitted from the base station device 1 and an uplink signal to be transmitted to the base station device 1 are each generated with one or more predetermined parameters in a predetermined time length. Further, the base station device 1 is set such that a downlink signal to be transmitted to the terminal device 2 and an uplink signal to be transmitted from the terminal device 2 are each generated with a predetermined time length using one or more predetermined parameters. In a case in which the plurality of predetermined parameters are used, a signal generated using the predetermined parameters is multiplexed in accordance with a predetermined method. For example, the predetermined method includes Frequency Division Multiplexing (FDM), Time Division Multiplexing (TDM), Code Division Multiplexing (CDM), and/or Spatial Division Multiplexing (SDM).

In a combination of the predetermined parameters set in the NR cell, a plurality of kinds of parameter sets can be specified in advance.

FIG. 5 is a diagram illustrating examples of the parameter sets related to a transmission signal in the NR cell. In the example of FIG. 5, parameters of the transmission signal included in the parameter sets include a sub carrier interval, the number of sub carriers per resource block in the NR cell, the number of symbols per sub frame, and a CP length type. The CP length type is a type of CP length used in the NR cell. For example, CP length type 1 is equivalent to a normal CP in LTE and CP length type 2 is equivalent to an extended CP in LTE.

The parameter sets related to a transmission signal in the NR cell can be specified individually with a downlink and an uplink. Further, the parameter sets related to a transmission signal in the NR cell can be set independently with a downlink and an uplink.

Figure 6:
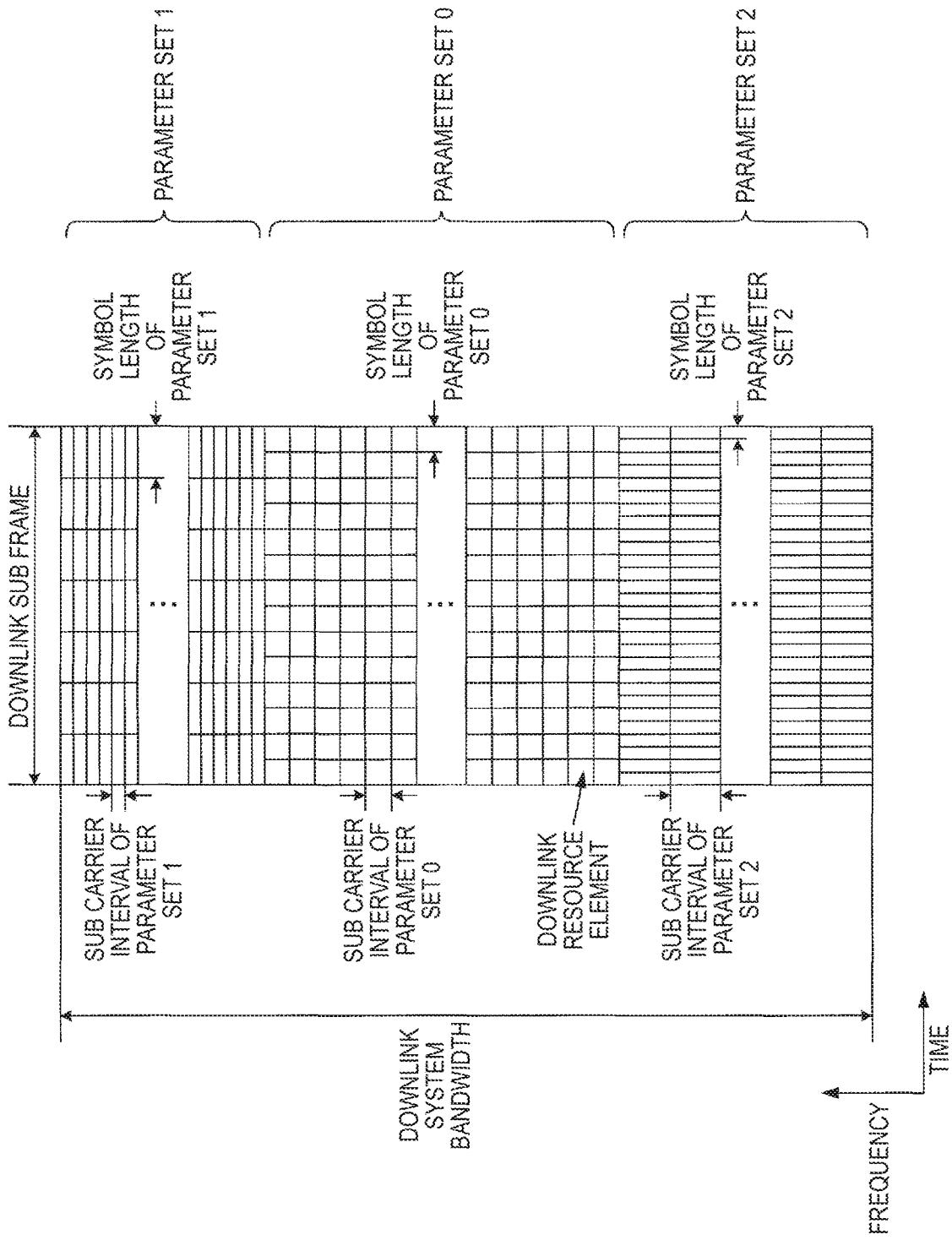
FIG. 6 is a diagram illustrating an example of an NR downlink sub frame of the present embodiment.

FIG. 6 is a diagram illustrating an example of an NR downlink sub frame of the present embodiment. In the example of FIG. 6, signals generated using parameter set 1, parameter set 0, and parameter set 2 are subjected to FDM in a cell (system bandwidth). The diagram illustrated in FIG. 6 is also referred to as a downlink resource grid of NR. The base station device 1 can transmit the physical downlink channel of NR and/or the physical downlink signal of NR in a downlink sub frame to the terminal device 2. The terminal device 2 can receive a physical downlink channel of NR and/or the physical downlink signal of NR in a downlink sub frame from the base station device 1.

Figure 7:
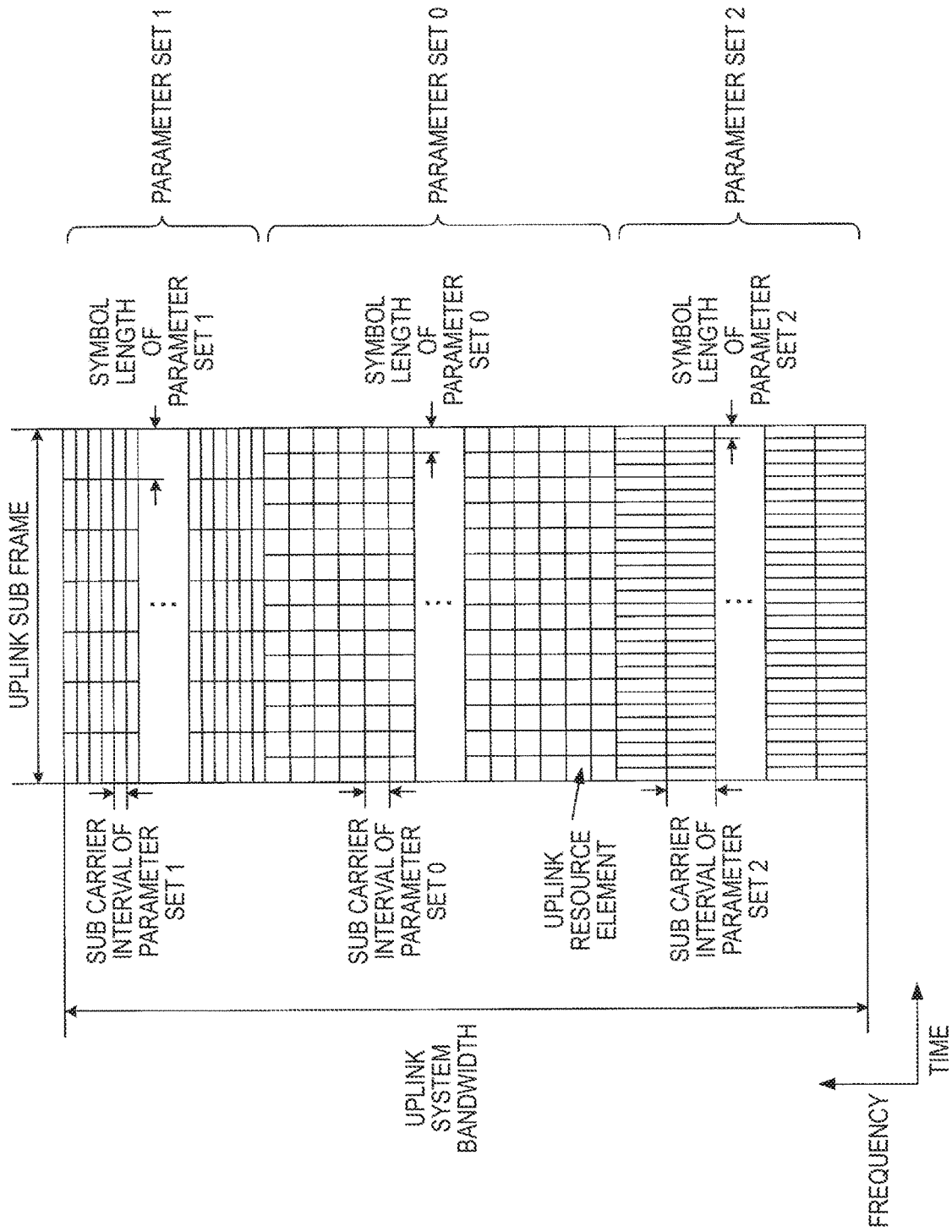
FIG. 7 is a diagram illustrating an example of an NR uplink sub frame of the present embodiment.

FIG. 7 is a diagram illustrating an example of an NR uplink sub frame of the present embodiment. In the example of FIG. 7, signals generated using parameter set 1, parameter set 0, and parameter set 2 are subjected to FDM in a cell (system bandwidth). The diagram illustrated in FIG. 6 is also referred to as an uplink resource grid of NR. The base station device 1 can transmit the physical uplink channel of NR and/or the physical uplink signal of NR in an uplink sub frame to the terminal device 2. The terminal device 2 can receive a physical uplink channel of NR and/or the physical uplink signal of NR in an uplink sub frame from the base station device 1.

<Antenna Port in Present Embodiment>

An antenna port is defined so that a propagation channel carrying a certain symbol can be inferred from a propagation channel carrying another symbol in the same antenna port. For example, different physical resources in the same antenna port can be assumed to be transmitted through the same propagation channel. In other words, for a symbol in a certain antenna port, it is possible to estimate and demodulate a propagation channel in accordance with the reference signal in the antenna port. Further, there is one resource grid for each antenna port. The antenna port is defined by the reference signal. Further, each reference signal can define a plurality of antenna ports.

The antenna port is specified or identified with an antenna port number. For example, antenna ports 0 to 3 are antenna ports with which CRS is transmitted. That is, the PDSCH transmitted with antenna ports 0 to 3 can be demodulated to CRS corresponding to antenna ports 0 to 3.

In a case in which two antenna ports satisfy a predetermined condition, the two antenna ports can be regarded as being a quasi co-location (QCL). The predetermined condition is that a wide area characteristic of a propagation channel carrying a symbol in one antenna port can be inferred from a propagation channel carrying a symbol in another antenna port. The wide area characteristic includes a delay dispersion, a Doppler spread, a Doppler shift, an average gain, and/or an average delay.

In the present embodiment, the antenna port numbers may be defined differently for each RAT or may be defined commonly between RATs. For example, antenna ports 0 to 3 in LTE are antenna ports with which CRS is transmitted. In the NR, antenna ports 0 to 3 can be set as antenna ports with which CRS similar to that of LTE is transmitted. Further, in NR, the antenna ports with which CRS is transmitted like LTE can be set as different antenna port numbers from antenna ports 0 to 3. In the description of the present embodiment, predetermined antenna port numbers can be applied to LTE and/or NR.

<Physical Channel and Physical Signal in Present Embodiment>

In the present embodiment, physical channels and physical signals are used.

The physical channels include a physical downlink channel, a physical uplink channel, and a physical sidelink channel. The physical signals include a physical downlink signal, a physical uplink signal, and a sidelink physical signal.

In LTE, a physical channel and a physical signal are referred to as an LTE physical channel and an LTE physical signal. In NR, a physical channel and a physical signal are referred to as an NR physical channel and an NR physical signal. The LTE physical channel and the NR physical channel can be defined as different physical channels, respectively. The LTE physical signal and the NR physical signal can be defined as different physical signals, respectively. In the description of the present embodiment, the LTE physical channel and the NR physical channel are also simply referred to as physical channels, and the LTE physical signal and the NR physical signal are also simply referred to as physical signals. That is, the description of the physical channels can be applied to any of the LTE physical channel and the NR physical channel. The description of the physical signals can be applied to any of the LTE physical signal and the NR physical signal.

The physical downlink channel includes a Physical Broadcast Channel (PBCH), a Physical Control Format Indicator Channel (PCFICH), a Physical Hybrid automatic repeat request Indicator Channel (PHICH), a Physical Downlink Control Channel (PDCCH), an Enhanced PDCCH (EPDCCH), a Machine Type Communication (MTC) PDCCH (MTC MPDCCH), a Relay PDCCH (R-PDCCH), a Physical Downlink Shared Channel (PDSCH), a Physical Multicast Channel (PMCH), and the like.

The physical downlink signal includes a Synchronization Signal (SS), a Downlink Reference Signal (DL-RS), a Discovery Signal (DS), and the like.

The synchronization signal includes a primary synchronization signal (PSS), a secondary synchronization signal (SSS), and the like.

The reference signal in the downlink includes a cell-specific reference signal (CRS), a UE-specific reference signal associated with the PDSCH (PDSCH-DMRS:), a demodulation reference signal associated with the EPDCCH (EPDCCH-DMRS), a positioning reference signal (PRS), a channel state information (CSI) reference signal (CSI-RS), a tracking reference signal (TRS), and the like. The PDSCH-DMRS is also referred to as a URS associated with the PDSCH or referred to simply as a URS. The EPDCCH-DMRS is also referred to as a DMRS associated with the EPDCCH or referred to simply as DMRS. The PDSCH-DMRS and the EPDCCH-DMRS are also referred to simply as a DL-DMRS or a downlink demodulation reference signal. The CSI-RS includes a non-zero power CSI-RS (NZP CSI-RS). Further, the downlink resources include a zero power CSI-RS (ZP CSI-RS), a channel state information-interference measurement (CSI-IM), and the like.

The physical uplink channel includes a physical uplink shared channel (PUSCH), a physical uplink control channel (PUCCH), a physical random access channel (PRACH), and the like.

The physical uplink signal includes an uplink reference signal (UL-RS).

The uplink reference signal includes an uplink demodulation signal (UL-DMRS), a sounding reference signal (SRS), and the like. The UL-DMRS is associated with transmission of the PUSCH or the PUCCH. The SRS is not associated with transmission of the PUSCH or the PUCCH.

The physical sidelink channel includes a Physical Sidelink Broadcast Channel (PSBCH), a Physical Sidelink Control Channel (PSCCH), a Physical Sidelink Discovery Channel (PSDCH), a Physical Sidelink Shared Channel (PSSCH), and the like.

The physical channel and the physical signal are also simply referred to a channel and a signal. That is, the physical downlink channel, the physical uplink channel, and the physical sidelink channel are also referred to as a downlink channel, an uplink channel, and a sidelink channel, respectively. The physical downlink signal, the physical uplink signal, and the physical sidelink signal are also referred to as a downlink signal, an uplink signal, and a sidelink signal, respectively.

The BCH, the MCH, the UL-SCH, and the DL-SCH are transport channels. The channel used in the medium access control (MAC) layer is referred to as a transport channel. A unit of the transport channel used in the MAC layer is also referred to as a transport block (TB) or a MAC protocol data unit (MAC PDU). In the MAC layer, control of a hybrid automatic repeat request (HARQ) is performed for each transport block. The transport block is a unit of data that the MAC layer transfers (delivers) to the physical layer. In the physical layer, the transport block is mapped to a codeword, and an encoding process is performed for each codeword.

Note that the downlink reference signal and the uplink reference signal are also simply referred to as reference signals (RSs).

<LTE Physical Channel and LTE Physical Signal in Present Embodiment>

As described above, the description of the physical channel and the physical signal can also be applied to the LTE physical channel and the LTE physical signal, respectively. The LTE physical channel and the LTE physical signal are referred to as the following.

The LTE physical downlink channel includes an LTE-PBCH, an LTE-PCFICH, an LTE-PHICH, an LTE-PDCCH, an LTE-EPDCCH, an LTE-MPDCCH, an LTE-R-PDCCH, an LTE-PDSCH, an LTE-PMCH, and the like.

The LTE physical downlink signal an LTE-SS, an LTE-DL-RS, an LTE-DS, and the like. The LTE-SS includes an LTE-PSS, an LTE-SSS, and the like. The LTE-RS includes an LTE-CRS, an LTE-PDSCH-DMRS, an LTE-EPDCCH-DMRS, an LTE-RRS, an LTE-CSI-RS, an LTE-TRS, and the like.

The LTE physical uplink channel includes an LTE-PUSCH, an LTE-PUCCH, an LTE-PRACH, and the like.

The LTE physical uplink signal includes an LTE-UL-RS. The LTE-UL-RS includes an LTE-UL-DMRS, an LTE-SRS, and the like.

The LTE physical sidelink channel includes an LTE-PSBCH, an LTE-PSCCH, an LTE-PSDCH, an LTE-PSSCH, and the like.

<NR Physical Channel and NR Physical Signal in Present Embodiment>

As described above, the description of the physical channel and the physical signal can also be applied to the NR physical channel and the NR physical signal, respectively. The NR physical channel and the NR physical signal are referred to as the following.

The NR physical downlink channel includes an NR-PBCH, an NR-PCFICH, an NR-PHICH, an NR-PDCCH, an NR-EPDCCH, an NR-MPDCCH, an NR-R-PDCCH, an NR-PDSCH, an NR-PMCH, and the like.

The NR physical downlink signal includes an NR-SS, an NR-DL-RS, an NR-DS, and the like. The NR-SS includes an NR-PSS, an NR-SSS, and the like. The NR-RS includes an NR-CRS, an NR-PDSCH-DMRS, an NR-EPDCCH-DMRS, an NR-PRS, an NR-CSI-RS, an NR-TRS, and the like.

The NR physical uplink channel includes an NR-PUSCH, an NR-PUCCH, an NR-PRACH, and the like.

The NR physical uplink signal includes an NR-UL-RS. The NR-UL-RS includes an NR-UL-DMRS, an NR-SRS, and the like.

The NR physical sidelink channel includes an NR-PSBCH, an NR-PSCCH, an NR-PSDCH, an NR-PSSCH, and the like.

<Physical Downlink Channel in Present Embodiment>

The PBCH is used to broadcast a master information block (MIB) which is broadcast information specific to a serving cell of the base station device 1. The PBCH is transmitted only through the sub frame 0 in the radio frame. The MIB can be updated at intervals of 40 ms. The PBCH is repeatedly transmitted with a cycle of 10 ms. Specifically, initial transmission of the MIB is performed in the sub frame 0 in the radio frame satisfying a condition that a remainder obtained by dividing a system frame number (SFN) by 4 is 0, and retransmission (repetition) of the MIB is performed in the sub frame 0 in all the other radio frames. The SFN is a radio frame number (system frame number). The MIB is system information. For example, the MIB includes information indicating the SFN.

The PCFICH is used to transmit information related to the number of OFDM symbols used for transmission of the PDCCH. A region indicated by PCFICH is also referred to as a PDCCH region. The information transmitted through the PCFICH is also referred to as a control format indicator (CFI).

The PHICH is used to transmit an HARQ-ACK (an HARQ indicator, HARQ feedback, and response information) indicating ACKnowledgment (ACK) or negative ACKnowledgment (NACK) of uplink data (an uplink shared channel (UL-SCH)) received by the base station device 1. For example, in a case in which the HARQ-ACK indicating ACK is received, corresponding uplink data is not retransmitted. For example, in a case in which the terminal device 2 receives the HARQ-ACK indicating NACK, the terminal device 2 retransmits corresponding uplink data through a predetermined uplink sub frame. A certain PHICH transmits the HARQ-ACK for certain uplink data. The base station device 1 transmits each HARQ-ACK to a plurality of pieces of uplink data included in the same PUSCH using a plurality of PHICHs.

The PDCCH and the EPDCCH are used to transmit downlink control information (DCI). Mapping of an information bit of the downlink control information is defined as a DCI format. The downlink control information includes a downlink grant and an uplink grant. The downlink grant is also referred to as a downlink assignment or a downlink allocation.

The PDCCH is transmitted by a set of one or more consecutive control channel elements (CCEs). The CCE includes 9 resource element groups (REGs). An REG includes 4 resource elements. In a case in which the PDCCH is constituted by n consecutive CCEs, the PDCCH starts with a CCE satisfying a condition that a remainder after dividing an index (number) i of the CCE by n is 0.

The EPDCCH is transmitted by a set of one or more consecutive enhanced control channel elements (ECCEs). The ECCE is constituted by a plurality of enhanced resource element groups (EREGs).

The downlink grant is used for scheduling of the PDSCH in a certain cell. The downlink grant is used for scheduling of the PDSCH in the same sub frame as a sub frame in which the downlink grant is transmitted. The uplink grant is used for scheduling of the PUSCH in a certain cell. The uplink grant is used for scheduling of a single PUSCH in a fourth sub frame from a sub frame in which the uplink grant is transmitted or later.

A cyclic redundancy check (CRC) parity bit is added to the DCI. The CRC parity bit is scrambled using a radio network temporary identifier (RNTI). The RNTI is an identifier that can be specified or set in accordance with a purpose of the DCI or the like. The RNTI is an identifier specified in a specification in advance, an identifier set as information specific to a cell, an identifier set as information specific to the terminal device 2, or an identifier set as information specific to a group to which the terminal device 2 belongs. For example, in monitoring of the PDCCH or the EPDCCH, the terminal device 2 descrambles the CRC parity bit added to the DCI with a predetermined RNTI and identifies whether or not the CRC is correct. In a case in which the CRC is correct, the DCI is understood to be a DCI for the terminal device 2.

The PDSCH is used to transmit downlink data (a downlink shared channel (DL-SCH)). Further, the PDSCH is also used to transmit control information of a higher layer.

The PMCH is used to transmit multicast data (a multicast channel (MCH)).

In the PDCCH region, a plurality of PDCCHs may be multiplexed according to frequency, time, and/or space. In the EPDCCH region, a plurality of EPDCCHs may be multiplexed according to frequency, time, and/or space. In the PDSCH region, a plurality of PDSCHs may be multiplexed according to frequency, time, and/or space. The PDCCH, the PDSCH, and/or the EPDCCH may be multiplexed according to frequency, time, and/or space.

<Physical Downlink Signal in Present Embodiment>

A synchronization signal is used for the terminal device 2 to obtain downlink synchronization in the frequency domain and/or the time domain. The synchronization signal includes a primary synchronization signal (PSS) and a secondary synchronization signal (SSS). The synchronization signal is placed in a predetermined sub frame in the radio frame. For example, in the TDD scheme, the synchronization signal is placed in the sub frames 0, 1, 5, and 6 in the radio frame. In the FDD scheme, the synchronization signal is placed in the sub frames 0 and 5 in the radio frame.

The PSS may be used for coarse frame/timing synchronization (synchronization in the time domain) or cell group identification. The SSS may be used for more accurate frame timing synchronization or cell identification. In other words, frame timing synchronization and cell identification can be performed using the PSS and the SSS.

The downlink reference signal is used for the terminal device 2 to perform propagation path estimation of the physical downlink channel, propagation path correction, calculation of downlink channel state information (CSI), and/or measurement of positioning of the terminal device 2.

The CRS is transmitted in the entire band of the sub frame. The CRS is used for receiving (demodulating) the PBCH, the PDCCH, the PHICH, the PCFICH, and the PDSCH. The CRS may be used for the terminal device 2 to calculate the downlink channel state information. The PBCH, the PDCCH, the PHICH, and the PCFICH are transmitted through the antenna port used for transmission of the CRS. The CRS supports the antenna port configurations of 1, 2, or 4. The CRS is transmitted through one or more of the antenna ports 0 to 3.

The URS associated with the PDSCH is transmitted through a sub frame and a band used for transmission of the PDSCH with which the URS is associated. The URS is used for demodulation of the PDSCH to which the URS is associated. The URS associated with the PDSCH is transmitted through one or more of the antenna ports 5 and 7 to 14.

The PDSCH is transmitted through an antenna port used for transmission of the CRS or the URS on the basis of the transmission mode and the DCI format. A DCI format 1A is used for scheduling of the PDSCH transmitted through an antenna port used for transmission of the CRS. A DCI format 2D is used for scheduling of the PDSCH transmitted through an antenna port used for transmission of the URS.

The DMRS associated with the EPDCCH is transmitted through a sub frame and a band used for transmission of the EPDCCH to which the DMRS is associated. The DMRS is used for demodulation of the EPDCCH with which the DMRS is associated. The EPDCCH is transmitted through an antenna port used for transmission of the DMRS. The DMRS associated with the EPDCCH is transmitted through one or more of the antenna ports 107 to 114.

The CSI-RS is transmitted through a set sub frame.

The resources in which the CSI-RS is transmitted are set by the base station device 1. The CSI-RS is used for the terminal device 2 to calculate the downlink channel state information. The terminal device 2 performs signal measurement (channel measurement) using the CSI-RS. The CSI-RS supports setting of some or all of the antenna ports 1, 2, 4, 8, 12, 16, 24, and 32. The CSI-RS is transmitted through one or more of the antenna ports 15 to 46. Further, an antenna port to be supported may be decided on the basis of a terminal device capability of the terminal device 2, setting of an RRC parameter, and/or a transmission mode to be set.

Resources of the ZP CSI-RS are set by a higher layer. Resources of the ZP CSI-RS are transmitted with zero output power. In other words, the resources of the ZP CSI-RS are not transmitted. The ZP PDSCH and the EPDCCH are not transmitted in the resources in which the ZP CSI-RS is set. For example, the resources of the ZP CSI-RS are used for a neighbor cell to transmit the NZP CSI-RS. Further, for example, the resources of the ZP CSI-RS are used to measure the CSI-IM. Further, for example, the resources of the ZP CSI-RS are resources with which a predetermined channel such as the PDSCH is not transmitted. In other words, the predetermined channel is mapped (to be rate-matched or punctured) except for the resources of the ZP CSI-RS.

Resources of the CSI-IM are set by the base station device 1. The resources of the CSI-IM are resources used for measuring interference in CSI measurement. The resources of the CSI-IM can be set to overlap some of the resources of the ZP CSI-RS. For example, in a case in which the resources of the CSI-IM are set to overlap some of the resources of the ZP CSI-RS, a signal from a cell performing the CSI measurement is not transmitted in the resources. In other words, the base station device 1 does not transmit the PDSCH, the EPDCCH, or the like in the resources set by the CSI-IM. Therefore, the terminal device 2 can perform the CSI measurement efficiently.

The MBSFN RS is transmitted in the entire band of the sub frame used for transmission of the PMCH. The MBSFN RS is used for demodulation of the PMCH. The PMCH is transmitted through an antenna port used for transmission of the MBSFN RS. The MBSFN RS is transmitted through the antenna port 4.

The PRS is used for the terminal device 2 to measure positioning of the terminal device 2. The PRS is transmitted through the antenna port 6.

The TRS can be mapped only to predetermined sub frames. For example, the TRS is mapped to the sub frames 0 and 5. Further, the TRS can use a configuration similar to a part or all of the CRS. For example, in each resource block, a position of a resource element to which the TRS is mapped can be caused to coincide with a position of a resource element to which the CRS of the antenna port 0 is mapped. Further, a sequence (value) used for the TRS can be decided on the basis of information set through the PBCH, the PDSCH, the EPDCCH, or the PDSCH (RRC signaling). A sequence (value) used for the TRS can be decided on the basis of a parameter such as a cell ID (for example, a physical layer cell identifier), a slot number, or the like. A sequence (value) used for the TRS can be decided by a method (formula) different from that of a sequence (value) used for the CRS of the antenna port 0.

<Physical Uplink Signal in Present Embodiment>

The PUCCH is a physical channel used for transmitting uplink control information (UCI). The uplink control information includes downlink channel state information (CSI), a scheduling request (SR) indicating a request for PUSCH resources, and a HARQ-ACK to downlink data (a transport block (TB) or a downlink-shared channel (DL-SCH)). The HARQ-ACK is also referred to as ACK/NACK, HARQ feedback, or response information. Further, the HARQ-ACK to downlink data indicates ACK, NACK, or DTX.

The PUSCH is a physical channel used for transmitting uplink data (uplink-shared channel (UL-SCH)). Further, the PUSCH may be used to transmit the HARQ-ACK and/or the channel state information together with uplink data. Further, the PUSCH may be used to transmit only the channel state information or only the HARQ-ACK and the channel state information.

The PRACH is a physical channel used for transmitting a random access preamble. The PRACH can be used for the terminal device 2 to obtain synchronization in the time domain with the base station device 1. Further, the PRACH is also used to indicate an initial connection establishment procedure (process), a handover procedure, a connection re-establishment procedure, synchronization (timing adjustment) for uplink transmission, and/or a request for PUSCH resources.

In the PUCCH region, a plurality of PUCCHs are frequency, time, space, and/or code multiplexed. In the PUSCH region, a plurality of PUSCHs may be frequency, time, space, and/or code multiplexed. The PUCCH and the PUSCH may be frequency, time, space, and/or code multiplexed. The PRACH may be placed over a single sub frame or two sub frames. A plurality of PRACHs may be code-multiplexed.

<Physical Uplink Signal in Present Embodiment>

The uplink DMRS is associated with transmission of the PUSCH or the PUCCH. The DMRS is time-multiplexed with the PUSCH or the PUCCH. The base station device 1 may use the DMRS to perform the propagation path correction of the PUSCH or the PUCCH. In the description of the present embodiment, the transmission of the PUSCH also includes multiplexing and transmitting the PUSCH and DMRS. In the description of the present embodiment, the transmission of the PUCCH also includes multiplexing and transmitting the PUCCH and the DMRS. Further, the uplink DMRS is also referred to as an UL-DMRS. The SRS is not associated with the transmission of the PUSCH or the PUCCH. The base station device 1 may use the SRS to measure the uplink channel state.

The SRS is transmitted using the last SC-FDMA symbol in the uplink sub frame. In other words, the SRS is placed in the last SC-FDMA symbol in the uplink sub frame. The terminal device 2 can restrict simultaneous transmission of the SRS, the PUCCH, the PUSCH, and/or the PRACH in a certain SC-FDMA symbol of a certain cell. The terminal device 2 can transmit the PUSCH and/or the PUCCH using the SC-FDMA symbol excluding the last SC-FDMA symbol in a certain uplink sub frame of a certain cell in the uplink sub frame and transmit the SRS using the last SC-FDMA symbol in the uplink sub frame. In other words, the terminal device 2 can transmit the SRS, the PUSCH, and the PUCCH in a certain uplink sub frame of a certain cell.

In the SRS, a trigger type 0 SRS and a trigger type 1 SRS are defined as SRSs having different trigger types. The trigger type 0 SRS is transmitted in a case in which a parameter related to the trigger type 0 SRS is set by signaling of a higher layer. The trigger type 1 SRS is transmitted in a case in which a parameter related to the trigger type 1 SRS is set by signaling of the higher layer, and transmission is requested by an SRS request included in the DCI format 0, 1A, 2B, 2C, 2D, or 4. Further, the SRS request is included in both FDD and TDD for the DCI format 0, 1A, or 4 and included only in TDD for the DCI format 2B, 2C, or 2D. In a case in which the transmission of the trigger type 0 SRS and the transmission of the trigger type 1 SRS occur in the same sub frame of the same serving cell, a priority is given to the transmission of the trigger type 1 SRS.

<Configuration Example of Base Station Device 1 in Present Embodiment>

Figure 8:
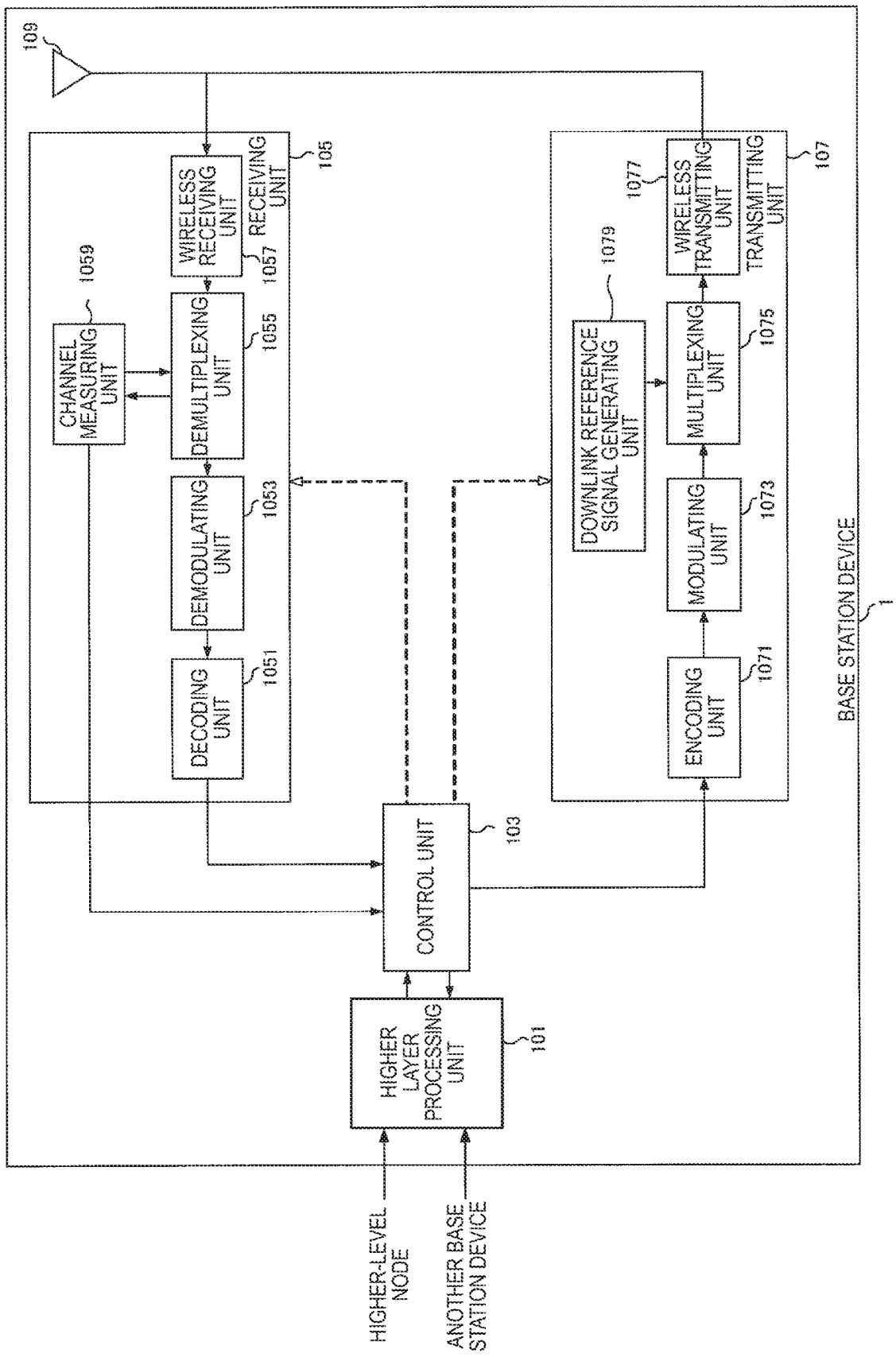
FIG. 8 is a schematic block diagram illustrating a configuration of a base station device of the present embodiment.

FIG. 8 is a schematic block diagram illustrating a configuration of the base station device 1 of the present embodiment. As illustrated in FIG. 8, the base station device 1 includes a higher layer processing unit 101, a control unit 103, a receiving unit 105, a transmitting unit 107, and a transceiving antenna 109. Further, the receiving unit 105 includes a decoding unit 1051, a demodulating unit 1053, a demultiplexing unit 1055, a wireless receiving unit 1057, and a channel measuring unit 1059. Further, the transmitting unit 107 includes an encoding unit 1071, a modulating unit 1073, a multiplexing unit 1075, a wireless transmitting unit 1077, and a downlink reference signal generating unit 1079.

As described above, the base station device 1 can support one or more RATs. Some or all of the units included in the base station device 1 illustrated in FIG. 8 can be configured individually in accordance with the RAT. For example, the receiving unit 105 and the transmitting unit 107 are configured individually in LTE and NR. Further, in the NR cell, some or all of the units included in the base station device 1 illustrated in FIG. 8 can be configured individually in accordance with a parameter set related to the transmission signal. For example, in a certain NR cell, the wireless receiving unit 1057 and the wireless transmitting unit 1077 can be configured individually in accordance with a parameter set related to the transmission signal.

The higher layer processing unit 101 performs processes of a medium access control (MAC) layer, a packet data convergence protocol (PDCP) layer, a radio link control (RLC) layer, and a radio resource control (RRC) layer. Further, the higher layer processing unit 101 generates control information to control the receiving unit 105 and the transmitting unit 107 and outputs the control information to the control unit 103.

The control unit 103 controls the receiving unit 105 and the transmitting unit 107 on the basis of the control information from the higher layer processing unit 101. The control unit 103 generates control information to be transmitted to the higher layer processing unit 101 and outputs the control information to the higher layer processing unit 101. The control unit 103 receives a decoded signal from the decoding unit 1051 and a channel estimation result from the channel measuring unit 1059. The control unit 103 outputs a signal to be encoded to the encoding unit 1071. Further, the control unit 103 is used to control the whole or a part of the base station device 1.

The higher layer processing unit 101 performs a process and management related to RAT control, radio resource control, sub frame setting, scheduling control, and/or CSI report control.

The process and the management in the higher layer processing unit 101 are performed for each terminal device or in common to terminal devices connected to the base station device. The process and the management in the higher layer processing unit 101 may be performed only by the higher layer processing unit 101 or may be acquired from a higher node or another base station device. Further, the process and the management in the higher layer processing unit 101 may be individually performed in accordance with the RAT. For example, the higher layer processing unit 101 individually performs the process and the management in LTE and the process and the management in NR.

Under the RAT control of the higher layer processing unit 101, management related to the RAT is performed. For example, under the RAT control, the management related to LTE and/or the management related to NR is performed. The management related to NR includes setting and a process of a parameter set related to the transmission signal in the NR cell.

In the radio resource control in the higher layer processing unit 101, generation and/or management of downlink data (transport block), system information, an RRC message (RRC parameter), and/or a MAC control element (CE) are performed.

In a sub frame setting in the higher layer processing unit 101, management of a sub frame setting, a sub frame pattern setting, an uplink-downlink setting, an uplink reference UL-DL setting, and/or a downlink reference UL-DL setting is performed. Further, the sub frame setting in the higher layer processing unit 101 is also referred to as a base station sub frame setting. Further, the sub frame setting in the higher layer processing unit 101 can be decided on the basis of an uplink traffic volume and a downlink traffic volume. Further, the sub frame setting in the higher layer processing unit 101 can be decided on the basis of a scheduling result of scheduling control in the higher layer processing unit 101.

In the scheduling control in the higher layer processing unit 101, a frequency and a sub frame to which the physical channel is allocated, a coding rate, a modulation scheme, and transmission power of the physical channels, and the like are decided on the basis of the received channel state information, an estimation value, a channel quality, or the like of a propagation path input from the channel measuring unit 1059, and the like. For example, the control unit 103 generates the control information (DCI format) on the basis of the scheduling result of the scheduling control in the higher layer processing unit 101.

In the CSI report control in the higher layer processing unit 101, the CSI report of the terminal device 2 is controlled. For example, a settings related to the CSI reference resources assumed to calculate the CSI in the terminal device 2 is controlled.

Under the control from the control unit 103, the receiving unit 105 receives a signal transmitted from the terminal device 2 via the transceiving antenna 109, performs a reception process such as demultiplexing, demodulation, and decoding, and outputs information which has undergone the reception process to the control unit 103. Further, the reception process in the receiving unit 105 is performed on the basis of a setting which is specified in advance or a setting notified from the base station device 1 to the terminal device 2.

The wireless receiving unit 1057 performs conversion into an intermediate frequency (down conversion), removal of an unnecessary frequency component, control of an amplification level such that a signal level is appropriately maintained, quadrature demodulation based on an in-phase component and a quadrature component of a received signal, conversion from an analog signal into a digital signal, removal of a guard interval (GI), and/or extraction of a signal in the frequency domain by fast Fourier transform (FFT) on the uplink signal received via the transceiving antenna 109.

The demultiplexing unit 1055 separates the uplink channel such as the PUCCH or the PUSCH and/or uplink reference signal from the signal input from the wireless receiving unit 1057. The demultiplexing unit 1055 outputs the uplink reference signal to the channel measuring unit 1059. The demultiplexing unit 1055 compensates the propagation path for the uplink channel from the estimation value of the propagation path input from the channel measuring unit 1059.

The demodulating unit 1053 demodulates the reception signal for the modulation symbol of the uplink channel using a modulation scheme such as binary phase shift keying (BPSK), quadrature phase shift keying (QPSK), 16 quadrature amplitude modulation (QAM), 64 QAM, or 256 QAM. The demodulating unit 1053 performs separation and demodulation of a MIMO multiplexed uplink channel.

The decoding unit 1051 performs a decoding process on encoded bits of the demodulated uplink channel. The decoded uplink data and/or uplink control information are output to the control unit 103. The decoding unit 1051 performs a decoding process on the PUSCH for each transport block.

The channel measuring unit 1059 measures the estimation value, a channel quality, and/or the like of the propagation path from the uplink reference signal input from the demultiplexing unit 1055, and outputs the estimation value, a channel quality, and/or the like of the propagation path to the demultiplexing unit 1055 and/or the control unit 103. For example, the estimation value of the propagation path for propagation path compensation for the PUCCH or the PUSCH is measured through the UL-DMRS, and an uplink channel quality is measured through the SRS.

The transmitting unit 107 carries out a transmission process such as encoding, modulation, and multiplexing on downlink control information and downlink data input from the higher layer processing unit 101 under the control of the control unit 103. For example, the transmitting unit 107 generates and multiplexes the PHICH, the PDCCH, the EPDCCH, the PDSCH, and the downlink reference signal and generates a transmission signal. Further, the transmission process in the transmitting unit 107 is performed on the basis of a setting which is specified in advance, a setting notified from the base station device 1 to the terminal device 2, or a setting notified through the PDCCH or the EPDCCH transmitted through the same sub frame.

The encoding unit 1071 encodes the HARQ indicator (HARQ-ACK), the downlink control information, and the downlink data input from the control unit 103 using a predetermined coding scheme such as block coding, convolutional coding, turbo coding, or the like. The modulating unit 1073 modulates the encoded bits input from the encoding unit 1071 using a predetermined modulation scheme such as BPSK, QPSK, 16 QAM, 64 QAM, or 256 QAM. The downlink reference signal generating unit 1079 generates the downlink reference signal on the basis of a physical cell identification (PCI), an RRC parameter set in the terminal device 2, and the like. The multiplexing unit 1075 multiplexes a modulated symbol and the downlink reference signal of each channel and arranges resulting data in a predetermined resource element.

The wireless transmitting unit 1077 performs processes such as conversion into a signal in the time domain by inverse fast Fourier transform (IFFT), addition of the guard interval, generation of a baseband digital signal, conversion in an analog signal, quadrature modulation, conversion from a signal of an intermediate frequency into a signal of a high frequency (up conversion), removal of an extra frequency component, and amplification of power on the signal from the multiplexing unit 1075, and generates a transmission signal. The transmission signal output from the wireless transmitting unit 1077 is transmitted through the transceiving antenna 109.

<Configuration Example of Terminal Device 2 in Present Embodiment>

Figure 9:
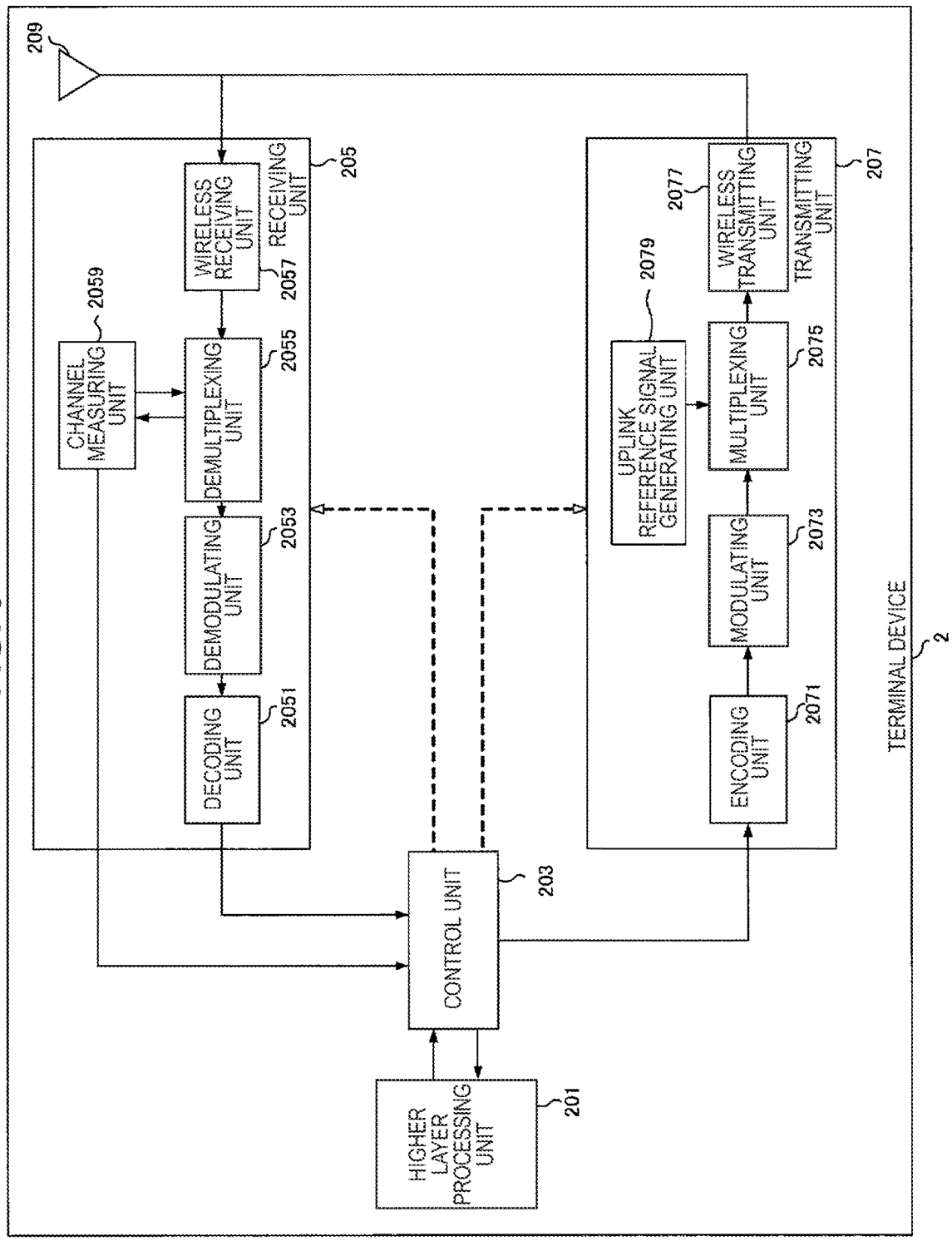
FIG. 9 is a schematic block diagram illustrating a configuration of a terminal device of the present embodiment.

FIG. 9 is a schematic block diagram illustrating a configuration of the terminal device 2 of the present embodiment. As illustrated in FIG. 9, the terminal device 2 includes a higher layer processing unit 201, a control unit 203, a receiving unit 205, a transmitting unit 207, and a transceiving antenna 209. Further, the receiving unit 205 includes a decoding unit 2051, a demodulating unit 2053, a demultiplexing unit 2055, a wireless receiving unit 2057, and a channel measuring unit 2059. Further, the transmitting unit 207 includes an encoding unit 2071, a modulating unit 2073, a multiplexing unit 2075, a wireless transmitting unit 2077, and an uplink reference signal generating unit 2079

As described above, the terminal device 2 can support one or more RATs. Some or all of the units included in the terminal device 2 illustrated in FIG. 9 can be configured individually in accordance with the RAT. For example, the receiving unit 205 and the transmitting unit 207 are configured individually in LTE and NR. Further, in the NR cell, some or all of the units included in the terminal device 2 illustrated in FIG. 9 can be configured individually in accordance with a parameter set related to the transmission signal. For example, in a certain NR cell, the wireless receiving unit 2057 and the wireless transmitting unit 2077 can be configured individually in accordance with a parameter set related to the transmission signal.

The higher layer processing unit 201 outputs uplink data (transport block) to the control unit 203. The higher layer processing unit 201 performs processes of a medium access control (MAC) layer, a packet data convergence protocol (PDCP) layer, a radio link control (RLC) layer, and a radio resource control (RRC) layer. Further, the higher layer processing unit 201 generates control information to control the receiving unit 205 and the transmitting unit 207 and outputs the control information to the control unit 203.

The control unit 203 controls the receiving unit 205 and the transmitting unit 207 on the basis of the control information from the higher layer processing unit 201. The control unit 203 generates control information to be transmitted to the higher layer processing unit 201 and outputs the control information to the higher layer processing unit 201. The control unit 203 receives a decoded signal from the decoding unit 2051 and a channel estimation result from the channel measuring unit 2059. The control unit 203 outputs a signal to be encoded to the encoding unit 2071. Further, the control unit 203 may be used to control the whole or a part of the terminal device 2.

The higher layer processing unit 201 performs a process and management related to RAT control, radio resource control, sub frame setting, scheduling control, and/or CSI report control. The process and the management in the higher layer processing unit 201 are performed on the basis of a setting which is specified in advance and/or a setting based on control information set or notified from the base station device 1. For example, the control information from the base station device 1 includes the RRC parameter, the MAC control element, or the DCI. Further, the process and the management in the higher layer processing unit 201 may be individually performed in accordance with the RAT. For example, the higher layer processing unit 201 individually performs the process and the management in LTE and the process and the management in NR.

Under the RAT control of the higher layer processing unit 201, management related to the RAT is performed. For example, under the RAT control, the management related to LTE and/or the management related to NR is performed. The management related to NR includes setting and a process of a parameter set related to the transmission signal in the NR cell.

In the radio resource control in the higher layer processing unit 201, the setting information in the terminal device 2 is managed. In the radio resource control in the higher layer processing unit 201, generation and/or management of uplink data (transport block), system information, an RRC message (RRC parameter), and/or a MAC control element (CE) are performed.

In the sub frame setting in the higher layer processing unit 201, the sub frame setting in the base station device 1 and/or a base station device different from the base station device 1 is managed. The sub frame setting includes an uplink or downlink setting for the sub frame, a sub frame pattern setting, an uplink-downlink setting, an uplink reference UL-DL setting, and/or a downlink reference UL-DL setting. Further, the sub frame setting in the higher layer processing unit 201 is also referred to as a terminal sub frame setting.

In the scheduling control in the higher layer processing unit 201, control information for controlling scheduling on the receiving unit 205 and the transmitting unit 207 is generated on the basis of the DCI (scheduling information) from the base station device 1.

In the CSI report control in the higher layer processing unit 201, control related to the report of the CSI to the base station device 1 is performed. For example, in the CSI report control, a setting related to the CSI reference resources assumed for calculating the CSI by the channel measuring unit 2059 is controlled. In the CSI report control, resource (timing) used for reporting the CSI is controlled on the basis of the DCI and/or the RRC parameter.

Under the control from the control unit 203, the receiving unit 205 receives a signal transmitted from the base station device 1 via the transceiving antenna 209, performs a reception process such as demultiplexing, demodulation, and decoding, and outputs information which has undergone the reception process to the control unit 203. Further, the reception process in the receiving unit 205 is performed on the basis of a setting which is specified in advance or a notification from the base station device 1 or a setting.

The wireless receiving unit 2057 performs conversion into an intermediate frequency (down conversion), removal of an unnecessary frequency component, control of an amplification level such that a signal level is appropriately maintained, quadrature demodulation based on an in-phase component and a quadrature component of a received signal, conversion from an analog signal into a digital signal, removal of a guard interval (GI), and/or extraction of a signal in the frequency domain by fast Fourier transform (FFT) on the uplink signal received via the transceiving antenna 209.

The demultiplexing unit 2055 separates the downlink channel such as the PHICH, PDCCH, EPDCCH, or PDSCH, downlink synchronization signal and/or downlink reference signal from the signal input from the wireless receiving unit 2057. The demultiplexing unit 2055 outputs the uplink reference signal to the channel measuring unit 2059. The demultiplexing unit 2055 compensates the propagation path for the uplink channel from the estimation value of the propagation path input from the channel measuring unit 2059.

The demodulating unit 2053 demodulates the reception signal for the modulation symbol of the downlink channel using a modulation scheme such as BPSK, QPSK, 16 QAM, 64 QAM, or 256 QAM. The demodulating unit 2053 performs separation and demodulation of a MIMO multiplexed downlink channel.

The decoding unit 2051 performs a decoding process on encoded bits of the demodulated downlink channel. The decoded downlink data and/or downlink control information are output to the control unit 203. The decoding unit 2051 performs a decoding process on the PDSCH for each transport block.

The channel measuring unit 2059 measures the estimation value, a channel quality, and/or the like of the propagation path from the downlink reference signal input from the demultiplexing unit 2055, and outputs the estimation value, a channel quality, and/or the like of the propagation path to the demultiplexing unit 2055 and/or the control unit 203. The downlink reference signal used for measurement by the channel measuring unit 2059 may be decided on the basis of at least a transmission mode set by the RRC parameter and/or other RRC parameters. For example, the estimation value of the propagation path for performing the propagation path compensation on the PDSCH or the EPDCCH is measured through the DL-DMRS. The estimation value of the propagation path for performing the propagation path compensation on the PDCCH or the PDSCH and/or the downlink channel for reporting the CSI are measured through the CRS. The downlink channel for reporting the CSI is measured through the CSI-RS. The channel measuring unit 2059 calculates a reference signal received power (RSRP) and/or a reference signal received quality (RSRQ) on the basis of the CRS, the CSI-RS, or the discovery signal, and outputs the RSRP and/or the RSRQ to the higher layer processing unit 201.

The transmitting unit 207 performs a transmission process such as encoding, modulation, and multiplexing on the uplink control information and the uplink data input from the higher layer processing unit 201 under the control of the control unit 203. For example, the transmitting unit 207 generates and multiplexes the uplink channel such as the PUSCH or the PUCCH and/or the uplink reference signal, and generates a transmission signal. Further, the transmission process in the transmitting unit 207 is performed on the basis of a setting which is specified in advance or a setting set or notified from the base station device 1.

The encoding unit 2071 encodes the HARQ indicator (HARQ-ACK), the uplink control information, and the uplink data input from the control unit 203 using a predetermined coding scheme such as block coding, convolutional coding, turbo coding, or the like. The modulating unit 2073 modulates the encoded bits input from the encoding unit 2071 using a predetermined modulation scheme such as BPSK, QPSK, 16 QAM, 64 QAM, or 256 QAM. The uplink reference signal generating unit 2079 generates the uplink reference signal on the basis of an RRC parameter set in the terminal device 2, and the like. The multiplexing unit 2075 multiplexes a modulated symbol and the uplink reference signal of each channel and arranges resulting data in a predetermined resource element.

The wireless transmitting unit 2077 performs processes such as conversion into a signal in the time domain by inverse fast Fourier transform (IFFT), addition of the guard interval, generation of a baseband digital signal, conversion in an analog signal, quadrature modulation, conversion from a signal of an intermediate frequency into a signal of a high frequency (up conversion), removal of an extra frequency component, and amplification of power on the signal from the multiplexing unit 2075, and generates a transmission signal. The transmission signal output from the wireless transmitting unit 2077 is transmitted through the transceiving antenna 209.

<Signaling of Control Information in Present Embodiment>

The base station device 1 and the terminal device 2 can use various methods for signaling (notification, broadcasting, or setting) of the control information. The signaling of the control information can be performed in various layers (layers). The signaling of the control information includes signaling of the physical layer which is signaling performed through the physical layer, RRC signaling which is signaling performed through the RRC layer, and MAC signaling which is signaling performed through the MAC layer. The RRC signaling is dedicated RRC signaling for notifying the terminal device 2 of the control information specific or a common RRC signaling for notifying of the control information specific to the base station device 1. The signaling used by a layer higher than the physical layer such as RRC signaling and MAC signaling is also referred to as signaling of the higher layer.

The RRC signaling is implemented by signaling the RRC parameter. The MAC signaling is implemented by signaling the MAC control element. The signaling of the physical layer is implemented by signaling the downlink control information (DCI) or the uplink control information (UCI). The RRC parameter and the MAC control element are transmitted using the PDSCH or the PUSCH. The DCI is transmitted using the PDCCH or the EPDCCH. The UCI is transmitted using the PUCCH or the PUSCH. The RRC signaling and the MAC signaling are used for signaling semi-static control information and are also referred to as semi-static signaling. The signaling of the physical layer is used for signaling dynamic control information and also referred to as dynamic signaling. The DCI is used for scheduling of the PDSCH or scheduling of the PUSCH. The UCI is used for the CSI report, the HARQ-ACK report, and/or the scheduling request (SR).

<Details of Downlink Control Information in Present Embodiment>

The DCI is notified using the DCI format having a field which is specified in advance. Predetermined information bits are mapped to the field specified in the DCI format. The DCI notifies of downlink scheduling information, uplink scheduling information, sidelink scheduling information, a request for a non-periodic CSI report, or an uplink transmission power command.

The DCI format monitored by the terminal device 2 is decided in accordance with the transmission mode set for each serving cell. In other words, a part of the DCI format monitored by the terminal device 2 can differ depending on the transmission mode. For example, the terminal device 2 in which a downlink transmission mode 1 is set monitors the DCI format 1A and the DCI format 1. For example, the terminal device 2 in which a downlink transmission mode 4 is set monitors the DCI format 1A and the DCI format 2. For example, the terminal device 2 in which an uplink transmission mode 1 is set monitors the DCI format 0. For example, the terminal device 2 in which an uplink transmission mode 2 is set monitors the DCI format 0 and the DCI format 4.

A control region in which the PDCCH for notifying the terminal device 2 of the DCI is placed is not notified of, and the terminal device 2 detects the DCI for the terminal device 2 through blind decoding (blind detection). Specifically, the terminal device 2 monitors a set of PDCCH candidates in the serving cell. The monitoring indicates that decoding is attempted in accordance with all the DCI formats to be monitored for each of the PDCCHs in the set. For example, the terminal device 2 attempts to decode all aggregation levels, PDCCH candidates, and DCI formats which are likely to be transmitted to the terminal device 2. The terminal device 2 recognizes the DCI (PDCCH) which is successfully decoded (detected) as the DCI (PDCCH) for the terminal device 2.

A cyclic redundancy check (CRC) is added to the DCI. The CRC is used for the DCI error detection and the DCI blind detection. A CRC parity bit (CRC) is scrambled using the RNTI. The terminal device 2 detects whether or not it is a DCI for the terminal device 2 on the basis of the RNTI. Specifically, the terminal device 2 performs de-scrambling on the bit corresponding to the CRC using a predetermined RNTI, extracts the CRC, and detects whether or not the corresponding DCI is correct.

The RNTI is specified or set in accordance with a purpose or a use of the DCI. The RNTI includes a cell-RNTI (C-RNTI), a semi persistent scheduling C-RNTI (SPS C-RNTI), a system information-RNTI (SI-RNTI), a paging-RNTI (P-RNTI), a random access-RNTI (RA-RNTI), a transmit power control-PUCCH-RNTI (TPC-PUCCH-RNTI), a transmit power control-PUSCH-RNTI (TPC-PUSCH-RNTI), a temporary C-RNTI, a multimedia broadcast muticast services (MBMS)-RNTI (M-RNTI)), and an eIMTA-RNTI.

The C-RNTI and the SPS C-RNTI are RNTIs which are specific to the terminal device 2 in the base station device 1 (cell), and serve as identifiers identifying the terminal device 2. The C-RNTI is used for scheduling the PDSCH or the PUSCH in a certain sub frame. The SPS C-RNTI is used to activate or release periodic scheduling of resources for the PDSCH or the PUSCH. A control channel having a CRC scrambled using the SI-RNTI is used for scheduling a system information block (SIB). A control channel with a CRC scrambled using the P-RNTI is used for controlling paging. A control channel with a CRC scrambled using the RA-RNTI is used for scheduling a response to the RACH. A control channel having a CRC scrambled using the TPC-PUCCH-RNTI is used for power control of the PUCCH. A control channel having a CRC scrambled using the TPC-PUSCH-RNTI is used for power control of the PUSCH. A control channel with a CRC scrambled using the temporary C-RNTI is used by a mobile station device in which no C-RNTI is set or recognized. A control channel with CRC scrambled using the M-RNTI is used for scheduling the MBMS. A control channel with a CRC scrambled using the eIMTA-RNTI is used for notifying of information related to a TDD UL/DL setting of a TDD serving cell in dynamic TDD (eIMTA). Further, the DCI format may be scrambled using a new RNTI instead of the above RNTI.

Scheduling information (the downlink scheduling information, the uplink scheduling information, and the sidelink scheduling information) includes information for scheduling in units of resource blocks or resource block groups as the scheduling of the frequency region. The resource block group is successive resource block sets and indicates resources allocated to the scheduled terminal device. A size of the resource block group is decided in accordance with a system bandwidth.

<Details of Channel State Information in Present Embodiment>

The terminal device 2 reports the CSI to the base station device 1. The time and frequency resources used to report the CSI are controlled by the base station device 1. In the terminal device 2, a setting related to the CSI is performed through the RRC signaling from the base station device 1. In the terminal device 2, one or more CSI processes are set in a predetermined transmission mode. The CSI reported by the terminal device 2 corresponds to the CSI process. For example, the CSI process is a unit of control or setting related to the CSI. For each of the CSI processes, a setting related to the CSI-RS resources, the CSI-IM resources, the periodic CSI report (for example, a period and an offset of a report), and/or the non-periodic CSI report can be independently set.

The CSI includes a channel quality indicator (CQI), a precoding matrix indicator (PMI), a precoding type indicator (PTI), a rank indicator (RI), and/or a CSI-RS resource indicator (CRI). The RI indicates the number of transmission layers (the number of ranks). The PMI is information indicating a precoding matrix which is specified in advance. The PMI indicates one precoding matrix by one piece of information or two pieces of information. In a case in which two pieces of information are used, the PMI is also referred to as a first PMI and a second PMI. The CQI is information indicating a combination of a modulation scheme and a coding rate which are specified in advance. The CRI is information (single instance) indicating one CSI-RS resource selected from two or more CSI-RS resources in a case in which the two or more CSI-RS resources are set in one CSI process. The terminal device 2 reports the CSI to recommend to the base station device 1. The terminal device 2 reports the CQI satisfying a predetermined reception quality for each transport block (codeword).

In the CRI report, one CSI-RS resource is selected from the CSI-RS resources to be set. In a case in which the CRI is reported, the PMI, the CQI, and the RI to be reported are calculated (selected) on the basis of the reported CRI. For example, in a case in which the CSI-RS resources to be set are precoded, the terminal device 2 reports the CRI, so that precoding (beam) suitable for the terminal device 2 is reported.

A sub frame (reporting instances) in which periodic CSI reporting can be performed are decided by a report period and a sub frame offset set by a parameter of a higher layer (a CQIPMI index, an RI index, and a CRI index). Further, the parameter of the higher layer can be independently set in a sub frame set to measure the CSI. In a case in which only one piece of information is set in a plurality of sub frame sets, that information can be set in common to the sub frame sets. In each serving cell, one or more periodic CSI reports are set by the signaling of the higher layer.

A CSI report type supports a PUCCH CSI report mode. The CSI report type is also referred to as a PUCCH report type. A type 1 report supports feedback of the CQI for a terminal selection sub band. A type 1a report supports feedbank of a sub band CQI and a second PMI. Type 2, type 2b, type 2c reports support feedback of a wideband CQI and a PMI. A type 2a report supports feedbank of a wideband PMI. A type 3 report supports feedback of the RI. A type 4 report supports feedback of the wideband CQI. A type 5 report supports feedback of the RI and the wideband PMI. A type 6 report supports feedback of the RI and the PTI. A type 7 report supports feedback of the CRI and the RI. A type 8 report supports feedback of the CRI, the RI, and the wideband PMI. A type 9 report supports feedback of the CRI, the RI, and the PTI. A type 10 report supports feedback of the CRI.

In the terminal device 2, information related to the CSI measurement and the CSI report is set from the base station device 1. The CSI measurement is performed on the basis of the reference signal and/or the reference resources (for example, the CRS, the CSI-RS, the CSI-IM resources, and/or the DRS). The reference signal used for the CSI measurement is decided on the basis of the setting of the transmission mode or the like. The CSI measurement is performed on the basis of channel measurement and interference measurement. For example, power of a desired cell is measured through the channel measurement. Power and noise power of a cell other than a desired cell are measured through the interference measurement.

For example, in the CSI measurement, the terminal device 2 performs the channel measurement and the interference measurement on the basis of the CRS. For example, in the CSI measurement, the terminal device 2 performs the channel measurement on the basis of the CSI-RS and performs the interference measurement on the basis of the CRS. For example, in the CSI measurement, the terminal device 2 performs the channel measurement on the basis of the CSI-RS and performs the interference measurement on the basis of the CSI-IM resources.

The CSI process is set as information specific to the terminal device 2 through signaling of the higher layer. In the terminal device 2, one or more CSI processes are set, and the CSI measurement and the CSI report are performed on the basis of the setting of the CSI process. For example, in a case in which a plurality of CSI processes are set, the terminal device 2 independently reports a plurality of CSIs based on the CSI processes. Each CSI process includes a setting for the cell state information, an identifier of the CSI process, setting information related to the CSI-RS, setting information related to the CSI-IM, a sub frame pattern set for the CSI report, setting information related to the periodic CSI report, setting information related to the non-periodic CSI report. Further, the setting for the cell state information may be common to a plurality of CSI processes.

The terminal device 2 uses the CSI reference resources to perform the CSI measurement. For example, the terminal device 2 measures the CSI in a case in which the PDSCH is transmitted using a group of downlink physical resource blocks indicated by the CSI reference resources. In a case in which the CSI sub frame set is set through the signaling of the higher layer, each CSI reference resource belongs to one of the CSI sub frame sets and does not belong to both of the CSI sub frame sets.

In the frequency direction, the CSI reference resource is defined by the group of downlink physical resource blocks corresponding to the bands associated with the value of the measured CQI.

In the layer direction (spatial direction), the CSI reference resources are defined by the RI and the PMI whose conditions are set by the measured CQI. In other words, in the layer direction (spatial direction), the CSI reference resources are defined by the RI and the PMI which are assumed or generated when the CQI is measured.

In the time direction, the CSI reference resources are defined by one or more predetermined downlink sub frames. Specifically, the CSI reference resources are defined by a valid sub frame which is a predetermined number before a sub frame for reporting the CSI. The predetermined number of sub frames for defining the CSI reference resources is decided on the basis of the transmission mode, the frame configuration type, the number of CSI processes to be set, and/or the CSI report mode. For example, in a case in which one CSI process and the periodic CSI report mode are set in the terminal device 2, the predetermined number of sub frames for defining the CSI reference resource is a minimum value of 4 or more among valid downlink sub frames.

A valid sub frame is a sub frame satisfying a predetermined condition. A downlink sub frame in a serving cell is considered to be valid in a case in which some or all of the following conditions are satisfied.

(1) A valid downlink sub frame is a sub frame in an ON state in the terminal device 2 in which the RRC parameters related to the ON state and the OFF state are set;

(2) A valid downlink sub frame is set as the downlink sub frame in the terminal device 2;

(3) A valid downlink sub frame is not a multimedia broadcast multicast service single frequency network (MBSFN) sub frame in a predetermined transmission mode;

(4) A valid downlink sub frame is not included in a range of a measurement interval (measurement gap) set in the terminal device 2;

(5) A valid downlink sub frame is an element or part of a CSI sub frame set linked to a periodic CSI report when the CSI sub frame set is set in the terminal device 2 in the periodic CSI report; and (6) A valid downlink sub frame is an element or part of a CSI sub frame set linked to a downlink sub frame associated with a corresponding CSI request in an uplink DCI format in a non-periodic CSI report for the CSI process. Under these conditions, a predetermined transmission mode, a plurality of CSI processes, and a CSI sub frame set for the CSI process are set in the terminal device 2.

<Details of Multicarrier Transmission in Present Embodiment>

A plurality of cells are set for the terminal device 2, and the terminal device 2 can perform multicarrier transmission. Communication in which the terminal device 2 uses a plurality of cells is referred to as carrier aggregation (CA) or dual connectivity (DC). Contents described in the present embodiment can be applied to each or some of a plurality of cells set in the terminal device 2. The cell set in the terminal device 2 is also referred to as a serving cell.

In the CA, a plurality of serving cells to be set includes one primary cell (PCell) and one or more secondary cells (SCell).

One primary cell and one or more secondary cells can be set in the terminal device 2 that supports the CA.

The primary cell is a serving cell in which the initial connection establishment procedure is performed, a serving cell that the initial connection re-establishment procedure is started, or a cell indicated as the primary cell in a handover procedure. The primary cell operates with a primary frequency. The secondary cell can be set after a connection is constructed or reconstructed. The secondary cell operates with a secondary frequency. Further, the connection is also referred to as an RRC connection.

The DC is an operation in which a predetermined terminal device 2 consumes radio resources provided from at least two different network points. The network point is a master base station device (a master eNB (MeNB)) and a secondary base station device (a secondary eNB (SeNB)). In the dual connectivity, the terminal device 2 establishes an RRC connection through at least two network points. In the dual connectivity, the two network points may be connected through a non-ideal backhaul.

In the DC, the base station device 1 which is connected to at least an S1-MME and plays a role of a mobility anchor of a core network is referred to as a master base station device. Further, the base station device 1 which is not the master base station device providing additional radio resources to the terminal device 2 is referred to as a secondary base station device. A group of serving cells associated with the master base station device is also referred to as a master cell group (MCG). A group of serving cells associated with the secondary base station device is also referred to as a secondary cell group (SCG).

In the DC, the primary cell belongs to the MCG. Further, in the SCG, the secondary cell corresponding to the primary cell is referred to as a primary secondary cell (PSCell). A function (capability and performance) equivalent to the PCell (the base station device constituting the PCell) may be supported by the PSCell (the base station device constituting the PSCell). Further, the PSCell may only support some functions of the PCell. For example, the PSCell may support a function of performing the PDCCH transmission using the search space different from the CSS or the USS. Further, the PSCell may constantly be in an activation state. Further, the PSCell is a cell that can receive the PUCCH.

In the DC, a radio bearer (a date radio bearer (DRB)) and/or a signaling radio bearer (SRB) may be individually allocated through the MeNB and the SeNB. A duplex mode may be set individually in each of the MCG (PCell) and the SCG (PSCell). The MCG (PCell) and the SCG (PSCell) may not be synchronized with each other. A parameter (a timing advance group (TAG)) for adjusting a plurality of timings may be independently set in the MCG (PCell) and the SCG (PSCell). In the dual connectivity, the terminal device 2 transmits the UCI corresponding to the cell in the MCG only through MeNB (PCell) and transmits the UCI corresponding to the cell in the SCG only through SeNB (pSCell). In the transmission of each UCI, the transmission method using the PUCCH and/or the PUSCH is applied in each cell group.

The PUCCH and the PBCH (MIB) are transmitted only through the PCell or the PSCell. Further, the PRACH is transmitted only through the PCell or the PSCell as long as a plurality of TAGs are not set between cells in the CG.

In the PCell or the PSCell, semi-persistent scheduling (SPS) or discontinuous transmission (DRX) may be performed.

In the secondary cell, the same DRX as the PCell or the PSCell in the same cell group may be performed.

In the secondary cell, information/parameter related to a setting of MAC is basically shared with the PCell or the PSCell in the same cell group. Some parameters may be set for each secondary cell. Some timers or counters may be applied only to the PCell or the PSCell.

In the CA, a cell to which the TDD scheme is applied and a cell to which the FDD scheme is applied may be aggregated. In a case in which the cell to which the TDD is applied and the cell to which the FDD is applied are aggregated, the present disclosure can be applied to either the cell to which the TDD is applied or the cell to which the FDD is applied.

The terminal device 2 transmits information indicating a combination of bands in which the CA is supported by the terminal device 2 to the base station device 1. The terminal device 2 transmits information indicating whether or not simultaneous transmission and reception are supported in a plurality of serving cells in a plurality of different bands for each of band combinations to the base station device 1.

<Details of Resource Allocation in Present Embodiment>

The base station device 1 can use a plurality of methods as a method of allocating resources of the PDSCH and/or the PUSCH to the terminal device 2. The resource allocation method includes dynamic scheduling, semi persistent scheduling, multi sub frame scheduling, and cross sub frame scheduling.

In the dynamic scheduling, one DCI performs resource allocation in one sub frame. Specifically, the PDCCH or the EPDCCH in a certain sub frame performs scheduling for the PDSCH in the sub frame. The PDCCH or the EPDCCH in a certain sub frame performs scheduling for the PUSCH in a predetermined sub frame after the certain sub frame.

In the multi sub frame scheduling, one DCI allocates resources in one or more sub frames. Specifically, the PDCCH or the EPDCCH in a certain sub frame performs scheduling for the PDSCH in one or more sub frames which are a predetermined number after the certain sub frame. The PDCCH or the EPDCCH in a certain sub frame performs scheduling for the PUSCH in one or more sub frames which are a predetermined number after the sub frame. The predetermined number can be set to an integer of zero or more. The predetermined number may be specified in advance and may be decided on the basis of the signaling of the physical layer and/or the RRC signaling. In the multi sub frame scheduling, consecutive sub frames may be scheduled, or sub frames with a predetermined period may be scheduled. The number of sub frames to be scheduled may be specified in advance or may be decided on the basis of the signaling of the physical layer and/or the RRC signaling.

In the cross sub frame scheduling, one DCI allocates resources in one sub frame. Specifically, the PDCCH or the EPDCCH in a certain sub frame performs scheduling for the PDSCH in one sub frame which is a predetermined number after the certain sub frame. The PDCCH or the EPDCCH in a certain sub frame performs scheduling for the PUSCH in one sub frame which is a predetermined number after the sub frame. The predetermined number can be set to an integer of zero or more. The predetermined number may be specified in advance and may be decided on the basis of the signaling of the physical layer and/or the RRC signaling. In the cross sub frame scheduling, consecutive sub frames may be scheduled, or sub frames with a predetermined period may be scheduled.

In the semi-persistent scheduling (SPS), one DCI allocates resources in one or more sub frames. In a case in which information related to the SPS is set through the RRC signaling, and the PDCCH or the EPDCCH for activating the SPS is detected, the terminal device 2 activates a process related to the SPS and receives a predetermined PDSCH and/or PUSCH on the basis of a setting related to the SPS. In a case in which the PDCCH or the EPDCCH for releasing the SPS is detected when the SPS is activated, the terminal device 2 releases (inactivates) the SPS and stops reception of a predetermined PDSCH and/or PUSCH. The release of the SPS may be performed on the basis of a case in which a predetermined condition is satisfied. For example, in a case in which a predetermined number of empty transmission data is received, the SPS is released. The data empty transmission for releasing the SPS corresponds to a MAC protocol data unit (PDU) including a zero MAC service data unit (SDU).

Information related to the SPS by the RRC signaling includes an SPS C-RNTI which is an SPN RNTI, information related to a period (interval) in which the PDSCH is scheduled, information related to a period (interval) in which the PUSCH is scheduled, information related to a setting for releasing the SPS, and/or a number of the HARQ process in the SPS. The SPS is supported only in the primary cell and/or the primary secondary cell.

<HARQ in Present Embodiment>

In the present embodiment, the HARQ has various features. The HARQ transmits and retransmits the transport block. In the HARQ, a predetermined number of processes (HARQ processes) are used (set), and each process independently operates in accordance with a stop-and-wait scheme.

In the downlink, the HARQ is asynchronous and operates adaptively. In other words, in the downlink, retransmission is constantly scheduled through the PDCCH. The uplink HARQ-ACK (response information) corresponding to the downlink transmission is transmitted through the PUCCH or the PUSCH. In the downlink, the PDCCH notifies of a HARQ process number indicating the HARQ process and information indicating whether or not transmission is initial transmission or retransmission.

In the uplink, the HARQ operates in a synchronous or asynchronous manner. The downlink HARQ-ACK (response information) corresponding to the uplink transmission is transmitted through the PHICH. In the uplink HARQ, an operation of the terminal device is decided on the basis of the HARQ feedback received by the terminal device and/or the PDCCH received by the terminal device. For example, in a case in which the PDCCH is not received, and the HARQ feedback is ACK, the terminal device does not perform transmission (retransmission) but holds data in a HARQ buffer. In this case, the PDCCH may be transmitted in order to resume the retransmission. Further, for example, in a case in which the PDCCH is not received, and the HARQ feedback is NACK, the terminal device performs retransmission non-adaptively through a predetermined uplink sub frame. Further, for example, in a case in which the PDCCH is received, the terminal device performs transmission or retransmission on the basis of contents notified through the PDCCH regardless of content of the HARQ feedback.

Further, in the uplink, in a case in which a predetermined condition (setting) is satisfied, the HARQ may be operated only in an asynchronous manner. In other words, the downlink HARQ-ACK is not transmitted, and the uplink retransmission may constantly be scheduled through the PDCCH.

In the HARQ-ACK report, the HARQ-ACK indicates ACK, NACK, or DTX. In a case in which the HARQ-ACK is ACK, it indicates that the transport block (codeword and channel) corresponding to the HARQ-ACK is correctly received (decoded). In a case in which the HARQ-ACK is NACK, it indicates that the transport block (codeword and channel) corresponding to the HARQ-ACK is not correctly received (decoded). In a case in which the HARQ-ACK is DTX, it indicates that the transport block (codeword and channel) corresponding to the HARQ-ACK is not present (not transmitted).

A predetermined number of HARQ processes are set (specified) in each of downlink and uplink. For example, in FDD, up to eight HARQ processes are used for each serving cell. Further, for example, in TDD, a maximum number of HARQ processes is decided by an uplink/downlink setting. A maximum number of HARQ processes may be decided on the basis of a round trip time (RTT). For example, in a case in which the RTT is 8 TTIs, the maximum number of the HARQ processes can be 8.

In the present embodiment, the HARQ information is constituted by at least a new data indicator (NDI) and a transport block size (TBS). The NDI is information indicating whether or not the transport block corresponding to the HARQ information is initial transmission or retransmission. The TBS is the size of the transport block. The transport block is a block of data in a transport channel (transport layer) and can be a unit for performing the HARQ. In the DL-SCH transmission, the HARQ information further includes a HARQ process ID (a HARQ process number). In the UL-SCH transmission, the HARQ information further includes an information bit in which the transport block is encoded and a redundancy version (RV) which is information specifying a parity bit. In the case of spatial multiplexing in the DL-SCH, the HARQ information thereof includes a set of NDI and TBS for each transport block.

<Details of Downlink Resource Elements Mapping of NR in Present Embodiment>

Hereinafter, an example of downlink resource element mapping of predetermined resources in NR will be described.

Here, the predetermined resource may be referred to as an NR resource block (NR-RB) which is a resource block in NR. The predetermined resource can be defined on the basis of a unit of allocation related to a predetermined channel or a predetermined signal such as the NR-PDSCH or the NR-PDCCH, a unit in which mapping of the predetermined channel or the predetermined signal to a resource element is defined, and/or a unit in which the parameter set is set.

Figure 10:
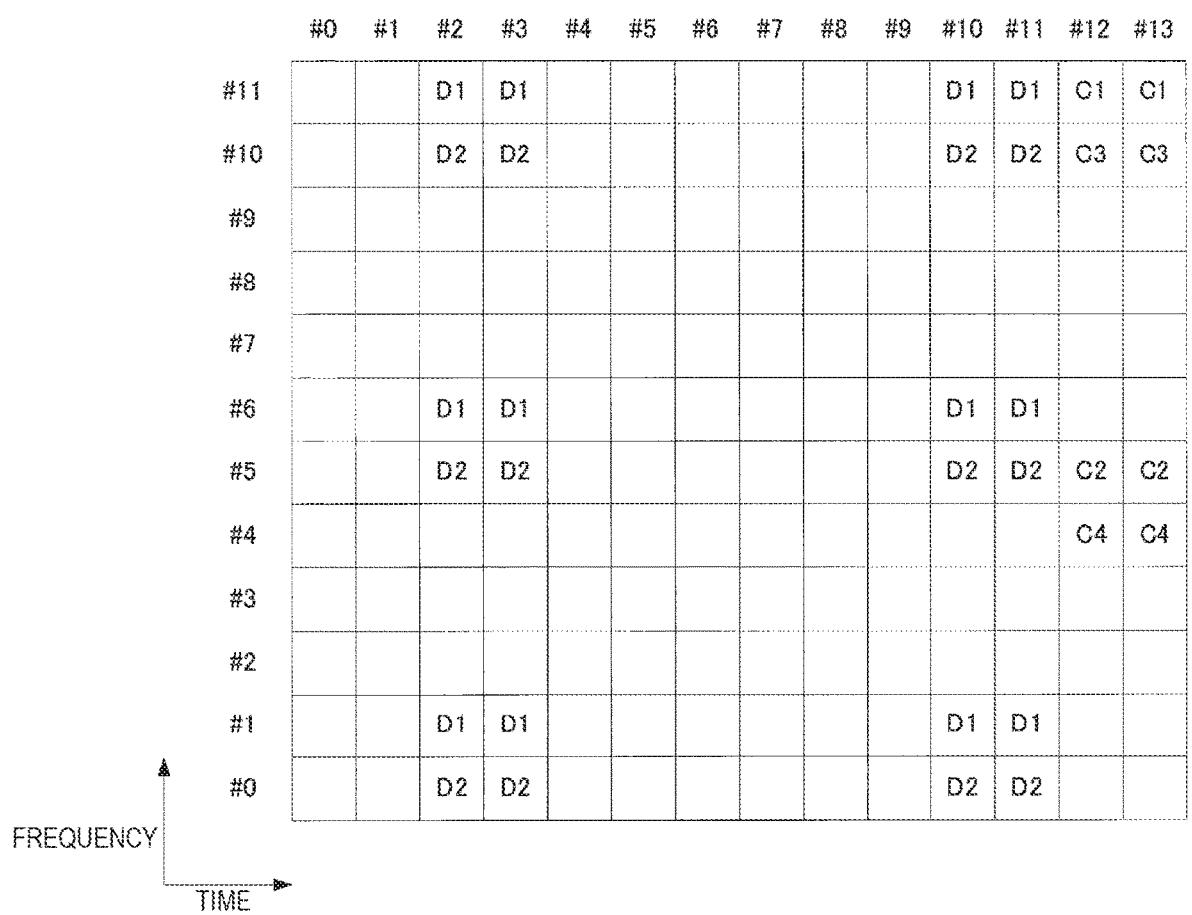
FIG. 10 is a diagram illustrating an example of downlink resource element mapping of NR according to the present embodiment.

FIG. 10 is a diagram illustrating an example of the downlink resource element mapping of NR according to the present embodiment. FIG. 10 illustrates a set of resource elements in the predetermined resources in a case in which parameter set 0 is used. The predetermined resources illustrated in FIG. 10 are resources formed by a time length and a frequency bandwidth such as one resource block pair in LTE.

In the example of FIG. 10, the predetermined resources include 14 OFDM symbols indicated by OFDM symbol numbers 0 to 13 in the time direction and 12 sub carriers indicated by sub carrier numbers 0 to 11 in the frequency direction. In a case in which the system bandwidth includes the plurality of predetermined resources, sub carrier numbers are allocated throughout the system bandwidth.

Resource elements indicated by C1 to C4 indicate reference signals (CSI-RS) for measuring transmission path states of the antenna ports 15 to 22. Resource elements indicated by D1 and D2 indicate DL-DMRS of CDM group 1 and CDM group 2, respectively.

Figure 11:
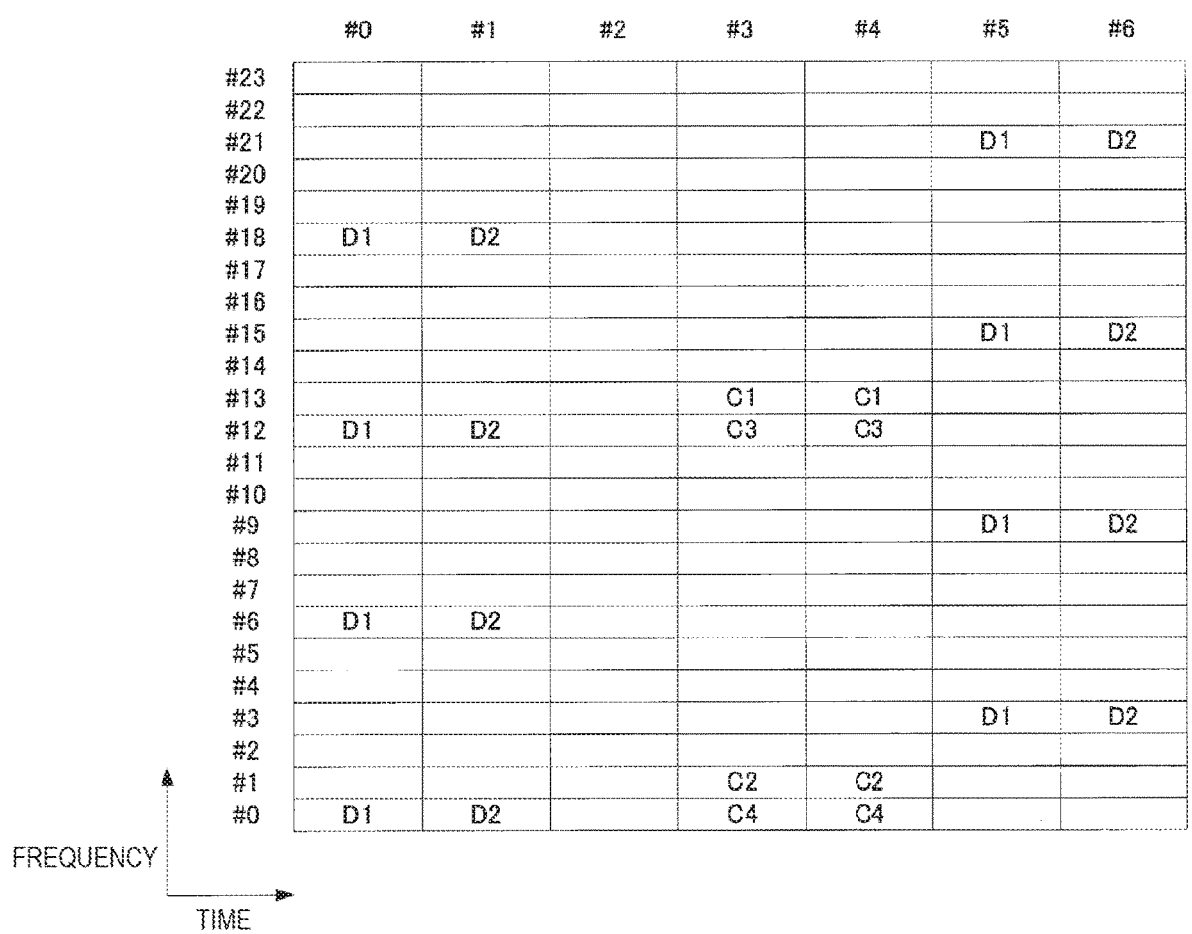
FIG. 11 is a diagram illustrating an example of downlink resource element mapping of NR according to the present embodiment.

FIG. 11 is a diagram illustrating an example of the downlink resource element mapping of NR according to the present embodiment. FIG. 11 illustrates a set of resource elements in the predetermined resources in a case in which parameter set 1 is used. The predetermined resources illustrated in FIG. 11 are resources formed by the same time length and frequency bandwidth as one resource block pair in LTE.

In the example of FIG. 11, the predetermined resources include 7 OFDM symbols indicated by OFDM symbol numbers 0 to 6 in the time direction and 24 sub carriers indicated by sub carrier numbers 0 to 23 in the frequency direction. In a case in which the system bandwidth includes the plurality of predetermined resources, sub carrier numbers are allocated throughout the system bandwidth.

Resource elements indicated by C1 to C4 indicate reference signals (CSI-RS) for measuring transmission path states of the antenna ports 15 to 22. Resource elements indicated by D1 and D2 indicate DL-DMRS of CDM group 1 and CDM group 2, respectively.

Figure 12:
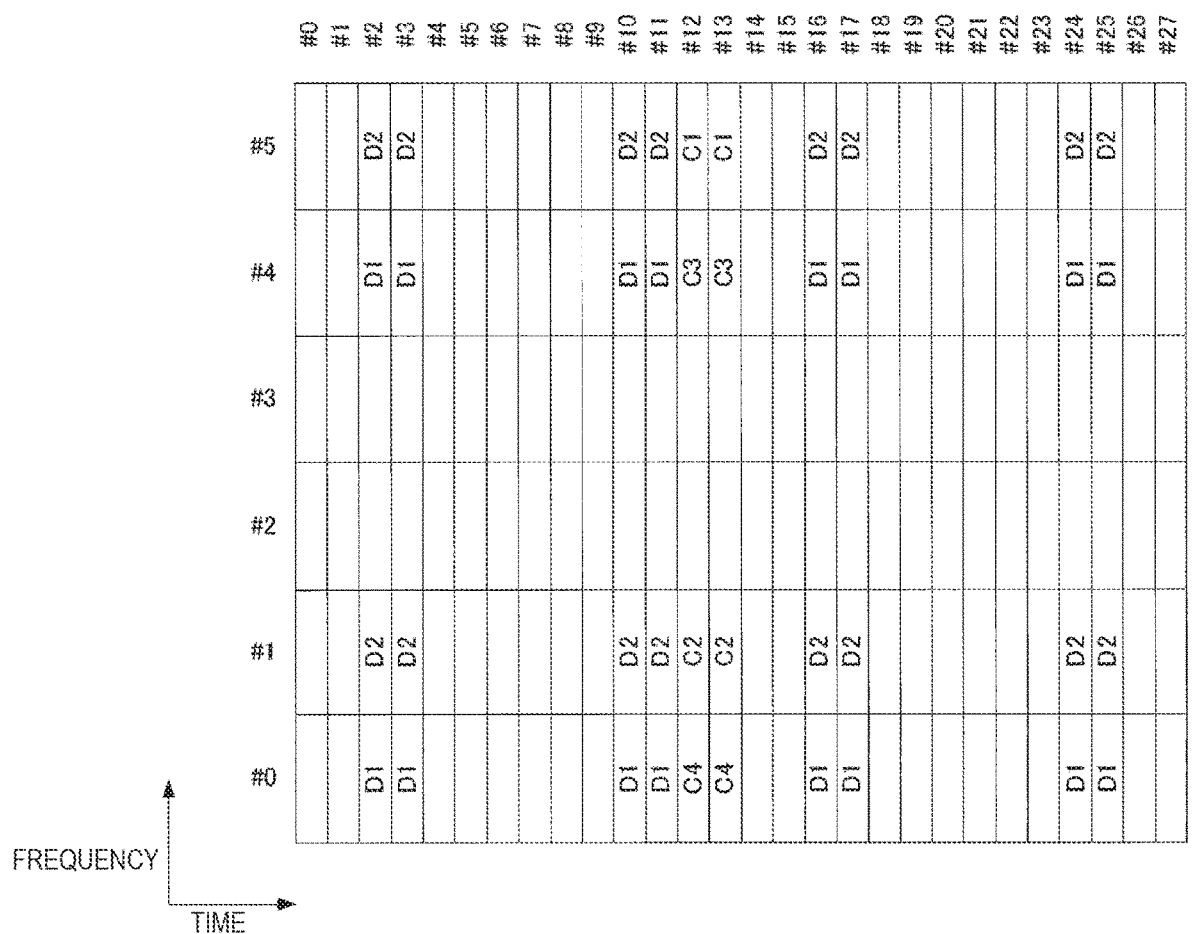
FIG. 12 is a diagram illustrating an example of downlink resource element mapping of NR according to the present embodiment.

FIG. 12 is a diagram illustrating an example of the downlink resource element mapping of NR according to the present embodiment. FIG. 12 illustrates a set of resource elements in the predetermined resources in a case in which parameter set 1 is used. The predetermined resources illustrated in FIG. 12 are resources formed by the same time length and frequency bandwidth as one resource block pair in LTE.

In the example of FIG. 12, the predetermined resources include 28 OFDM symbols indicated by OFDM symbol numbers 0 to 27 in the time direction and 6 sub carriers indicated by sub carrier numbers 0 to 6 in the frequency direction. In a case in which the system bandwidth includes the plurality of predetermined resources, sub carrier numbers are allocated throughout the system bandwidth.

Resource elements indicated by C1 to C4 indicate reference signals (CSI-RS) for measuring transmission path states of the antenna ports 15 to 22. Resource elements indicated by D1 and D2 indicate DL-DMRS of CDM group 1 and CDM group 2, respectively.

For example, in NR, reference signals equivalent to the CRS in LTE may not transmitted.

<Details of Resource Element Mapping Method of NR in Present Embodiment>

As described above, in the present embodiment, physical signals with different parameters related to the transmission signal illustrated in FIGS. 10 to 13 can be multiplexed by the FDM or the like in NR. For example, the multiplexing is performed using predetermined resources as a unit. Further, even in a case in which the base station device 1 performing scheduling or the like recognizes the multiplexing, the terminal device terminal 2 may not recognize the multiplexing. The terminal device 2 may recognize only a physical signal received or transmitted by the terminal device 2 or may not recognize a physical signal not received or transmitted by the terminal device 2.

Further, parameters related to the transmission signal can be defined, set, or specified in the mapping to the resource elements. In NR, the resource element mapping can be performed using various methods. Note that, in the present embodiment, a method of the resource element mapping of NR will be described with regard to a downlink, but the same can apply to an uplink and a sidelink.

A first mapping method related to the resource element mapping in NR is a method of setting or specifying parameters (physical parameters) related to the transmission signal in the predetermined resources.

In the first mapping method, parameters related to the transmission signal are set in the predetermined resources. The parameters related to the transmission signal set in the predetermined resources include a sub frame interval of the sub carriers in the predetermined resources, the number of sub carriers included in the predetermined resources, the number of symbols included in the predetermined resources, a CP length type in the predetermined resources, a multiple access scheme used in the predetermined resources, and/or a parameter set in the predetermined resources.

For example, in the first mapping method, a resource grid in NR can be defined with the predetermined resources.

Figure 13:
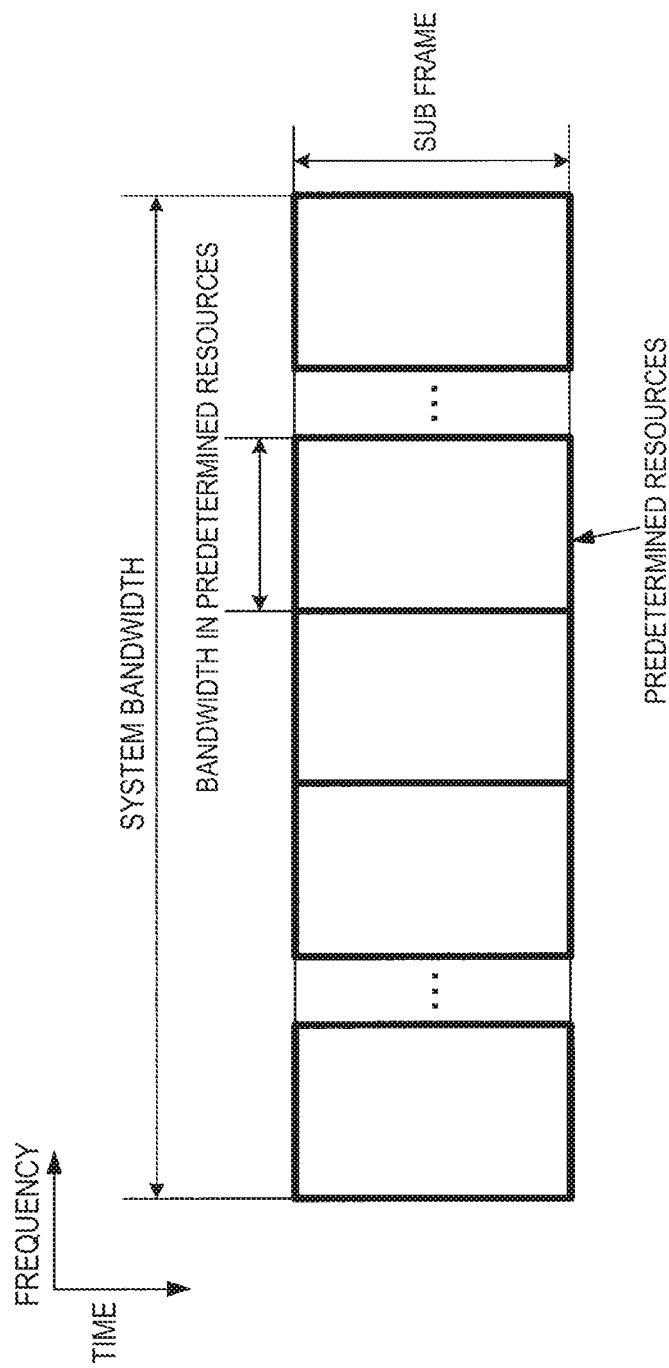
FIG. 13 is a diagram illustrating an example of resource element mapping of NR according to the present embodiment.

FIG. 13 is a diagram illustrating an example of a resource element mapping method of NR according to the present embodiment. In the example of FIG. 13, one or more predetermined resources can undergo the FDM in a predetermined system bandwidth and a predetermined time region (sub frame).

A bandwidth in the predetermined resources and/or a time length in the predetermined resources can be specified in advance. For example, a bandwidth in the predetermined resources corresponds to 180 kHz and a time length in the predetermined resources corresponds to 1 millisecond. That is, the predetermined resources correspond to the same bandwidth and time length as the resource block pair in LTE.

In addition, the bandwidth in the predetermined resources and/or the time length in the predetermined resources can be set by RRC signaling. For example, the bandwidth in the predetermined resources and/or the time length in the predetermined resources is set to be specific to the base station device 1 (cell) on the basis of information included in the MIB or the SIB transmitted via a broadcast channel or the like. Further, for example, the bandwidth in the predetermined resources and/or the time length in the predetermined resources is set to be specific to the terminal device 2 on the basis of control information specific to the terminal device 2.

In the first mapping method, the parameters related to the transmission signal set in the predetermined resources can be set by RRC signaling. For example, the parameters are set to be specific to the base station device 1 (cell) on the basis of information included in the MIB or the SIB transmitted via a broadcast channel or the like. Further, for example, the parameters are set to be specific to the terminal device 2 on the basis of control information specific to the terminal device 2.

In the first mapping method, the parameters related to the transmission signal set in the predetermined resources are set on the basis of at least one of the following methods or definitions.

(1) The parameters related to the transmission signal are set individually in each of the predetermined resources.

(2) The parameters related to the transmission signal are set individually in each group of the predetermined resources. The group of the predetermined resources is a set of the predetermined resources successive in the frequency direction. The number of predetermined resources included in the group may be specified in advance or may be set by RRC signaling.

(3) The predetermined resources in which certain parameters are set are predetermined successive resources decided on the basis of information indicating a starting predetermined resource and/or ending predetermined resource. The information can be set by RRC signaling.

(4) The predetermined resource in which a certain parameter is set is indicated by information regarding a bit map. For example, each bit included in the information regarding a bit map corresponds to the predetermined resource or a group of the predetermined resources. In a case in which the bit included in the information regarding the bit map is 1, the parameter is set in the predetermined resource or the group of the predetermined resources corresponding to the bit. The information regarding the bit map can be set by RRC signaling.

(5) In the predetermined resource to which a predetermined signal or a predetermined channel is mapped (transmitted), a parameter specified in advance is used. For example, in the predetermined resource in which a synchronization signal or a broadcast channel is transmitted, a parameter specified in advance is used. For example, the parameter specified in advance corresponds to the same bandwidth and time length as the resource block pair in LTE.

(6) In a predetermined time region including the predetermined resources in which the predetermined signals or the predetermined channels are mapped (transmitted) (that is, all the predetermined resources included in the predetermined time region), parameters specified in advance are used. For example, in a sub frame including a predetermined resource in which a synchronization signal or a broadcast channel is transmitted, a parameter specified in advance is used. For example, the parameter specified in advance corresponds to the same bandwidth and time length as the resource block pair in LTE.

(7) In a predetermined resource in which a parameter is not set, a parameter specified in advance is used. For example, in a predetermined resource in which a parameter is not set, the same parameter as the predetermined resource in which a synchronization signal or a broadcast channel is transmitted is used.

(8) In one cell (component carrier), parameters which can be set are restricted. For example, for a sub carrier interval which can be set in one cell, the bandwidth in the predetermined resources is a value which is an integer multiple of the sub carrier interval. Specifically, in a case in which the bandwidth in the predetermined resources is 180 kHz, the sub carrier interval which can be set includes 3.75 kHz, 7.5 kHz, 15 kHz, 30 kHz, and 60 kHz.

A second mapping method related to the resource element mapping in NR is a method based on sub resource elements used to define a resource element.

In the second mapping method, the sub resource elements are used to specify, set, or define a resource element corresponding to a parameter related to the transmission signal. In the second mapping method, the resource element and the sub resource element are referred to as a first element and a second element, respectively.

In other words, in the second mapping method, the parameters (physical parameters) related to the transmission signal are set on the basis of the setting related to the sub resource elements.

For example, in a predetermined resource, the number of sub resource elements or a pattern of the sub resource elements included in one resource element is set. Further, the predetermined resources can be set to be the same as the predetermined resources described in the present embodiment.

For example, in the second mapping method, a resource grid in NR can be defined with a predetermined number of sub resource elements.

Figure 14:
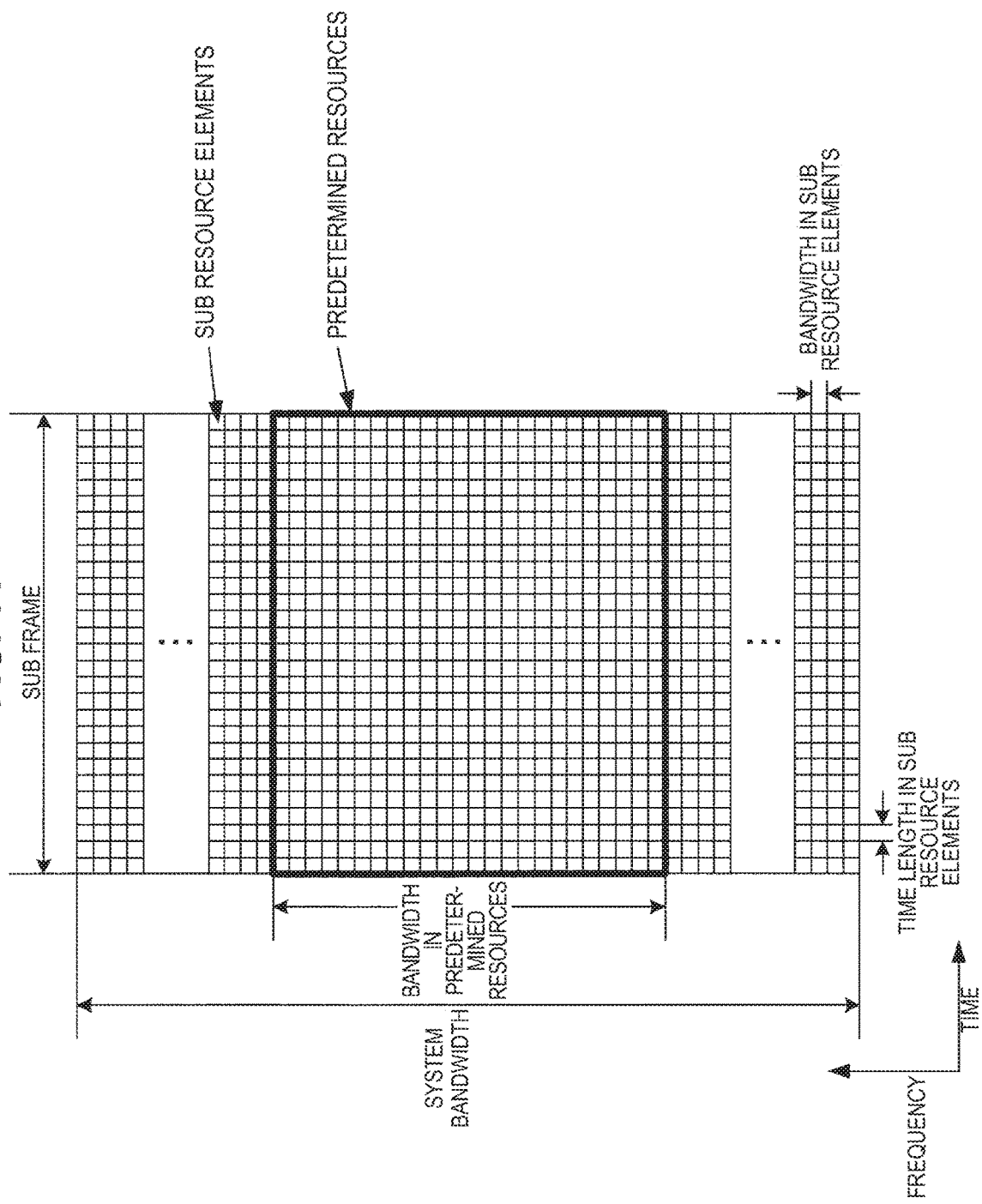
FIG. 14 is a diagram illustrating an example of a resource element mapping method of NR according to the present embodiment.

FIG. 14 is a diagram illustrating an example of a resource element mapping method of NR according to the present embodiment. In the example of FIG. 14, each predetermined resource includes 28 sub resource elements in the time direction and 24 sub resource elements in the frequency direction. That is, in a case in which the frequency bandwidth in the predetermined resources is 180 kHz, the frequency bandwidth in the sub resource elements is 7.5 kHz.

A bandwidth in the sub resource elements and/or a time length in the sub resource elements can be specified in advance. Further, for example, the sub resource elements correspond to the same bandwidth (15 kHz) and time length as the sub resource elements in LTE.

In addition, the bandwidth in the sub resource elements and/or the time length in the sub resource elements can be set by RRC signaling. For example, the bandwidth in the sub resource elements and/or the time length in the sub resource elements are set to be specific to the base station device 1 (cell) on the basis of information included in the MIB or the SIB transmitted via a broadcast channel or the like. Further, for example, the bandwidth in the sub resource elements and/or the time length in the sub resource elements is set to be specific to the terminal device 2 on the basis of control information specific to the terminal device 2. Further, in a case in which the bandwidth in the sub resource elements and/or the time length in the sub resource elements is not set, the sub resource elements can correspond to the same bandwidth (15 kHz) and time length as the sub resource elements in LTE.

In the second mapping method, the sub resource elements included in one resource element can be set on the basis of at least one of the following methods or definitions.

(1) The setting is performed individually for each predetermined resource.

(2) The setting is performed individually for each group of the predetermined resources. The group of the predetermined resources is a set of the predetermined resources successive in the frequency direction. The number of predetermined resources included in the group may be specified in advance or may be set by RRC signaling.

(3) The predetermined resources on which the setting is performed are predetermined successive resources decided on the basis of information indicating a starting predetermined resource and/or ending predetermined resource. The information can be set by RRC signaling.

(4) The predetermined resource on which the setting is performed is indicated by information regarding a bit map. For example, each bit included in the information regarding a bit map corresponds to the predetermined resource or a group of the predetermined resources. In a case in which the bit included in the information regarding the bit map is 1, the setting is performed on the predetermined resource or the group of the predetermined resources corresponding to the bit. The information regarding the bit map can be set by RRC signaling.

(5) In the predetermined resource to which a predetermined signal or a predetermined channel is mapped (transmitted), the sub resource elements included in one resource element are specified in advance. For example, in the predetermined resource in which a synchronization signal or a broadcast channel is transmitted, the sub resource elements included in one resource element are specified in advance. For example, the sub resource elements specified in advance correspond to the same bandwidth and time length as the resource elements in LTE.

(6) In a predetermined time region including the predetermined resources in which the predetermined signals or the predetermined channels are mapped (transmitted) (that is, all the predetermined resources included in the predetermined time region), the sub resource elements included in one resource element are specified in advance. For example, in a predetermined time region including the predetermined resources in which a synchronization signal or a broadcast channel is transmitted, the sub resource elements included in one resource element are specified in advance. For example, the sub resource elements specified in advance correspond to the same bandwidth and time length as the resource elements in LTE.

(7) In the predetermined resources in which the setting is not performed, the sub resource elements included in one resource element are specified in advance. For example, in the predetermined resources in which the setting is not performed, the sub resource elements included in one resource element are the same sub resource elements used in the predetermined resource in which a synchronization signal or a broadcast channel is transmitted.

(8) The setting is the number of sub resource elements included in one resource element. The number of sub resource elements included in one resource element in the frequency direction and/or the time direction is set. For example, the sub resource elements are considered to be set as in FIG. 14. In a case in which 1 resource element includes 2 sub resource elements in the frequency direction and 2 sub resource elements in the time direction in the predetermined resource, the predetermined resource includes 12 sub carriers and 14 symbols. This configuration (setting) is the same as the number of sub carriers and the number of symbols included in the resource block pair in LTE and is suitable for a use case of eMBB. Further, in a case in which 1 resource element includes 4 sub resource elements in the frequency direction and 1 sub resource element in the time direction in the predetermined resource, the predetermined resource includes 6 sub carriers and 28 symbols. This configuration (setting) is suitable for a use case of URLLC. Further, in a case in which 1 resource element includes 1 sub resource element in the frequency direction and 4 sub resource elements in the time direction in the predetermined resource, the predetermined resource includes 24 sub carriers and 7 symbols. This configuration (setting) is suitable for a use case of mMTC.

(9) The number of sub resource elements included in one resource element described in the foregoing (8) is patterned in advance and information (an index) indicating the pattern is used for the setting. The pattern can include a CP length type, definition of the sub resource elements, a multiple access scheme, and/or a parameter set.

(10) In one cell (component carrier) or one time region (sub frame), the number of sub resource elements included in one resource element is constant. For example, in one cell or one time region, all the number of sub resource elements included in one resource element is 4 as in the example described in the foregoing (8). That is, in the example, it is possible to configure the resource element of the bandwidth and the time length in which the number of sub resource elements included in one resource element is 4.

Note that in the description of the present embodiment, the predetermined resource has been used for the resource element mapping in a downlink, an uplink, or a sidelink in NR, as described above. However, the present disclosure is not limited thereto. The predetermined resource may be used for resource element mapping in two or more links among a downlink, an uplink, and a sidelink.

For example, the predetermined resource is used for resource element mapping in the downlink, the uplink, and the sidelink. In a certain predetermined resource, a predetermined number of front symbols is used for resource element mapping in the downlink. In the predetermined resource, a predetermined number of rear symbols is used for resource element mapping in the uplink. In the predetermined resource, a predetermined number of symbols between the predetermined number of front symbols and the predetermined number of rear symbols may be used for a guard period. In the predetermined resource, with regard to the predetermined number of front symbols and the predetermined number of rear symbols, the same physical parameters may be used or independently set physical parameters may be used.

Note that in the description of the present embodiment, the downlink, the uplink, and the sidelink have been described as the independently defined links in NR, but the present disclosure is not limited thereto. The downlink, the uplink, and the sidelink may be defined as a common link. For example, the channels, the signals, the processes, and/or the resources and the like described in the present embodiment are defined irrespective of the downlink, the uplink, and the sidelink. In the base station device 1 or the terminal device 2, the channels, the signals, the processes, and/or the resource, and the like are decided on the basis of the setting specified in advance, the setting by RRC signaling, and/or the control information in the physical layer. For example, in the terminal device 2, channels and signals which can be transmitted and received are decided on the basis of setting form the base station device 1.

<Frame Configuration of NR in Present Embodiment>

Figure 15:
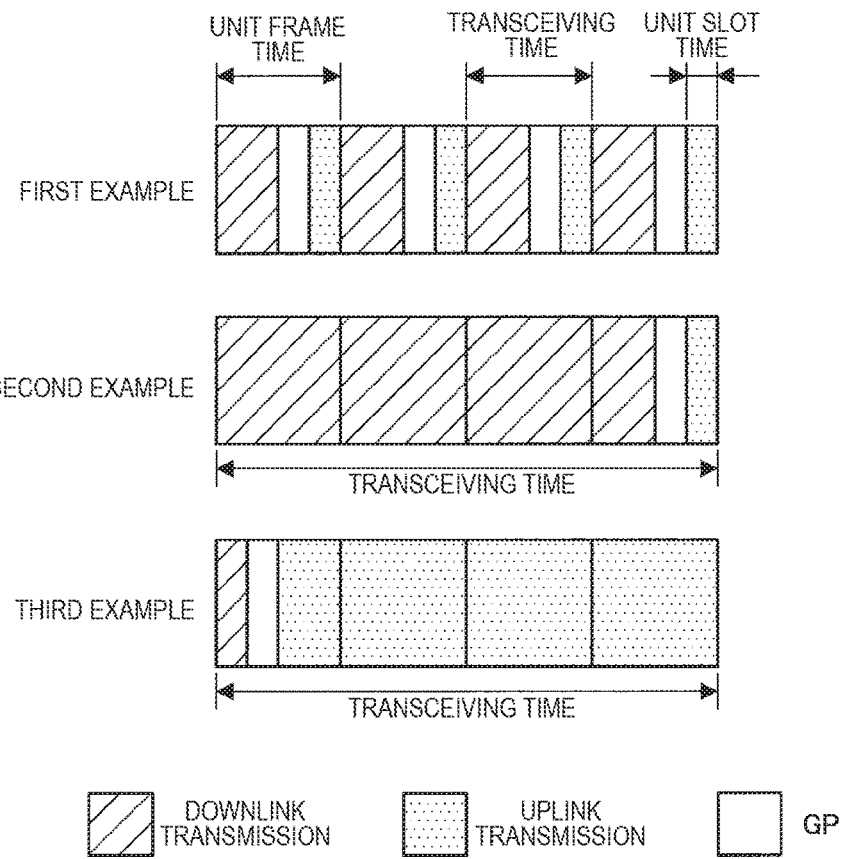
FIG. 15 is a diagram illustrating an example of a frame configuration of self-contained transmission according to the present embodiment.

In NR, a physical channel and/or a physical signal can be transmitted by self-contained transmission. FIG. 15 illustrates an example of a frame configuration of the self-contained transmission in the present embodiment. In the self-contained transmission, single transceiving includes successive downlink transmission, a guard period (GP), and successive downlink transmission from the head in that order. The successive downlink transmission includes at least one piece of downlink control information and the DMRS. The downlink control information gives an instruction to receive a downlink physical channel included in the successive downlink transmission and to transmit an uplink physical channel included in the successive uplink transmission. In a case in which the downlink control information gives an instruction to receive the downlink physical channel, the terminal device 2 attempts to receive the downlink physical channel on the basis of the downlink control information. Then, the terminal device 2 transmits success or failure of reception of the downlink physical channel (decoding success or failure) by an uplink control channel included in the uplink transmission allocated after the GP. On the other hand, in a case in which the downlink control information gives an instruction to transmit the uplink physical channel, the uplink physical channel transmitted on the basis of the downlink control information is included in the uplink transmission to be transmitted. In this way, by flexibly switching between transmission of uplink data and transmission of downlink data by the downlink control information, it is possible to take countermeasures instantaneously to increase or decrease a traffic ratio between an uplink and a downlink. Further, by notifying of the success or failure of the reception of the downlink by the uplink transmission immediately after the success or failure of reception of the downlink, downlink communication with low delay can be realized.

A unit slot time is a minimum time unit in which downlink transmission, a GP, uplink transmission, or sidelink transmission is defined. The unit slot time is reserved for one of the downlink transmission, the GP, the uplink transmission, or the sidelink transmission. In the unit slot time, both a predetermined downlink transmission and a predetermined uplink transmission can be included. For example, a certain unit slot time includes a certain downlink transmission and an uplink transmission for an HARQ-ACK in response to the downlink transmission. The unit slot time may be a minimum transmission time of a channel associated with the DMRS included in the unit slot time. One unit slot time is defined as, for example, an integer multiple of a sampling interval ($T_s$) or the symbol length of NR.

The unit frame time may be a minimum time designated by scheduling. The unit frame time may be a minimum unit in which a transport block is transmitted. The unit slot time may be a maximum transmission time of a channel associated with the DMRS included in the unit slot time. The unit frame time may be a unit time in which the uplink transmission power in the terminal device 2 is decided. The unit frame time may be referred to as a sub frame. In the unit frame time, there are three types of only the downlink transmission, only the uplink transmission, and a combination of the uplink transmission and the downlink transmission. One unit frame time is defined as, for example, an integer multiple of the sampling interval ($T_s$), the symbol length, or the unit slot time of NR.

A transceiving time is one transceiving time. A time (a gap) in which neither the physical channel nor the physical signal is transmitted may occupy between one transceiving and another transceiving. The terminal device 2 may not average the CSI measurement between different transceiving. The transceiving time may be referred to as TTI. One transceiving time is defined as, for example, an integer multiple of the sampling interval ($T_s$), the symbol length, the unit slot time, or the unit frame time of NR.

Further, as in the second example and the third example of FIG. 15, the successive downlink transmission and the successive uplink transmission may be collectively scheduled with one control channel or may be individually scheduled with a control channel transmitted within each unit frame time. Further, in any case, the control channel can include a time length of the downlink transmission, a time length of the uplink transmission, and/or a time length of the GP. Further, the control channel can include information regarding a timing of the uplink transmission for the HARQ-ACK in response to a certain downlink transmission.

2. DRONE

<2.1. Use Cases>

Various use cases of a drone are considered. Hereinafter, examples of representative use cases will be described.

Entertainment

For example, a use case in which a bird's-eye view photo, moving image, or the like is captured by mounting a camera on a drone is considered. In recent years, it has become possible to easily perform photographing from viewpoint at which photographing was difficult before, such as dynamic photographing of sports events or the like from the ground.

Transportation

For example, a use case in which luggage is transported with a drone is considered. There is already a movement for starting a service introduction.

Public Safety

For example, a use case such as surveillance, criminal tracking, or the like is considered. Previously, there was also a movement for starting a service introduction.

Informative

For example, a use case in which information is provided using a drone is considered. Research and development of a drone base station which is a drone operating as a base station are already being carried out. The drone base station can provide a wireless service to an area in which it is difficult to build an Internet circuit by providing the wireless service from the sky.

Sensing

For example, a use case of measurement performed using a drone is considered. Since measurement previously performed by humans can now also be performed collectively by a drone, efficient measurement can be performed.

Worker

For example, a use case in which a drone is used as a labor force is considered. For example, utilization of a drone for pesticide spraying or pollination in a variety of areas of the agricultural industry is expected.

Maintenance

For example, a use case in which maintenance is performed using a drone is considered. By using a drone, it is possible to perform maintenance of a location such as the back of a bridge in which it is difficult for humans to perform validation.

<2.2. Wireless Communication>

Utilization of a drone in the various cases has been examined above. In order to realize such use cases, various technical requests are imposed on the drone. Of the technical requests, communication can be exemplified particularly as an important request. Since a drone flies freely in 3-dimensional space, using wired communication is unrealistic and using wireless communication is assumed. Note that control (that is, remote manipulation) of a drone, supply of information from a drone, and the like are considered as purposes of the wireless communication.

Communication by a drone is also referred to as drone to X (D2X) in some cases. Communication partners of a drone in the D2X communication are considered to be, for example, another drone, a cellular base station, a Wi-Fi (registered trademark) access point, a television (TV) tower, a satellite, a road side unit (RSU), and a human (or a device carried by a human), and the like. A drone can be remotely manipulated via device to device (D2D) communication with a device carried by a human. Further, a drone can also be connected to a cellular system or Wi-Fi for communication. In order to further broaden coverage, a drone may be a connected to a network in which a broadcast system such as TV is used or a network in which satellite communication is used, for communication. In this way, forming various communication links in a drone is considered.

<2.3. Technical Problem>

In general, in cellular communication, in order for a base station device and a terminal device to efficiently perform wireless communication, the base station device preferably controls radio resources efficiently. Therefore, in LTE or the like of the related art, the terminal device reports (that is, feeds back) measurement information of a transmission path with the base station device and/or terminal device state information to the base station device. Then, the base station device controls the radio resources on the basis of the information reported from the terminal device.

However, a structure for the feedback control performed in the past cellular communication has been designed on the premise that a terminal device is used on the ground or in a building, that is, a terminal device is used in 2-dimensional space. In other words, the structure for the feedback control performed in the past cellular communication may not be said to be appropriate for a drone which flies freely in 3-dimensional space. Hereinafter, this point will be described in detail with reference to FIG. 16.

Figure 16:
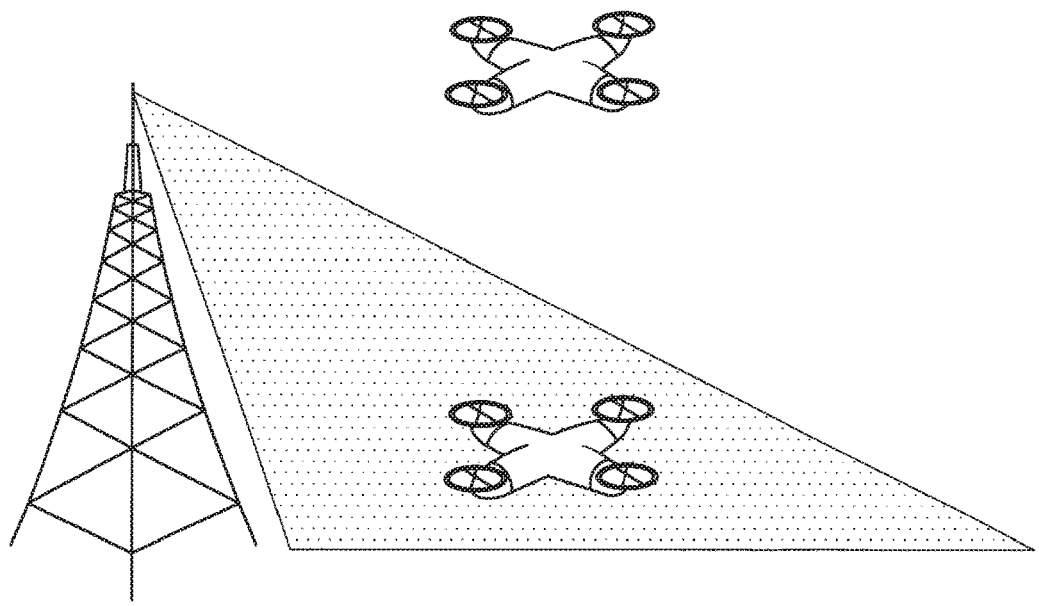
FIG. 16 is an explanatory diagram illustrating a technical problem according to the present embodiment.

FIG. 16 is an explanatory diagram illustrating a technical problem according to the present embodiment. As illustrated in FIG. 16, a base station device in cellular communication is designed so that radio waves sent out from an antenna are oriented downward. Therefore, a drone which flies at a low altitude can perform wireless communication, but it may be difficult for a drone flying at a high altitude to perform wireless communication. Therefore, in a case in which the drone performs cellular communication in a wireless communication system of the related art, it is difficult to efficiently transmit data and use cases of the drone are also restricted.

In this way, a structure in past cellular communication is not appropriate for a drone in some cases. Therefore, the structure of the cellular communication is preferably expanded for a drone. Accordingly, in the present embodiment, a structure for expanded measurement and reporting is provided for a drone serving as a terminal device to perform cellular communication.

3. CONFIGURATION EXAMPLE

3.1. Configuration Example of System

Hereinafter, an example of a configuration of a system according to the present embodiment will be described with reference to FIG. 17.

Figure 17:
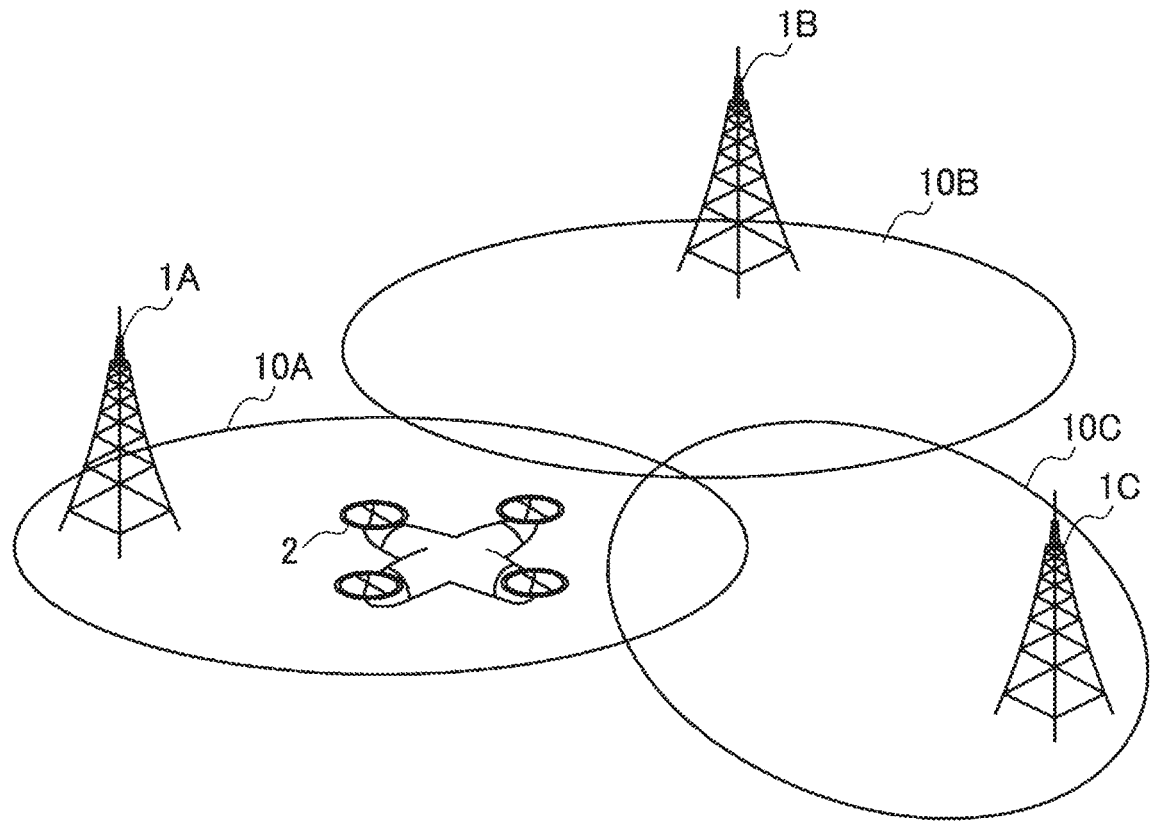
FIG. 17 is an explanatory diagram illustrating an example of a configuration of a system according to the present embodiment.

FIG. 17 is an explanatory diagram illustrating an example of a configuration of a system according to the present embodiment. As illustrated in FIG. 17, the system according to the present embodiment includes the base station devices 1 and the terminal device 2. As illustrated in FIG. 17, the terminal device 2 according to the embodiment is a drone. Hereinafter, the terminal device 2 is referred to as the drone 2. The base station devices 1 and the drone 2 support cellular communication including LTE and NR, as described above. The base station devices 1A, 1B, and 1C operate cells 10A, 10B, and 10C, respectively, and provide wireless communication services to the drone 2 in the cells. The drone 2 is connected to the base station devices 1 and performs wireless communication. For example, the drone 2 can transmit and receive data in real time in broad coverage provided by cellular communication and can be controlled for an autonomous flight by performing the cellular communication.

3.2. Detailed Configuration Example of Each Device

Next, more detailed configuration examples of the base station devices 1 and the terminal device 2 according to the present embodiment will be described with reference to FIGS. 18 and 19.

Figure 18:
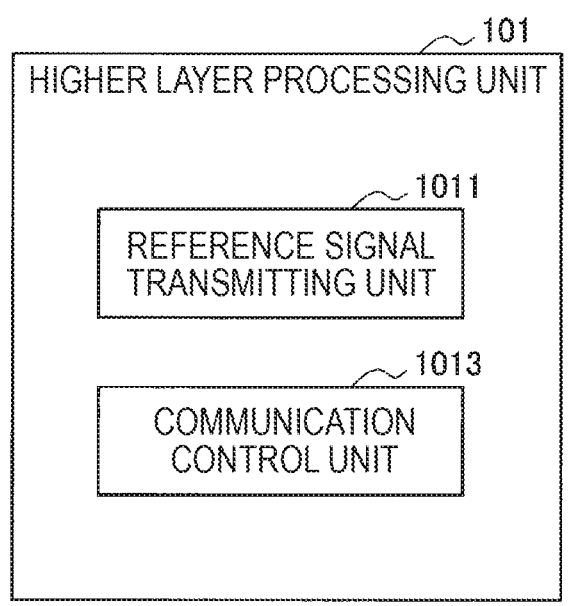
FIG. 18 is a block diagram illustrating an example of a logical configuration of a higher layer processing unit of a base station device according to the embodiment.

FIG. 18 is a block diagram illustrating an example of a logical configuration of the higher layer processing unit 101 of the base station device 1 according to the embodiment. As illustrated in FIG. 18, the higher layer processing unit 101 of the base station device 1 according to the embodiment includes a reference signal transmitting unit 1011 and a communication control unit 1013. The reference signal transmitting unit 1011 has a function of controlling the downlink reference signal generating unit 1079 and transmits a reference signal to the drone 2. The communication control unit 1013 has a function of controlling communication with the drone 2. The functions of the reference signal transmitting unit 1011 and the communication control unit 1013 will be described in detail below.

Figure 19:
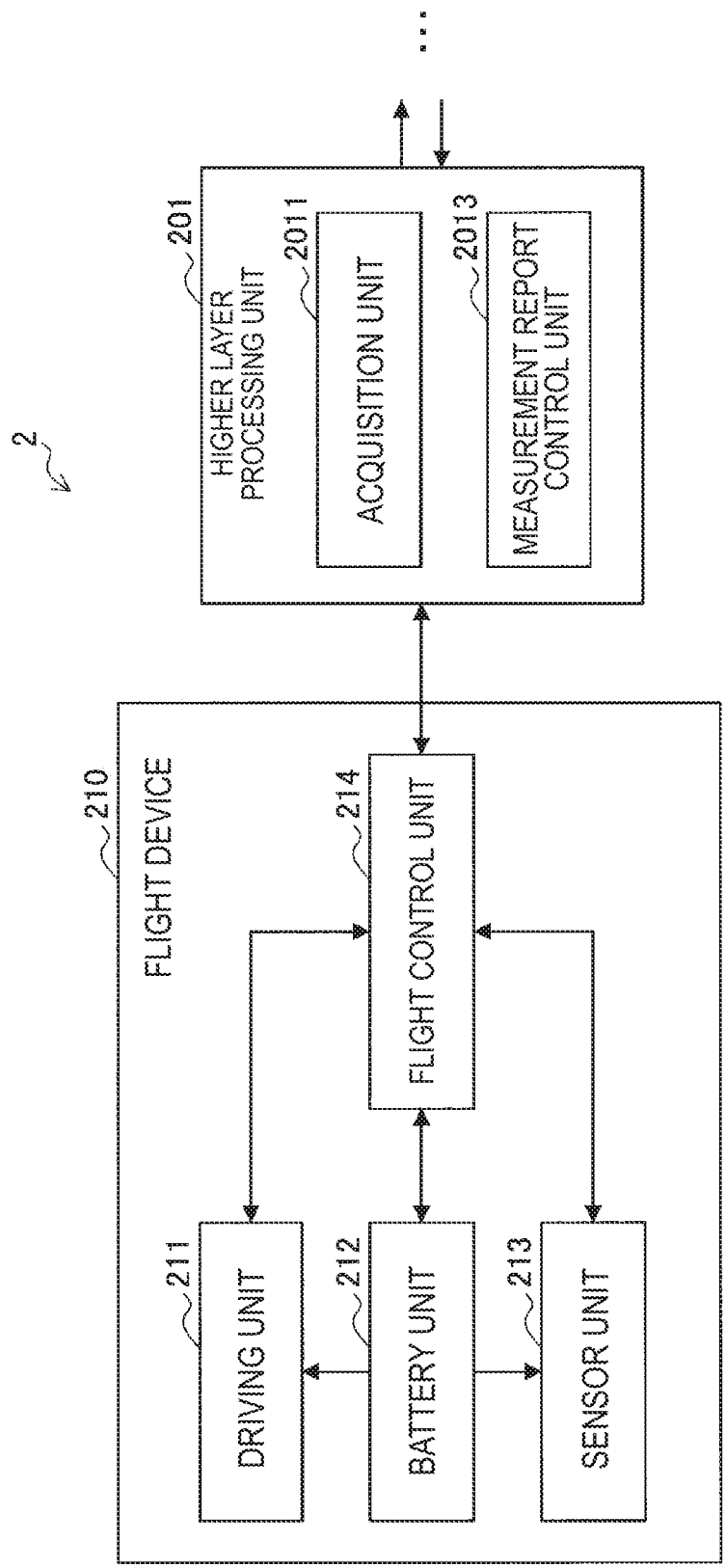
FIG. 19 is a block diagram illustrating an example of a logical configuration of a drone according to the present embodiment.

FIG. 19 is a block diagram illustrating an example of a logical configuration of the drone 2 according to the present embodiment. As illustrated in FIG. 19, the drone 2 according to the embodiment includes a flight device 210 in addition to the configuration illustrated in FIG. 9. The flight device 210 is a device that has a flight ability, that is, can fly. The flight device 210 includes a driving unit 211, a battery unit 212, a sensor unit 213, and a flight control unit 214.

The driving unit 211 performs driving for causing the drone 2 to fly. The driving unit 211 includes, for example, a motor, propeller, a transfer mechanism that transfers power of the motor to the propeller, and the like. The battery unit 212 supplies power to each constituent element of the flight device 210. The sensor unit 213 senses various kinds of information. For example, the sensor unit 213 includes a gyro sensor, an acceleration sensor, a positional information acquisition unit (for example, a signal positioning unit of the global navigation satellite system (GNSS)), an altitude sensor, a remaining battery sensor, a rotational sensor of the motor, and the like. The flight control unit 214 performs control for causing the drone 2 to fly. For example, the flight control unit 214 controls the driving unit 211 on the basis of sensor information obtained from the sensor unit 213 such that the drone 2 is caused to fly.

The higher layer processing unit 201 is connected to the flight device 210. Then, the higher layer processing unit 201 includes an acquisition unit 2011 and a measurement report control unit 2013. The acquisition unit 2011 has a function of acquiring information regarding a flight from the flight device 210. The measurement report control unit 2013 has a function of controlling a measurement report process on the basis of information regarding the flight acquired by the acquisition unit 2011. The functions of the acquisition unit 2011 and the measurement report control unit 2013 will be described in detail below.

Note that each of the higher layer processing unit 101 and the higher layer processing unit 201 may be realized as a processor, a circuit, or an integrated circuit.

4. TECHNICAL FEATURES

4.1. Overview

Figure 20:
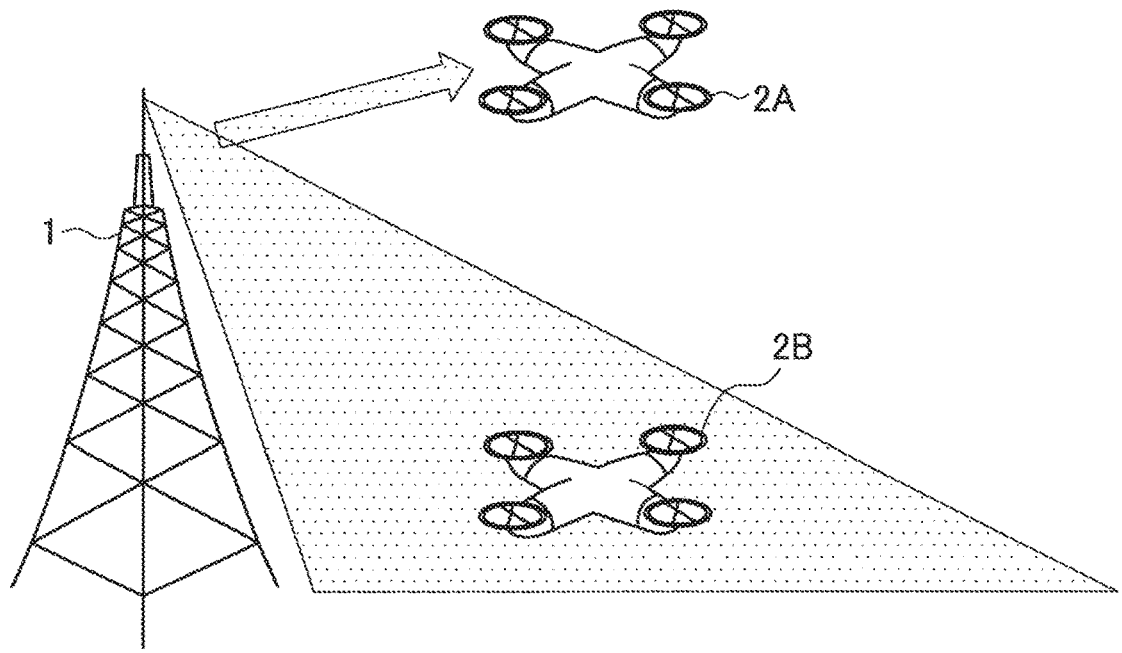
FIG. 20 is an explanatory diagram illustrating an overview of technical features according to the present embodiment.

FIG. 20 is an explanatory diagram illustrating an overview of technical features according to the present embodiment. As illustrated in FIG. 20, the base station device 1 may perform wireless communication with the drone 2A flying at a high altitude using an individually formed beam (that is, radio waves subjected to beam forming). In this way, the technical problem illustrated in FIG. 16 can be solved. On the other hand, the base station device 1 may perform radio communication with a drone 2B flying at a low altitude using radio waves of the related art oriented downward. In this way, a wireless communication method appropriate for the drone 2 can differ in accordance with an altitude at which the drone 2B flies.

The wireless communication method appropriate for the drone 2 can also differ in accordance with a circumstance other than the altitude at which the drone 2 flies. For example, the wireless communication method appropriate for the drone 2 can differ in accordance with information regarding a flight of the drone 2 (hereinafter also referred to as flight-related information), such as a battery state, a position, a flight state, or the like in addition to the altitude.

That is, it is preferable to perform wireless communication in accordance with the flight-related information of the drone 2. Accordingly, in the present embodiment, a structure of measurement and reporting in accordance with the flight-related information is provided to perform the wireless communication in accordance with the flight-related information.

Next, necessity for highly reliable communication of the drone 2 will be described.

For example, to deal with an emergency instantaneously (that is, to perform remote control) in a case in which the drone 2 flies in accordance with remote control or flies autonomously, the drone 2 can preferably perform wireless communication normally. However, for example, in a case in which the drone 2 is attached with radio interference (jamming), the remote control can be difficult. Therefore, high reliability is necessary in wireless communication with the drone 2 which flies.

Figure 21:
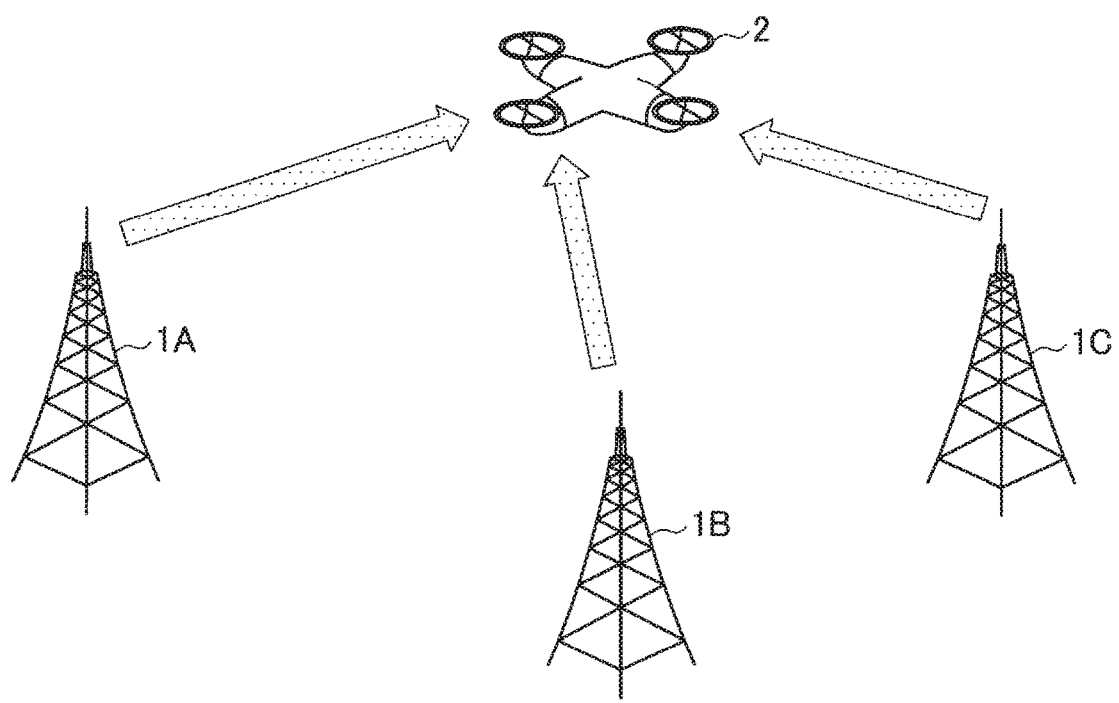
FIG. 21 is a diagram illustrating an example of wireless communication with high reliability for the drone according to the present embodiment.

FIG. 21 is a diagram illustrating an example of wireless communication with high reliability for the drone 2 according to the present embodiment. As illustrated in FIG. 21, the drone 2 may be connected to the plurality of base station devices 1 (that is, the base station devices 1A to 1C). The drone 2 can perform wireless communication with the base station devices 1A to 1C. For example, even in a case in which a failure occurs in radio waves from the base station device 1A, the drone 2 can continue the wireless communication with the base station device 1B or 1C.

The base station devices 1A to 1C may use the same frequency band (for example, a component carrier) or may use different frequency bands. In a case in which the base station devices 1A to 1C use the same frequency band, the drone 2 can perform coordinated multi-point (CoMP) communication in which the same signal is received from the base station devices 1A to 1C. Note that, in CoMP communication, the drone 2 may not recognize whether the same signal is transmitted from the base station devices 1A to 1C. Further, in a case in which the base station devices 1A to 1C use the different frequency bands, the drone 2 can perform communication by carrier aggregation or dual connectivity in which a plurality of frequency bands are set and data transmission is performed. Note that, in communication by carrier aggregation or dual connectivity, the drone 2 may not recognize that the plurality of set frequency bands correspond to the different base station devices 1.

Further, in a case in which the base station device 1 detects interference radio waves or a failure in a predetermined frequency band, the drones 2 may be informed individually or entirely of predetermined control information. The predetermined control information can include information regarding a frequency band in which the interference radio waves or the failure is detected, information regarding a frequency band in which the interference radio waves or the failure is not detected, information regarding a position of a sending source of the interference radio waves, and/or information regarding connection or handover of the frequency band in which the interference radio wave or the failure is detected. Note that the base station device 1 may detect interference radio waves or a failure in a predetermined frequency band on the basis of measurement information reported from the drone 2.

Even in the highly reliable communication, it is important for the drone 2 to be connected to each base station device 1. Accordingly, even in the highly reliable communication, it is preferable to perform wireless communication in accordance with the flight-related information of the drone 2 and it is preferable to perform measurement and report in accordance with the flight-related information.

4.2. Flight-Related Information

Hereinafter, the flight-related information which is information regarding a flight of the drone 2 will be described in detail.

The flight-related information includes information measured, detected, searched, estimated, or recognized when the drone 2 is flying. For example, the flight-related information can include altitude information regarding a flight of the drone 2, battery information regarding the flight, positional information regarding the flight, and/or state information regarding the flight. The flight-related information may include information in which a plurality of pieces of flight-related information are combined.

The altitude information regarding the flight can include information regarding an altitude at which the drone 2 is currently flying, information regarding an altitude at which the drone 2 can fly (that is, a highest altitude and a lowest altitude), and information regarding a set altitude at which the drone 2 will fly from now, and the like. For example, the base station device 1 can determine whether a beam is to be formed in accordance with the altitude information of the drone 2.

The battery information regarding the flight can include information regarding a current remaining battery of the drone 2 (that is, an amount of remaining power of the battery unit 212), information regarding a time in which the drone 2 can fly, information regarding a capacity of the battery unit 212, information regarding power consumed by the drone 2, and the like. Further, the battery information of the drone can include an absolute value such as a capacity and an amount of power, a relative value such as a remaining amount of a battery capacity, and information based on a percentage, a level obtained through predetermined calculation, or the like. For example, a report frequency of measurement information can be decreased to save battery in a case in which a remaining battery is small, or the report frequency of measurement information can be increased conversely to prevent a hazard in a case in which a remaining battery is small.

The positional information regarding the flight can include information regarding latitude and longitude, information indicating a relative position from a site such as the predetermined base station device 1 or a predetermined reference point, information indicating whether the drone is within a predetermined area, and the like. For example, the report frequency of the measurement information can be increased in a case in which the drone 2 is flying near a flight prohibition district.

The state information regarding the flight (hereinafter also referred to as flight state information) can include information indicating whether the drone 2 is flying or stopping, information indicating whether the drone 2 is in a flight by manual maneuvering or a flight by automatic maneuvering (autonomous flight), information indicating whether a propeller of the drone 2 is rotating, information indicating whether the drone 2 is grounded on the land or the like, and the like. For example, the drone 2 can increase the report frequency of the measurement information during a flight and decrease the report frequency of the measurement information during stop.

Further, the flight-related information can include information regarding precision or probability of each piece of information such as altitude information which depends on the drone 2 or an environment. For example, the precision or the probability which depends on the drone 2 includes information based on precision of the sensor unit 213 included in the drone 2. The information regarding the precision or the probability which depends on the environment includes information based on weather, temperature, a wind speed, or an atmospheric pressure.

4.3. First Embodiment

The present embodiment is a form in which whether measurement information is performed is controlled on the basis of the flight-related information. That is, the drone 2 starts (that is, triggers) a measurement process and/or a report process on the basis of the flight-related information. Specifically, the drone 2 performs predetermined measurement to generate measurement information by the trigger based on the flight-related information and/or reports (or notifies or transmits) the generated measurement information to the base station device 1.

(1) Measurement Report Process

The drone 2 (for example, the acquisition unit 2011) acquires the flight-related information from the flight device 210. Further, the drone 2 (for example, the measurement report control unit 2013) controls the measurement report process on a reference signal transmitted from the base station device 1 on the basis of the acquired flight-related information. Specifically, the drone 2 controls a measurement process of acquiring measurement information regarding the reference signal and a report process of reporting the acquired measurement information to the base station device 1 on the basis of the flight-related information. Note that a message including the measurement information transmitted from the drone 2 to the base station device 1 is also referred to as a management report message.

On the other hand, the base station device 1 (for example, the reference signal transmitting unit 1011) transmits a reference signal. The reference signal may be transmitted using radio waves oriented downward or may be transmitted using a beam formed individually setting the drone 2 of a wireless communication partner as a target, as described above with reference to FIG. 20. Note that the reference signal in which the beam is used may be transmitted to follow movement of the drone 2 or may be transmitted comprehensively in all the directions. Further, the base station device 1 (for example, the communication control unit 1013) generates setting information regarding the measurement report process and notifies the drone 2 of the setting information. Then, the base station device 1 (for example, the communication control unit 1013) controls a process based on measurement information reported from the drone 2 which acquires the flight-related information and performs the measurement report process on the reference signal on the basis of the acquired flight-related information. Note that the process based on the measurement information of a control target includes control of radio resources used for communication with the drone 2, selection of a channel, setting of an encoding ratio, and the like.

(2) Measurement Information

Hereinafter, a specific example of information which can be included in the measurement information regarding the reference signal reported in the measurement report process by the drone 2 will be described.

The measurement information can include information for radio resource management. The information for radio resource management can include, for example, radio resource management (RRM) information in LTE. For example, the RRM information can include reference signal received power (RSRP), a received signal strength indicator (RSSI), reference signal received quality (RSRQ), a signal to noise power ratio (SNR), and/or a signal to interference and noise power ratio (SINR).

The RSRP is defined as an average value of reception power of a reference signal in a predetermined resource, and the reference signal is transmitted using the resource in a predetermined bandwidth of a measurement target. For example, the RSRP is used to measure reception power of a signal transmitted from the base station device 1 which is a transmission source of the reference signal.

The RSSI is defined as all the reception power in all the resources of a predetermined region. The RSSI is reception power for all the signals included in a resource of the measurement target and includes a signal from a serving cell (that is, the base station device 1 which is connected), a signal from a non-serving cell (that is, the base station device 1 which is not connected), adjacent channel interference, thermal noise, and the like.

The RSRQ is defined as a ratio of a value based on the above-described RSRP to a value based on the above-described RSSI. The RSRQ is used to measure quality of a signal transmitted from the base station 1 which is the transmission source of the reference signal.

The SNR is defined as a ratio of the reception power of a signal transmitted from the base station device 1 to noise power.

The SINR is defined as a ratio of the reception power of a signal transmitted from the base station device 1 to interference power and noise power.

Further, the measurement information can include channel state information. The channel state information can include, for example, channel state information (CSI) information in LTE. For example, the CSI information can include a channel quality indicator (CQI), a precoding matrix indicator (PMI), a precoding type indicator (PTI), a rank indicator (RI), and/or a CSI-RS resource inductor (CRI).

The CSI is generated on the basis of a predetermined reference signal. For example, the drone 2 measures a transmission path state using the reference signal set or notified of from the base station device 1 and generates the CSI on the basis of the measured transmission path state. The reference signal for generating the CSI includes a common reference signal (CRS) which is a reference signal transmitted cell-specifically, a channel state information-reference signal (CSI-RS) set to be specific to a terminal device to measure the CSI. Moreover, in the generation of the CSI, a channel state information-interference measurement (CSI-IM) which is a resource for measuring interference power and noise power may be further set and used.

Further, in the CSI, a plurality of processes can be simultaneously set. A process related to the CSI is also referred to as a CSI process. For example, the CSI processes can correspond to the CSI for the different base station devices 1 and the CSI for different beams.

The RI indicates the number of transmission layers (for example, the number of ranks or the number of space multiplexes).

The PMI is information indicating a precoding matrix which is specified in advance. The PMI indicates one precoding matrix using one piece of information or two pieces of information. The PMIs in a case in which two pieces of information are referred to as a first PMI and a second PMI.

The CQI is information indicating a combination of an encoding ratio and a modulation scheme which is specified in advance. The drone 2 reports the CQI satisfying predetermined reception quality for each transport block (for example, a codeword).

The CRI is information indicating one CSI-RS resource (for example, a single instance) selected from the CSI-RS resources in a case in which two or more CSI-RS resources are set in one CSI process. The drone 2 reports information indicating the CSI-RS resource recommended to the base station device 1.

Note that the measurement information can include a variety of pieces of information in addition to the foregoing information. For example, the measurement information can include a cell ID associated with the reference signal.
(3) Trigger The drone 2 (for example, the measurement report control unit 2013) can report the measurement information on the basis of a variety of triggers. For example, the drone 2 reports the measurement information to the base station device 1 on the basis of whether a predetermined condition is satisfied. This can also be ascertained as being switched between whether the drone 2 performs the measurement process and/or the report process on the basis of whether the predetermined condition is satisfied. Specifically, the drone 2 controls whether the measurement information is reported to the base station device 1 on the basis of a comparison result of a threshold and a value based on predetermined information. This threshold is also referred to as a trigger threshold below. Hereinafter, a specific example of the trigger will be described.

First Example

For example, the predetermined information related to the trigger may be flight-related information. That is, the drone 2 may report the measurement information to the base station device 1 on the basis of whether the flight-related information satisfies the predetermined condition (that is, the comparison result of the trigger threshold and the value based on the flight-related information). For example, the drone 2 starts the measurement process and the report process in a case in which a predetermined condition such as a condition in which the value based on the flight-related information is greater than the trigger threshold or less than the trigger threshold is satisfied. Specifically, the drone 2 may start the measurement process and the report process in a case in which a current altitude exceeds a threshold of an altitude. Note that the value based on the flight-related information may be the flight-related information or may be a value processed (for example, statistically processed or the like) on the basis of the flight-related information.

Further, the trigger threshold may be set on the basis of at least an instruction from the base station device 1. For example, the base station device 1 may transmit setting information indicating the trigger threshold to be set to the drone 2. Further, the base station device 1 may transmit a parameter for deciding the trigger threshold to be set to the drone 2 and the drone 2 may set the trigger threshold on the basis of the parameter.

Hereinafter, an example of a flow of a process related to a first example will be described with reference to FIG. 22.

Figure 22:
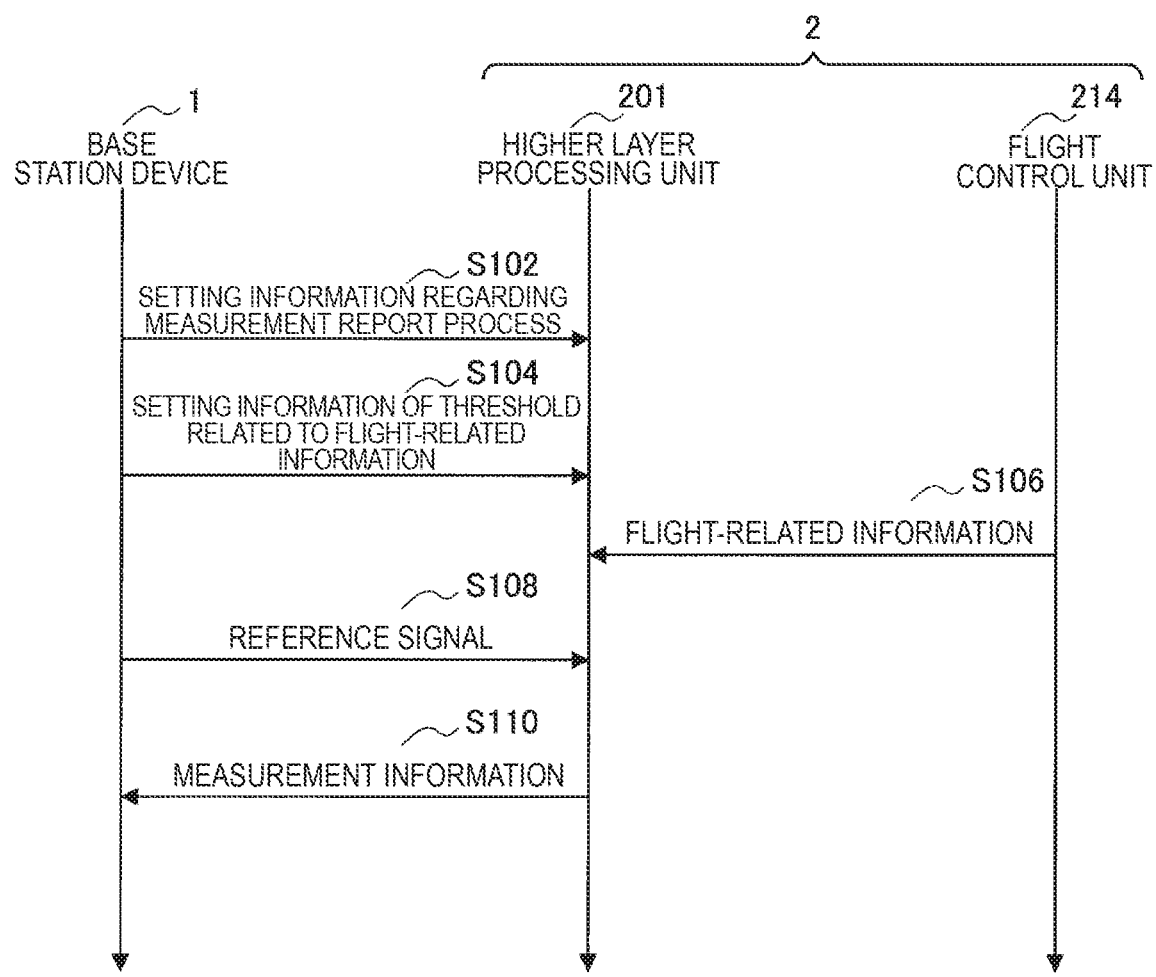
FIG. 22 is a sequence diagram illustrating an example of a flow of a first example of a measurement report process performed in a system according to the present embodiment.

FIG. 22 is a sequence diagram illustrating an example of the flow of the first example of the measurement report process performed in the system according to the present embodiment. The base station device 1 and the drone 2 are involved in this sequence. Note that in FIG. 22, the higher layer processing unit 201 and the flight control unit 214 are separately illustrated to clarify exchange of information in the drone 2. Note that a process performed by the higher layer processing unit 201 can include not only a process related to a higher layer but also a process of a physical layer.

As illustrated in FIG. 22, the base station device 1 first transmits the setting information regarding the measurement report process to the drone 2 (step S102). The setting information regarding the measurement report process can include, for example, information regarding a reference signal to be measured, information regarding a report method, and the like. Subsequently, the base station device 1 transmits the setting information of the threshold (that is, the trigger threshold) regarding the flight-related information to the drone 2 (step S104). Note that the setting information of the threshold related to the flight-related information may be included in the setting information regarding the measurement report process to be transmitted. Subsequently, the higher layer processing unit 201 of the drone 2 acquires the flight-related information from the flight control unit 214 of the drone 2 (step S106). On the other hand, the base station device 1 transmits the reference signal to the drone 2 (step S108). Then, the drone 2 controls the measurement report process on the basis of whether the predetermined condition is satisfied, that is, the comparison result of the value based on the acquired flight-related information and the threshold set by the base station device 1. For example, in a case in which the predetermined condition is satisfied, the drone 2 starts the measurement process and the report process and transmits the measurement information to the base station device 1 (step S110). Conversely, in a case in which the predetermined condition is not satisfied, the drone 2 does not perform the measurement process and the report process.

Second Example

For example, the predetermined information related to the trigger may be measurement information regarding the reference signal. That is, the drone 2 may report the measurement information to the base station device 1 on the basis of whether the measurement information obtained by performing the measurement process satisfies the predetermined condition (that is, the comparison result of the trigger threshold and the value based on the measurement information). For example, the drone 2 starts the report process in the case in which the predetermined condition such as the condition in which the value based on the measurement information regarding the predetermined reference signal is greater than the trigger threshold or less than the trigger threshold is satisfied. Specifically, the drone 2 may start the report process in a case in which the RSRP regarding the predetermined reference signal exceeds the threshold related to the RSRP. In this case, the measurement information to be reported can include information (for example, a cell ID or the like) regarding the reference signal satisfying the predetermined condition.

Further, the trigger threshold may be set on the basis of at least the flight-related information. For example, the drone 2 may set the trigger threshold autonomously using a parameter based on the flight-related information. Further, the drone 2 may set the trigger threshold using two parameters, the flight-related information and the setting information regarding the trigger threshold received from the base station device 1.

Hereinafter, an example of a flow of a process related to a second example will be described with reference to FIG. 23.

Figure 23:
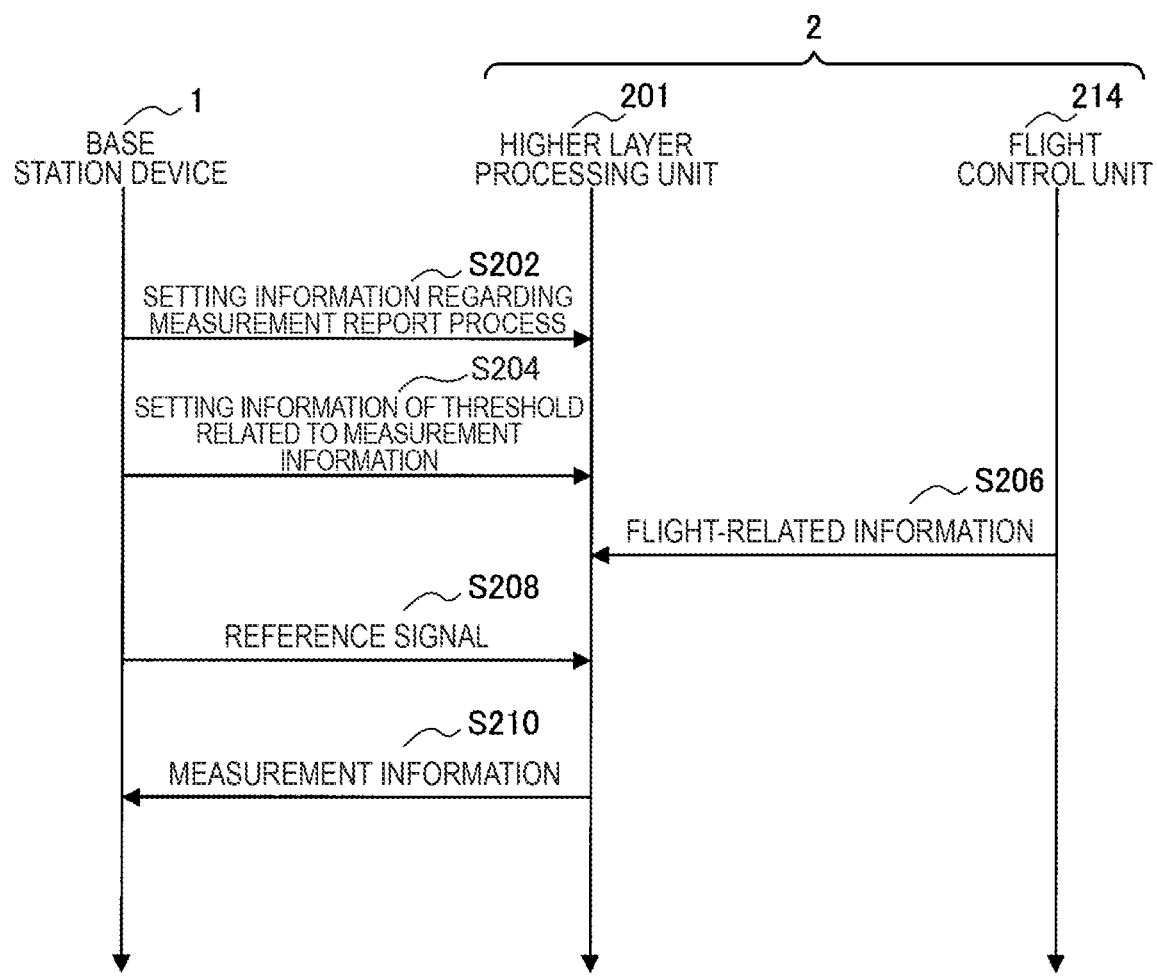
FIG. 23 is a sequence diagram illustrating an example of a flow of a second example of a measurement report process performed in a system according to the present embodiment.

FIG. 23 is a sequence diagram illustrating an example of the flow of the second example of the measurement report process performed in the system according to the present embodiment. The base station device 1 and the drone 2 are involved in this sequence. Note that in FIG. 23, the higher layer processing unit 201 and the flight control unit 214 are separately illustrated to clarify exchange of information in the drone 2. Note that a process performed by the higher layer processing unit 201 can include not only a process related to a higher layer but also a process of a physical layer.

As illustrated in FIG. 23, the base station device 1 first transmits the setting information regarding the measurement report process to the drone 2 (step S202). Subsequently, the base station device 1 transmits the setting information of the threshold (that is, the trigger threshold) related to the measurement information to the drone 2 (step S204). Note that the setting information of the threshold related to the measurement information may be included in the setting information regarding the measurement report process to be transmitted. Subsequently, the higher layer processing unit 201 of the drone 2 acquires the flight-related information from the flight control unit 214 of the drone 2 (step S206). On the other hand, the base station device 1 transmits the reference signal to the drone 2 (step S208). Then, the drone 2 controls the measurement report process on the basis of whether the measurement information obtained by performing the measurement process satisfies the predetermined condition, that is, the comparison result of the value based on the measurement information and the trigger threshold set on the basis of at least flight-related information. For example, in a case in which the predetermined condition is satisfied, the drone 2 starts the report process and transmits the measurement information to the base station device 1 (step S210). Conversely, in a case in which the predetermined condition is not satisfied, the drone 2 does not perform the report process.

Third Example

In a third example, the trigger threshold in the second example is set by the base station device 1 rather than the drone 2. In this example, the base station device 1 (for example, the communication control unit 1013) generates the setting information regarding the measurement report process on the basis of the flight-related information received from the drone 2 and notifies the drone 2 of the setting information. In particular, the setting information relates to a trigger for reporting the measurement information.

Specifically, the base station device 1 decides the trigger threshold on the basis of at least the flight-related information acquired from the drone 2 and transmits the setting information including information indicating the decided trigger threshold to the drone 2. Then, the drone 2 sets the trigger threshold decided by the base station device 1 and controls whether the report process is performed on the basis of the measurement information obtained by performing the measurement process. That is, the drone 2 reports the measurement information to the base station device 1 on the basis of whether the measurement information obtained by performing the measurement process satisfies the predetermined condition (that is, the comparison result of the trigger threshold and the value based on the measurement information). For example, the drone 2 starts the report process in the case in which the predetermined condition such as the condition in which the value based on the measurement information regarding the predetermined reference signal is greater than the trigger threshold or less than the trigger threshold is satisfied. Specifically, the drone 2 may start the report process in a case in which the RSRP regarding the predetermined reference signal exceeds the threshold related to the RSRP decided by the base station device 1. In this case, the measurement information to be reported can include information (for example, a cell ID or the like) regarding the reference signal satisfying the predetermined condition.

Hereinafter, an example of a flow of a process related to the third example will be described with reference to FIG. 24.

Figure 24:
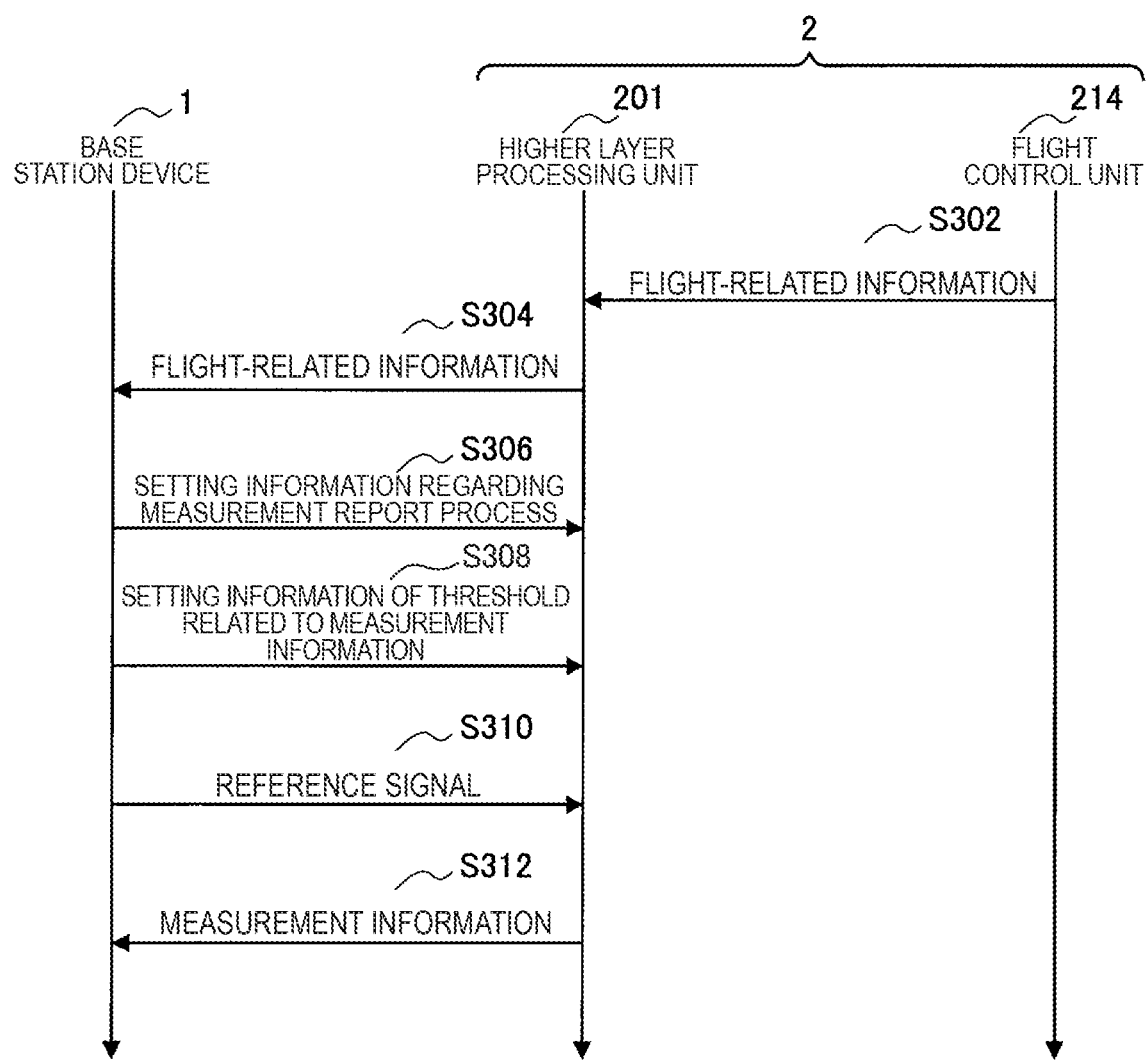
FIG. 24 is a sequence diagram illustrating an example of a flow of a third example of a measurement report process performed in a system according to the present embodiment.

FIG. 24 is a sequence diagram illustrating an example of the flow of the third example of the measurement report process performed in the system according to the present embodiment. The base station device 1 and the drone 2 are involved in this sequence. Note that in FIG. 24, the higher layer processing unit 201 and the flight control unit 214 are separately illustrated to clarify exchange of information in the drone 2. Note that a process performed by the higher layer processing unit 201 can include not only a process related to a higher layer but also a process of a physical layer.

As illustrated in FIG. 24, the higher layer processing unit 201 of the drone 2 acquires the flight-related information from the flight control unit 214 of the drone 2 (step S302). Subsequently, the drone 2 transmits the flight-related information to the base station device 1 (step S304). Subsequently, the base station device 1 transmits the setting information regarding the measurement report process to the drone 2 (step S306). Further, the base station device 1 transmits the setting information of the threshold (that is, the trigger threshold) related to the measurement information and decided on the basis of the flight-related information received from the drone 2 to the drone 2 (step S308). Note that the setting information of the threshold related to the measurement information may be included in the setting information regarding the measurement report process to be transmitted. Further, the base station device 1 transmits the reference signal to the drone 2 (step S310). Then, the drone 2 controls the measurement report process on the basis of whether the measurement information obtained by performing the measurement process satisfies the predetermined condition, that is, the comparison result of the value based on the measurement information and the trigger threshold decided by the base station device 1. For example, in a case in which the predetermined condition is satisfied, the drone 2 starts the report process and transmits the measurement information to the base station device 1 (step S312). Conversely, in a case in which the predetermined condition is not satisfied, the drone 2 does not perform the report process.

(4) Report Method

Various report methods of a case in which the drone 2 reports the measurement information on the basis of the trigger are considered.

For example, the measurement information may be reported using a predetermined uplink channel.

The predetermined uplink channel used to report the measurement information may be one uplink channel allocated by the base station device 1. Specifically, in a case in which the drone 2 reports the measurement information on the basis of the trigger, the drone 2 first transmits a scheduling request (SR) using a predetermined PUCCH to request the base station device 1 to allocate a PUSCH. Subsequently, the base station device 1 allocates the PUSCH to the drone 2 on the basis of the received SR. Then, the drone 2 reports the measurement information using the allocated PUSCH. According to this method, since the base station device 1 allocates the resources as necessary, unnecessary resources are not generated and frequency use efficiency can be improved.

The predetermined uplink channel used to report the measurement information may be an uplink channel allocated to a semi-persistent. In other words, the predetermined uplink channel used to report the measurement information may be a plurality of uplink channels allocated periodically by the base station device 1. Specifically, the base station device 1 periodically allocates a plurality of PUSCHs for reporting the measurement information at a predetermined interval. The drone 2 reports the measurement information using the allocated PUSCHs. According to this method, since the base station device 1 may not transmit the PDCCHs for allocating the PUSCHs, an overhead of downlink control information can be caused to be reduced and a delay until report of the measurement information can be caused to be reduced.

The predetermined uplink channel used to report the measurement information may be an uplink channel selected by the drone 2 (for example, the measurement report control unit 2013) from a resource pool allocated by the base station device 1. Specifically, the base station device 1 first sets the resource pool formed by resources which can be selected as the PUSCHs for reporting the measurement information in the drone 2. Then, the drone 2 reports the measurement information using the resource selected on the basis of a predetermined method from the set resource pool as the PUSCHs. The base station device 1 can set the same resource pool in the plurality of drones 2 (or the drones 2 and the terminal devices 2 which do not include the flight devices 210). Here, in a case in which the PUSCHs selected between the plurality of drones 2 collide, the base station device 1 can receive the measurement information from each drone 2 by performing interference cancellation. Further, as a method of causing interference caused due to collision of the PUSCHs between the plurality of drones 2 to be reduced, a code or an interleaver specific to each drone 2 is considered to be applied. According to the method of using the resource pool, since the base station device 1 may not transmit the PDCCHs for allocating the PUSCHs, an overhead of downlink control information can be caused to be reduced and a delay until report of the measurement information can be caused to be reduced. Further, since the resources can be shared between the plurality of drones 2, an improvement in the frequency use efficiency can also be realized. Note that using the resource pool can also be referred to as Grant-free.

4.4. Second Embodiment

The present embodiment is a form in which content of the measurement report process is controlled on the basis of the flight-related information. That is, the drone 2 selects (that is, switches) the content of the measurement report process on the basis of the flight-related information.

(1) Selection Standard

The drone 2 (for example, the measurement report control unit 2013) performs a measurement report process selected on the basis of the flight-related information. Specifically, the drone 2 performs the measurement report process selected on the basis of the flight-related information from a plurality of measurement report processes of selection candidates. For example, whether one of a first measurement report process and a second measurement report process is performed may be switched on the basis of whether the flight-related information satisfies the predetermined condition. Whether the flight-related information satisfies the predetermined condition may mean, for example, a comparison result of a threshold and a value based on the flight-related information. The threshold is also referred to as a switching threshold below. Note that the number of measurement report processes of the selection candidates is 3 or more. In this case, two or more switching thresholds may be set.

Here, an selection entity of the measurement report process may be the base station device 1 or may be the drone 2, as will be described below. The description will be made below assuming the drone 2 as the selection entity, but similar description will be made even in a case in which the base station device 1 serves as the selection entity.

For example, the drone 2 may select a measurement report process to be performed on the basis of the altitude information. Specifically, the drone 2 may select the first measurement report process in a case in which an altitude of the drone 2 is less than the switching threshold, and may select the second measurement report process in a case in which the altitude of the drone 2 is equal to or greater than the switching threshold. Thus, the drone 2 obeys, for example, a rule or the like in which the measurement process and/or the report process is restricted in accordance with the altitude. Further, the drone 2 can select a more detailed measurement report process at a low altitude at which a collision risk is considered to be relatively high, and can also select a measurement report process in power consumption is low at a high altitude at which the collision risk is considered to be relatively low.

For example, the drone 2 may select the measurement report process to be performed on the basis of the battery information. Specifically, the drone 2 may select the first measurement report process in a case in which the remaining battery is less than the switching threshold, and may select the second measurement report process in a case in which the remaining battery is equal to or greater than the switching threshold. Thus, the drone 2 can prepare for an emergency by selecting the detailed measurement report process, for example, in a case in which the remaining battery is less.

For example, the drone 2 may select the measurement report process to be performed on the basis of the positional information. Specifically, the drone 2 may select the first measurement report process in a case in which the position of the drone 2 is within a predetermined area, and may select the second measurement report process in a case in which the position of the drone 2 is not within the predetermined area. Thus, for example, in a case in which the drone 2 approaches a flight prohibition area, the drone 2 can select the more detailed measurement report process so that the drone 2 does not invade the flight prohibition area.

For example, the drone 2 may select the measurement report process to be performed on the basis of the flight-related information. Specifically, the drone 2 may select the first measurement report process in a case in which the drone 2 is flying, and may select the second measurement report process in a case in which the drone 2 is stopping. Thus, for example, in the case in which the drone 2 is flying, the drone 2 is in a higher risk than in the case in which the drone 2 is stopping. Therefore, the more detailed measurement report process can be selected. Further, the drone 2 may select the first measurement report process in a case in which the drone 2 performs a flight by manual maneuvering, and may select the second measurement report process in a case in which the drone 2 performs a flight by automatic maneuvering. Thus, for example, in a case in which the drone 2 performs the flight by the automatic maneuvering, the drone 2 is in a higher risk than in the case in which the drone 2 performs the flight by manual maneuvering. Therefore, the more detailed measurement report process can be selected.

Note that the switching threshold may be set on the basis of at least an instruction from the base station device 1. For example, the base station device 1 may transmit the setting information indicating the switching threshold to be set to the drone 2. Further, the base station device 1 may transmit the parameter for deciding the switching threshold to be set to the drone 2 and the drone 2 may set the switching threshold on the basis of the parameter.

(2) Selection Entity

Drone 2 Serving as Entity

The measurement report process may be selected by the drone 2 serving as an entity. That is, the drone 2 (for example, the measurement report control unit 2013) may select the measurement report process to be performed. Specifically, the drone 2 selects the measurement report process to be performed on the basis of the flight-related information from the plurality of measurement report processes of the selection candidates spontaneously (that is, autonomously) on the basis of the selection standard. In this case, the drone 2 causes the base station device 1 to recognize the selection (that is, the switching) of the measurement report process. Various methods of causing the base station device 1 to recognize the selection are considered.

For example, the drone 2 may notify the base station device 1 of information regarding the selection of the measurement report process. The information regarding the selection of the measurement report process can include, for example, information indicating the selected measurement report process, information indicating a timing of the switching, and the like. The information regarding the selection of the measurement report process can also be ascertained as information regarding switching control of the measurement report process. The information regarding the selection of the measurement report process may be notified of dynamically using a physical channel or a physical signal or may be notified quasi-statically using RRC signaling or an MAC signaling. Further, the information may be notified periodically or aperiodically. For example, the drone 2 can notify the base station device 1 of the information regarding the selection of the measurement report process on the basis of a timing at which the measurement report process is switched. Further, the drone 2 can include the information regarding the selection of the measurement report process in the measurement information to notify of the information regarding the selection of the measurement report process.

For example, the drone 2 may notify the base station device 1 of information regarding a selection result of the measurement report process explicitly, as described above, or implicitly. In a case in which the drone 2 notifies the base station device 1 of the information implicitly, the base station device 1 may recognize the selected measurement report process, for example, by identifying which measurement report process is used to generate the measurement information reported from the drone 2 among the plurality of measurement report processes of the selection candidates.

Hereinafter, an example of a flow of a process in a case in which the drone 2 serves as an entity and selects the measurement report process will be described.

Figure 25:
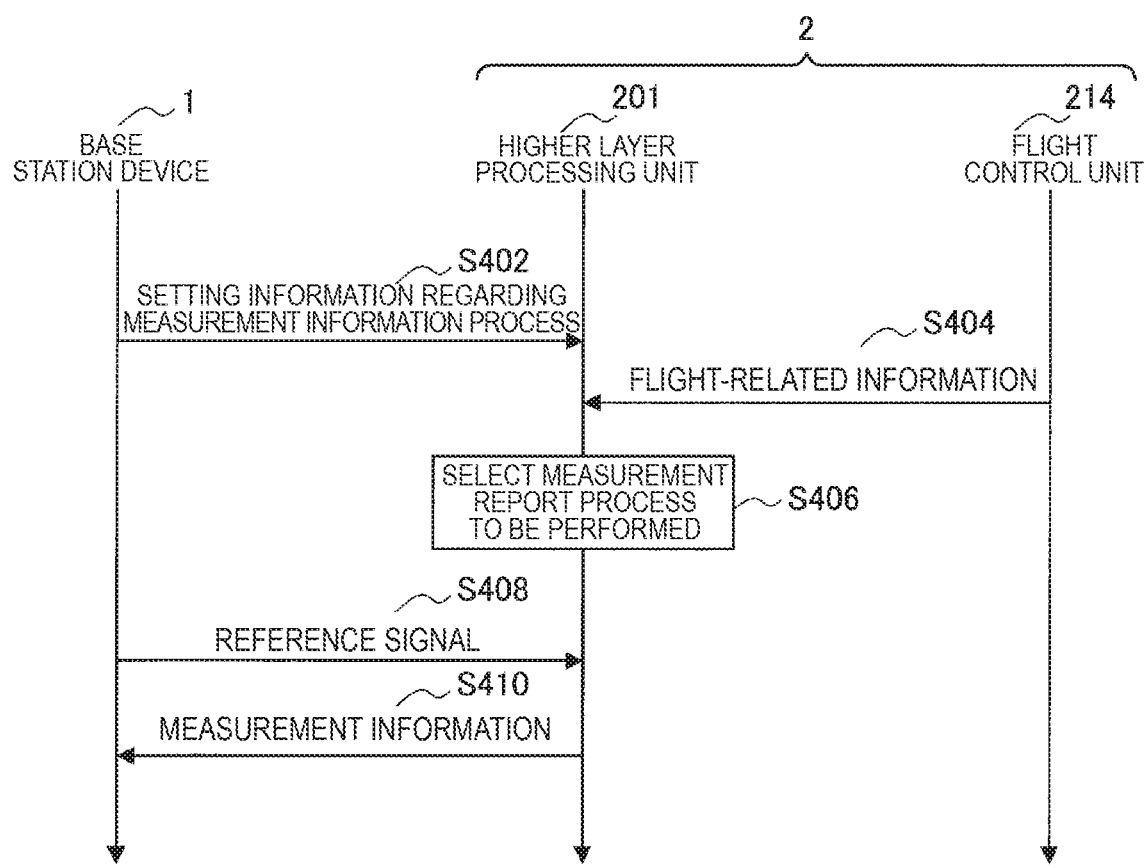
FIG. 25 is a sequence diagram illustrating an example of a flow of a measurement report process performed in the system according to the present embodiment.

FIG. 25 is a sequence diagram illustrating an example of the flow of the measurement report process performed in the system according to the present embodiment. The base station device 1 and the drone 2 are involved in this sequence. Note that in FIG. 25, the higher layer processing unit 201 and the flight control unit 214 are separately illustrated to clarify exchange of information in the drone 2. Note that a process performed by the higher layer processing unit 201 can include not only a process related to a higher layer but also a process of a physical layer.

As illustrated in FIG. 25, the base station device 1 first transmits the setting information regarding the measurement report process to the drone 2 (step S402). Note that the setting information regarding the measurement report process can include setting information of a threshold related to the selection of the measurement report process (that is, a switching threshold). Subsequently, the higher layer processing unit 201 of the drone 2 acquires the flight-related information from the flight control unit 214 of the drone 2 (step S404). Then, the higher layer processing unit 201 of the drone 2 selects the measurement report process to be performed on the basis of the flight-related information (step S406). On the other hand, the base station device 1 transmits the reference signal to the drone 2 (step S408). Subsequently, the drone 2 performs the selected measurement report process and transmits the measurement information to the base station device 1 (step S410). Note that the drone 2 may transmit the information regarding the selection of the measurement report process to the base station device 1 before, after, or simultaneously with the transmission of the measurement information.

Base Station Device 1 Serving as Entity

The measurement report process may be selected by the base station device 1 serving as an entity. In this case, the base station device 1 (for example, the communication control unit 1013) generates the setting information regarding the measurement report process on the basis of the flight-related information received from the drone 2 and notifies the drone 2 of the setting information. In particular, the setting information relates to the selection of the measurement report process to be performed. Specifically, the base station device 1 selects the measurement report process to be caused to be performed by the drone 2 on the basis of the flight-related information received from the drone 2 among the plurality of measurement report processes of the selection candidates on the basis of the selection standard. Then, the base station device 1 notifies the drone 2 of the information regarding the selection of the measurement report process.

The drone 2 (for example, the measurement report control unit 2013) performs the measurement report process selected by the base station device 1. Specifically, the drone 2 performs the measurement report process selected by the base station device 1 on the basis of the information regarding the selection of the measurement report process notified of from the base station device 1.

Hereinafter, an example of a flow of a process in a case in which the measurement report process is selected by the base station device 1 serving as an entity will be described.

Figure 26:
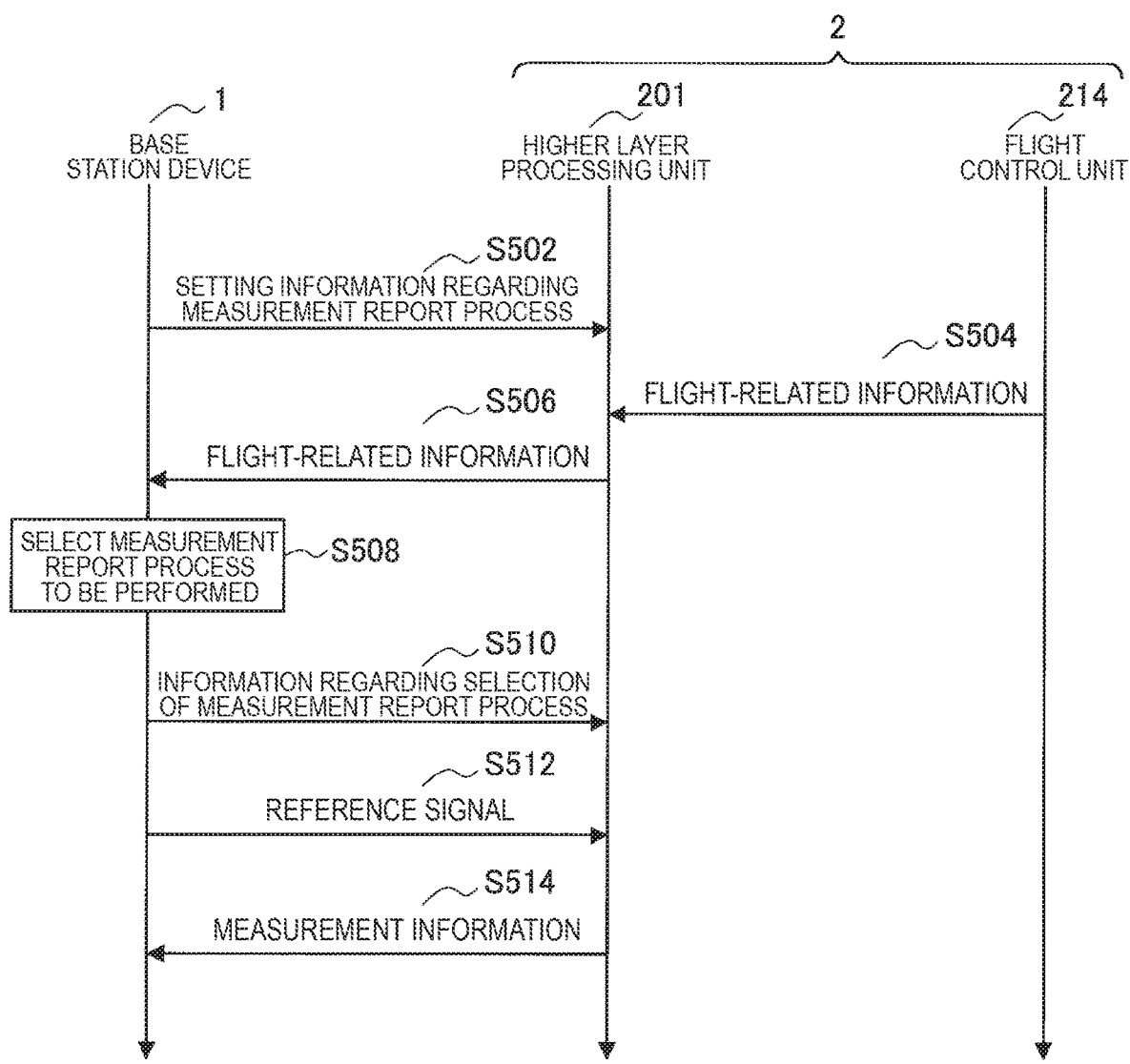
FIG. 26 is a sequence diagram illustrating an example of a flow of a measurement report process performed in the system according to the present embodiment.

FIG. 26 is a sequence diagram illustrating an example of the flow of the measurement report process performed in the system according to the present embodiment. The base station device 1 and the drone 2 are involved in this sequence. Note that in FIG. 26, the higher layer processing unit 201 and the flight control unit 214 are separately illustrated to clarify exchange of information in the drone 2. Note that a process performed by the higher layer processing unit 201 can include not only a process related to a higher layer but also a process of a physical layer.

As illustrated in FIG. 26, the base station device 1 first transmits the setting information regarding the measurement report process to the drone 2 (step S502). Subsequently, the higher layer processing unit 201 of the drone 2 acquires the flight-related information from the flight control unit 214 of the drone 2 (step S504). Subsequently, the drone 2 transmits the flight-related information to the base station device 1 (step S506). Then, the base station device 1 selects the measurement report process to be caused to be performed by the drone 2 on the basis of the received flight-related information (step S508). Subsequently, the base station device 1 transmits the information regarding the selection of the measurement report process to the drone 2 (step S510). Subsequently, the base station device 1 transmits the reference signal to the drone 2 (step S512). Subsequently, the drone 2 performs the measurement report process selected by the base station device 1 on the basis of the information regarding the selection of the measurement report process and transmits the measurement information to the base station device 1 (S514).

(3) Content of Measurement Report Processes of Selection Candidates

Next, content of the measurement report processes of the selection candidates will be described specifically.

For example, in the plurality of measurement report processes of the selection candidates, a reference signal of the measurement target is mutually different. That is, the drone 2 may select the reference signal of the measurement target from reference signals of selection candidates on the basis of the flight-related information. For example, the reference signals of the selection candidates may include a reference signal specific to a cell and a reference signal specific to the terminal device (that is, the drone 2). Further, the reference signals of the selection candidates may include reference signals in which a transmission period or a transmission density is different. Further, the reference signals of the selection candidates may include a reference signal transmitted periodically and a reference signal transmitted aperiodically. The drone 2 can control measurement precision and an overhead by the reference signal by selecting the reference signal of the measurement target.

For example, in the plurality of measurement report processes of the selection candidates, a type of measurement information to be reported may be mutually different. That is, the drone 2 may select the type of measurement information to be reported from the types of measurement information of the selection candidates on the basis of the flight-related information. For example, the types of measurement information of the selection candidates may include at least any of the RRM information. Further, the types of measurement information of the selection candidates may include at least any of the CSI information. The base station device 1 can receive a report of an optimum type of measurement information in accordance with a state or a situation of the drone 2 when the drone 2 selects the type of measurement information to be reported.

For example, in the plurality of measurement report processes of the selection candidates, required quality of measurement information to be reported may be mutually different. That is, the drone 2 may select the required quality of the measurement information to be reported from required quality of the selection candidates on the basis of the flight-related information. For example, the required quality of the selection candidates may include a candidate for quality serving as a standard of decision of an encoding method, a candidate for quality serving as a standard of decision of an encoding ratio, a candidate for a required error ratio, and a candidate for reception quality. Further, the required quality of the selection candidates may include a candidate for a required error ratio for a downlink channel which is a CSI measurement target. Note that a value of the CQI, the PMI, the RI, and/or the CRI to be reported as a result is changed by selecting the different required quality. The base station device 1 can receive a report of the measurement information corresponding to the optimum required quality in accordance with a state or a situation of the drone 2 when the drone 2 selects the required quality of the measurement information to be reported.

For example, in the plurality of measurement report processes of the selection candidates, a report method may be mutually different. That is, the drone 2 may select the report method to be used to report the measurement information from report methods of the selection candidates. Hereinafter, the report methods of the selection candidates will be described.

In each of the report methods of the selection candidates, a report mode of the measurement information may be different. That is, the drone 2 may select the report mode to be used to report the measurement information from the plurality of candidates for the report mode on the basis of the flight-related information. The candidates for the report mode may include a mode in which a wideband is reported, a mode in which a terminal selection type of sub band is reported, a mode in which a sub band set with signaling of a higher layer by the base station device 1 is reported, a mode in which predetermined information is not reported, a mode in which one piece of predetermined information is reported, a mode in which a plurality of pieces of predetermined information are reported, and a combination of these modes. The base station device 1 can receive the report of the measurement information in an optimum report mode in accordance with a state or a situation of the drone 2 when the drone 2 selects the report mode.

In each of the report methods of the selection candidates, a report period of the measurement information may be different. That is, the drone 2 may select a period at which the measurement information is reported from a plurality of candidates for the period on the basis of the flight-related information. The base station device 1 can receive the report of the measurement information in an optimum period in accordance with a state or a situation of the drone 2 when the drone 2 selects the report period.

In each of the report methods of the selection candidates, whether the report of the measurement information is periodic or aperiodic may be different. That is, the drone 2 may select whether to perform periodic report or aperiodic report on the basis of the flight-related information. In the periodic report method, the drone 2 sequentially transmits some of the predetermined information (for example, the measurement information) at a period set by the base station device 1. In the periodic report method, the PUCCH is used for the report. On the other hand, in the aperiodic report method, the drone 2 collectively transmits all of the predetermined information (for example, the measurement information) at a timing notified of by the base station device 1. In the aperiodic report method, the PUSCH is used for the report. For example, in a case in which the drone 2 is flying at a low altitude and performs wireless communication using radio waves oriented downward from the base station device 1, the drone 2 performs the periodic report. In a case in which the drone 2 is flying at a high altitude and performs wireless communication using a beam formed individually from the base station device 1, the drone 2 performs the aperiodic report. Further, for example, in a case in which the drone 2 is stopping on the ground and performs wireless communication using radio waves oriented downward from the base station device 1, the drone 2 performs the aperiodic report. In a case in which the drone 2 is flying at a high altitude and performs wireless communication using a beam formed individually from the base station device 1, the drone 2 performs the periodic report. The base station device 1 can receive the report of the measurement information using an optimum method in accordance with a state or a situation of the drone 2 when the drone 2 selects the periodic report or the aperiodic report.

In each of the report methods of the selection candidates, an uplink channel to be used to report the measurement information may be different. That is, the drone 2 may select an uplink channel to be used to report the measurement information from uplink channels of selection candidates on the basis of the flight-related information. For example, the uplink channels of the selection candidates may include the PUCCH and the PUSCH.

In each of the report methods of the selection candidates, required quality of the uplink channel to be used to report the measurement information may be different. That is, the drone 2 may select the required quality of the uplink channel to be used to report the measurement information from the required quality of selection candidates on the basis of the flight-related information. For example, the required quality of the selection candidates may include a candidate for quality serving as a standard of decision of an encoding method for the uplink channel to be used to report the measurement information, a candidate for quality serving a standard of decision of an encoding ratio, a candidate for a required error ratio, and a candidate for reception quality. The base station device 1 can receive a report of the measurement information corresponding to the optimum required quality in accordance with a state or a situation of the drone 2 when the drone 2 selects the required quality of the uplink channel to be used to report the measurement information.

4.5. Supplement (1) Flight-Related Information

As described above, the flight-related information is transmitted (or reported or notified) from the drone 2 to the base station device 1 in some cases. The base station device 1 can control the drone 2 which is a transmission source on the basis of the flight-related information received from the drone 2.

Hereinafter, a method of transmitting the flight-related information will be described in detail.

The flight-related information may be transmitted as information regarding the RRC layer, the MAC layer, and/or the PHY layer.

The flight-related information can be transmitted at any of various opportunities. For example, the drone 2 may transmit the flight-related information in response to a request from the base station device 1. For example, the drone 2 may sequentially transmit the flight-related information at a period set by the base station device 1. For example, the drone 2 may transmit the flight-related information in a case in which a predetermined condition is satisfied. Here, the predetermined condition may be given by a timer set by the base station device 1. In this case, the drone 2 transmits the flight-related information in a case in which the timer expires.

The flight-related information may be transmitted as the CSI. For example, the flight-related information is used to generate the CRI, the RI, the PMI, and/or the CQI. In other words, the CRI, the RI, the PMI, and/or the CQI is generated on the basis of at least the flight-related information. Additionally, the flight-related information may be transmitted as the CSI which is newly defined.

The flight-related information may be transmitted as uplink control information (UCI) which is transmitted with the PUCCH. For example, the flight-related information is used to generate the CSI, a scheduling request (SR), and/or an HARQ-ACK. In other words, the CSI, the SR, and/or the HARQ-ACK is generated on the basis of at least the flight-related information. Additionally, the flight-related information may be transmitted as the UCI which is newly defined.

(2) Capacity Information

The drone 2 may transmit (or report or notify) information indicating an ability of the drone 2 to the base station device 1. In this case, the base station device 1 can control the drone 2 which is a transmission source on the basis of the information indicating the ability of the drone 2. The information indicating the ability of the drone 2 is referred to as terminal ability information or capability information below. The capability information includes information indicating an ability (that is, a function, a feature, and/or a technique) supported by the drone 2.

The UE capability information can include information indicating whether the terminal device 2 including a drone has an ability to fly. In a case in which the capability information indicates that the terminal device 2 has the ability to fly, it is recognized that the terminal device 2 is a drone. Further, the capability information can include information indicating a drone category indicating which drone the terminal device 2 is.

The capability information can include information regarding a function related to the measurement report process and/or a function of a process based on the flight-related information. For example, the capability information can include information regarding a battery such as a capacity, information regarding an altitude such as a highest altitude, information regarding support of a measurement method in accordance with an altitude, information regarding a speed such as a maximum speed, and information regarding sensor precision such as precision of positional information.

The capability information can include information indicating a function related to support of ultra reliable low latency communication (URLLC). For example, the capability information can include information indicating a function related to support of data transmission (for example, short TTI) of low latency, a function related to support of a predetermined sub carrier interval (for example, a sub carrier interval greater than 15 kHz), and/or a function of simultaneously connecting a plurality of links (for example, beams or component carriers).

5. APPLICATION EXAMPLES

The technology according to the present disclosure can be applied to various products. For example, the base station device 1 may be realized as any type of evolved Node B (eNB) such as a macro eNB or a small eNB. The small eNB may be an eNB that covers a cell, such as a pico eNB, a micro eNB, or a home (femto) eNB, smaller than a macro cell. Instead, the base station device 1 may be realized as another type of base station such as a NodeB or a base transceiver station (BTS). The base station device 1 may include a main entity (also referred to as a base station device) that controls wireless communication and one or more remote radio heads (RRHs) disposed at different locations from the main entity. Further, various types of terminals to be described below may operate as the base station device 1 by performing a base station function temporarily or semi-permanently.

<5.1. Application Examples for Base Station>

First Application Example

Figure 27:
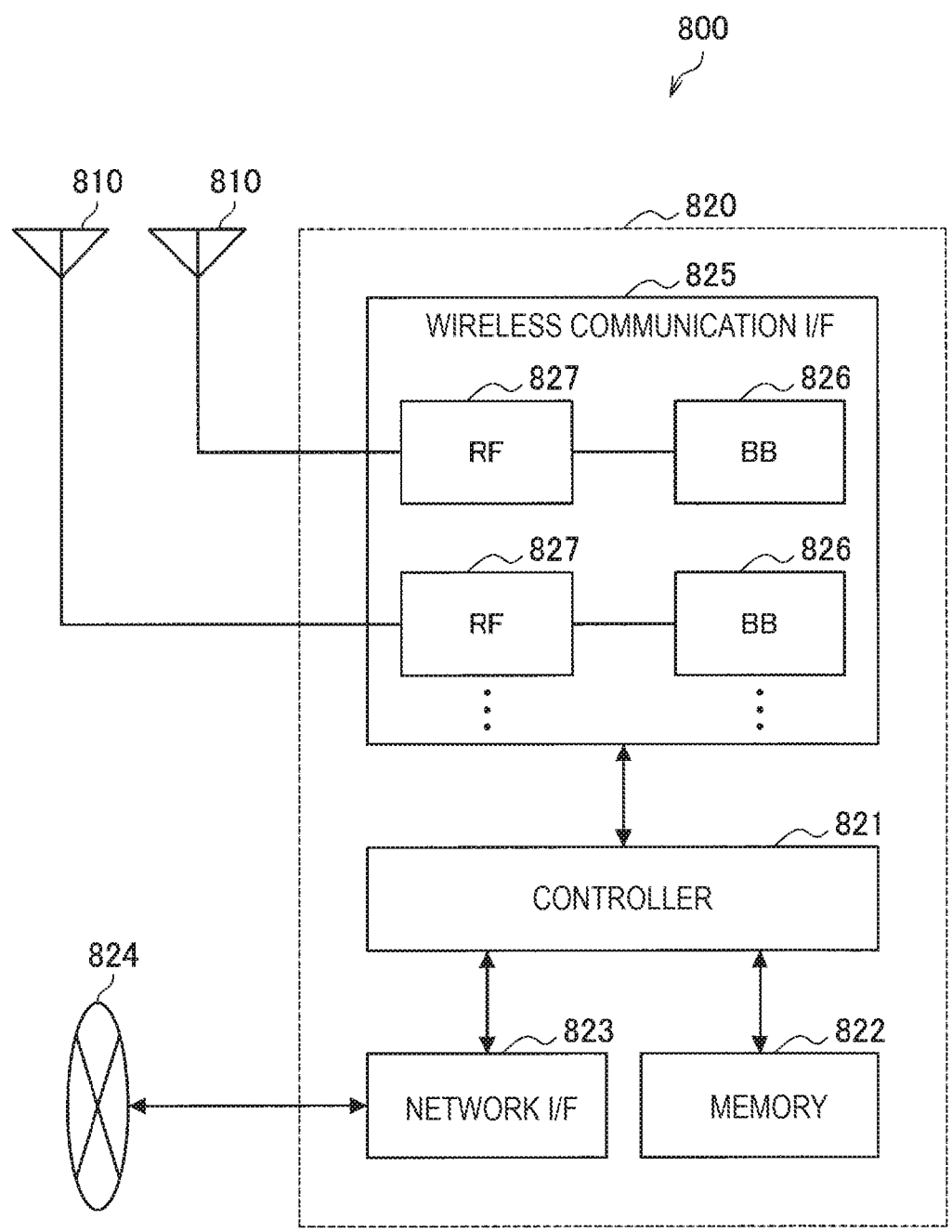
FIG. 27 is a block diagram illustrating a first example of a schematic configuration of an eNB.

FIG. 27 is a block diagram illustrating a first example of a schematic configuration of an eNB to which the technology according to the present disclosure may be applied. An eNB 800 includes one or more antennas 810 and a base station apparatus 820. Each antenna 810 and the base station apparatus 820 may be connected to each other via an RF cable.

Each of the antennas 810 includes a single or a plurality of antenna elements (e.g., a plurality of antenna elements constituting a MIMO antenna) and is used for the base station apparatus 820 to transmit and receive a wireless signal. The eNB 800 may include the plurality of the antennas 810 as illustrated in FIG. 27, and the plurality of antennas 810 may, for example, correspond to a plurality of frequency bands used by the eNB 800. It should be noted that while FIG. 27 illustrates an example in which the eNB 800 includes the plurality of antennas 810, the eNB 800 may include the single antenna 810.

The base station apparatus 820 includes a controller 821, a memory 822, a network interface 823, and a wireless communication interface 825.

The controller 821 may be, for example, a CPU or a DSP, and operates various functions of an upper layer of the base station apparatus 820. For example, the controller 821 generates a data packet from data in a signal processed by the wireless communication interface 825, and transfers the generated packet via the network interface 823. The controller 821 may generate a bundled packet by bundling data from a plurality of base band processors to transfer the generated bundled packet. Further, the controller 821 may also have a logical function of performing control such as radio resource control, radio bearer control, mobility management, admission control, and scheduling. Further, the control may be performed in cooperation with a surrounding eNB or a core network node. The memory 822 includes a RAM and a ROM, and stores a program executed by the controller 821 and a variety of control data (such as, for example, terminal list, transmission power data, and scheduling data).

The network interface 823 is a communication interface for connecting the base station apparatus 820 to the core network 824. The controller 821 may communicate with a core network node or another eNB via the network interface 823. In this case, the eNB 800 may be connected to a core network node or another eNB through a logical interface (e.g., S1 interface or X2 interface). The network interface 823 may be a wired communication interface or a wireless communication interface for wireless backhaul. In the case where the network interface 823 is a wireless communication interface, the network interface 823 may use a higher frequency band for wireless communication than a frequency band used by the wireless communication interface 825.

The wireless communication interface 825 supports a cellular communication system such as long term evolution (LTE) or LTE-Advanced, and provides wireless connection to a terminal located within the cell of the eNB 800 via the antenna 810. The wireless communication interface 825 may typically include a base band (BB) processor 826, an RF circuit 827, and the like. The BB processor 826 may, for example, perform encoding/decoding, modulation/demodulation, multiplexing/demultiplexing, and the like, and performs a variety of signal processing on each layer (e.g., L1, medium access control (MAC), radio link control (RLC), and packet data convergence protocol (PDCP)). The BB processor 826 may have part or all of the logical functions as described above instead of the controller 821. The BB processor 826 may be a module including a memory having a communication control program stored therein, a processor to execute the program, and a related circuit, and the function of the BB processor 826 may be changeable by updating the program. Further, the module may be a card or blade to be inserted into a slot of the base station apparatus 820, or a chip mounted on the card or the blade. Meanwhile, the RF circuit 827 may include a mixer, a filter, an amplifier, and the like, and transmits and receives a wireless signal via the antenna 810.

The wireless communication interface 825 may include a plurality of the BB processors 826 as illustrated in FIG. 27, and the plurality of BB processors 826 may, for example, correspond to a plurality of frequency bands used by the eNB 800. Further, the wireless communication interface 825 may also include a plurality of the RF circuits 827, as illustrated in FIG. 27, and the plurality of RF circuits 827 may, for example, correspond to a plurality of antenna elements. Note that FIG. 27 illustrates an example in which the wireless communication interface 825 includes the plurality of BB processors 826 and the plurality of RF circuits 827, but the wireless communication interface 825 may include the single BB processor 826 or the single RF circuit 827.

In the eNB 800 illustrated in FIG. 27, one or more constituent elements (for example, the reference signal transmitting unit 1011 and/or the communication control unit 1013 illustrated in FIG. 18) included in the higher layer processing unit 101 or the control unit 103 described with reference to FIG. 8 may be implemented in the wireless communication interface 825. Alternatively, at least some of the constituent elements may be implemented in the controller 821. As one example, a module including a part or the whole of (for example, the BB processor 826) of the wireless communication interface 825 and/or the controller 821 may be implemented on the eNB 800. The one or more constituent elements in the module may be implemented in the module. In this case, the module may store a program causing a processor to function as the one or more constituent elements (in other words, a program causing the processor to execute operations of the one or more constituent elements) and execute the program. As another example, a program causing the processor to function as the one or more constituent elements may be installed in the eNB 800, and the wireless communication interface 825 (for example, the BB processor 826) and/or the controller 821 may execute the program. In this way, the eNB 800, the base station device 820, or the module may be provided as a device including the one or more constituent elements and a program causing the processor to function as the one or more constituent elements may be provided. In addition, a readable recording medium on which the program is recorded may be provided.

Further, in the eNB 800 illustrated in FIG. 27, the receiving unit 105 and the transmitting unit 107 described with reference to FIG. 8 may be implemented in the wireless communication interface 825 (for example, the RF circuit 827). Further, the transceiving antenna 109 may be implemented in the antenna 810.

Second Application Example

Figure 28:
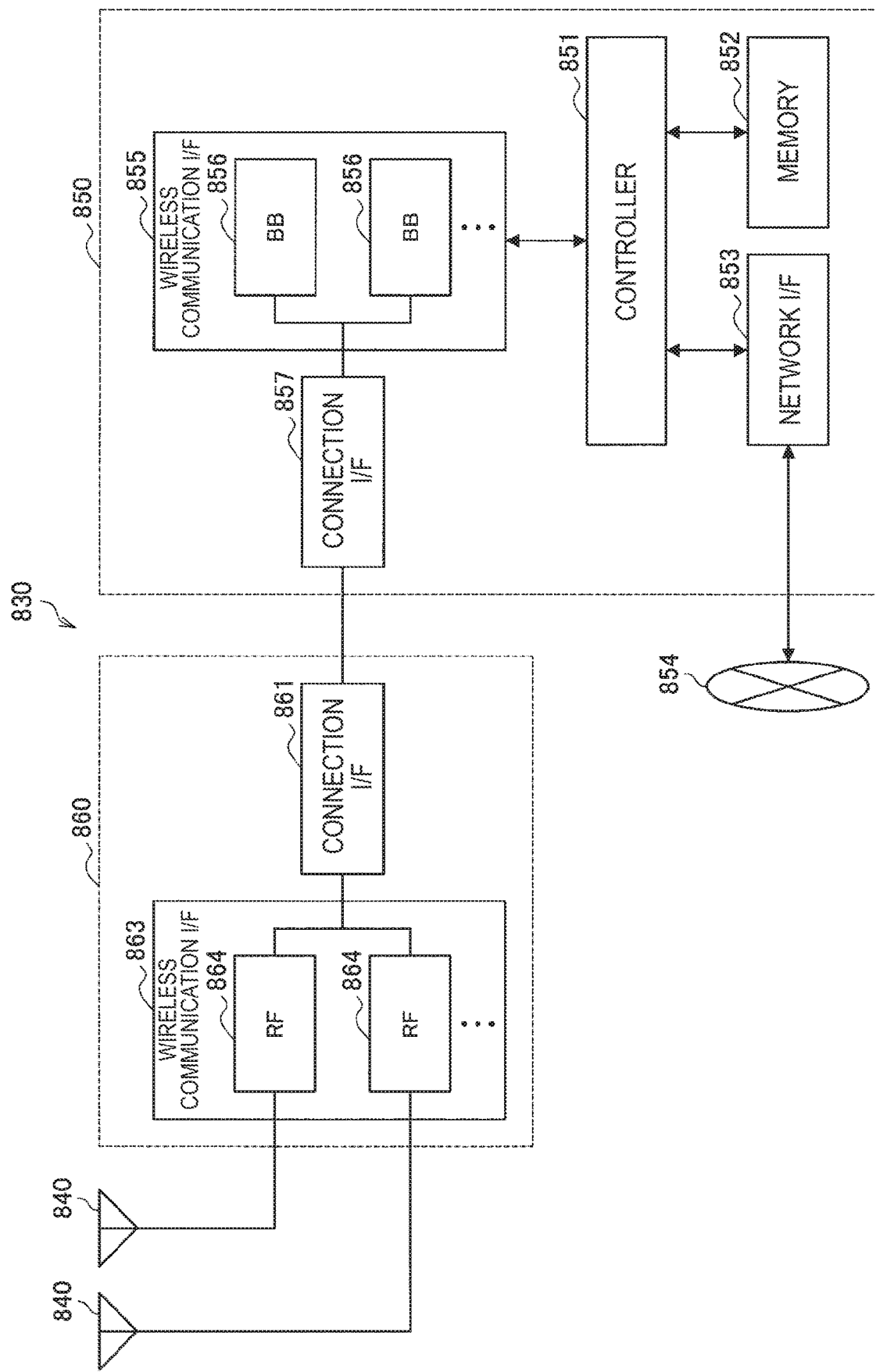
FIG. 28 is a block diagram illustrating a second example of the schematic configuration of the eNB.

FIG. 28 is a block diagram illustrating a second example of a schematic configuration of an eNB to which the technology according to the present disclosure may be applied. An eNB 830 includes one or more antennas 840, a base station apparatus 850, and an RRH 860. Each of the antennas 840 and the RRH 860 may be connected to each other via an RF cable. Further, the base station apparatus 850 and the RRH 860 may be connected to each other by a high speed line such as optical fiber cables.

Each of the antennas 840 includes a single or a plurality of antenna elements (e.g., antenna elements constituting a MIMO antenna), and is used for the RRH 860 to transmit and receive a wireless signal. The eNB 830 may include a plurality of the antennas 840 as illustrated in FIG. 28, and the plurality of antennas 840 may, for example, correspond to a plurality of frequency bands used by the eNB 830. Note that FIG. 28 illustrates an example in which the eNB 830 includes the plurality of antennas 840, but the eNB 830 may include the single antenna 840.

The base station apparatus 850 includes a controller 851, a memory 852, a network interface 853, a wireless communication interface 855, and a connection interface 857. The controller 851, the memory 852, and the network interface 853 are similar to the controller 821, the memory 822, and the network interface 823 described with reference to FIG. 27.

The wireless communication interface 855 supports a cellular communication system such as LTE and LTE-Advanced, and provides wireless connection to a terminal located in a sector corresponding to the RRH 860 via the RRH 860 and the antenna 840. The wireless communication interface 855 may typically include a BB processor 856 or the like. The BB processor 856 is similar to the BB processor 826 described with reference to FIG. 27 except that the BB processor 856 is connected to an RF circuit 864 of the RRH 860 via the connection interface 857. The wireless communication interface 855 may include a plurality of the BB processors 856, as illustrated in FIG. 28, and the plurality of BB processors 856 may, for example, correspond to a plurality of frequency bands used by the eNB 830. Note that FIG. 28 illustrates an example in which the wireless communication interface 855 includes the plurality of BB processors 856, but the wireless communication interface 855 may include the single BB processor 856.

The connection interface 857 is an interface for connecting the base station apparatus 850 (wireless communication interface 855) to the RRH 860. The connection interface 857 may be a communication module for communication on the high speed line which connects the base station apparatus 850 (wireless communication interface 855) to the RRH 860.

Further, the RRH 860 includes a connection interface 861 and a wireless communication interface 863.

The connection interface 861 is an interface for connecting the RRH 860 (wireless communication interface 863) to the base station apparatus 850. The connection interface 861 may be a communication module for communication on the high speed line.

The wireless communication interface 863 transmits and receives a wireless signal via the antenna 840. The wireless communication interface 863 may typically include the RF circuit 864 or the like. The RF circuit 864 may include a mixer, a filter, an amplifier and the like, and transmits and receives a wireless signal via the antenna 840. The wireless communication interface 863 may include a plurality of the RF circuits 864 as illustrated in FIG. 28, and the plurality of RF circuits 864 may, for example, correspond to a plurality of antenna elements. Note that FIG. 28 illustrates an example in which the wireless communication interface 863 includes the plurality of RF circuits 864, but the wireless communication interface 863 may include the single RF circuit 864.

In the eNB 830 illustrated in FIG. 28, one or more constituent elements (for example, the reference signal transmitting unit 1011 and/or the communication control unit 1013 illustrated in FIG. 18) included in the higher layer processing unit 101 or the control unit 103 described with reference to FIG. 8 may be implemented in the wireless communication interface 855 and/or the wireless communication interface 863. Alternatively, at least some of the constituent elements may be implemented in the controller 851. As one example, a module including a part or the whole of (for example, the BB processor 856) of the wireless communication interface 825 and/or the controller 851 may be implemented on the eNB 830. The one or more constituent elements in the module may be implemented in the module. In this case, the module may store a program causing a processor to function as the one or more constituent elements (in other words, a program causing the processor to execute operations of the one or more constituent elements) and execute the program. As another example, a program causing the processor to function as the one or more constituent elements may be installed in the eNB 830, and the wireless communication interface 855 (for example, the BB processor 856) and/or the controller 851 may execute the program. In this way, the eNB 830, the base station device 850, or the module may be provided as a device including the one or more constituent elements and a program causing the processor to function as the one or more constituent elements may be provided. In addition, a readable recording medium on which the program is recorded may be provided.

Further, in the eNB 830 illustrated in FIG. 28, for example, the receiving unit 105 and the transmitting unit 107 described with reference to FIG. 8 may be implemented in the wireless communication interface 863 (for example, the RF circuit 864). Further, the transceiving antenna 109 may be implemented in the antenna 840.

6. CONCLUSION

The embodiment of the present disclosure has been described above in detail with reference to FIGS. 1 to 28. As described above, the drone 2 according to the embodiment acquires the flight-related information and controls the measurement report process on the reference signal transmitted from the base station device 1 on the basis of the acquired flight-related information. Since the drone 2 controls the measurement report process on the basis of the flight-related information, the base station device 1 can control the radio resources for communication with the drone 2 on the basis of the measurement information reported in accordance with the flight-related information. Thus, the base station device 1 can provide an appropriate wireless communication service to the drone 2 which flies freely in 3-dimensional space. Thus, it is possible to considerably cause transmission efficiency of the whole system to be improved and it is possible to cause the ability of the drone 2 to be exhibited at the maximum.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

For example, the first embodiment and the second embodiment may be combined.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

(1)

A circuit including:

an acquisition unit configured to acquire information regarding a flight; and a measurement report control unit configured to control a measurement report process on a reference signal transmitted from a base station device, on a basis of the information regarding the flight acquired by the acquisition unit.

(2)

The circuit according to (1), in which the information regarding the flight includes altitude information regarding the flight.

(3)

The circuit according to (1) or (2), in which the information regarding the flight includes battery information regarding the flight.

(4)

The circuit according to any one of (1) to (3), in which the information regarding the flight includes positional information regarding the flight.

(5)

The circuit according to any one of (1) to (4), in which the information regarding the flight includes state information regarding the flight.

(6)

The circuit according to any one of (1) to (5), in which measurement information regarding the reference signal reported in the measurement report process includes information for radio resource management.

(7)

The circuit according to any one of (1) to (6), in which measurement information regarding the reference signal reported in the measurement report process includes channel state information.

(8)

The circuit according to any one of (1) to (7), in which measurement information regarding the reference signal reported in the measurement report process is reported using a predetermined uplink channel.

(9)

The circuit according to (8), in which the predetermined uplink channel is one uplink channel allocated by the base station device.

(10)

The circuit according to (8), in which the predetermined uplink channel is a plurality of uplink channels periodically allocated by the base station device.

(11)

The circuit according to (8), in which the predetermined uplink channel is an uplink channel selected by the measurement report control unit from a resource pool allocated by the base station device.

(12)

The circuit according to any one of (1) to (11), in which the measurement report control unit controls whether or not measurement information is reported to the base station device on a basis of a comparison result of a threshold and a value based on predetermined information.

(13)

The circuit according to (12), in which the predetermined information is information regarding the flight.

(14)

The circuit according to (13), in which the threshold is set on a basis of an instruction from the base station device.

(15)

The circuit according to (12), in which the predetermined information is measurement information regarding the reference signal.

(16)

The circuit according to (15), in which the threshold is set on a basis of information regarding the flight.

(17)

The circuit according to any one of (1) to (16), in which the measurement report control unit performs a measurement report process selected from a plurality of measurement report processes that are selection candidates, on a basis of the information regarding the flight.

(18)

The circuit according to (17), in which, in the plurality of measurement report processes of the selection candidates, the reference signal of a measurement target is mutually different.

(19)

The circuit according to (17) or (18), in which, in the plurality of measurement report processes of the selection candidates, a type of measurement information to be reported is mutually different.

(20)

The circuit according to any one of (17) to (19), in which in the plurality of measurement report processes of the selection candidates, required quality of measurement information to be reported is mutually different.

(21)

The circuit according to any one of (17) to (20), in which, in the plurality of measurement report processes of the selection candidates, a report method is mutually different.

(22)

The circuit according to any one of (17) to (21), in which the measurement report control unit selects the measurement report process to be performed.

(23)

The circuit according to any one of (17) to (21), in which the measurement report control unit performs the measurement report process selected by the base station device.

(24)

The circuit according to any one of (1) to (23), in which the acquisition unit acquires the information regarding the flight from a flyable flight device.

(25)

The circuit according to (24), in which the circuit is connected to the flight device.

(26)

A terminal device including:

an acquisition unit configured to acquire information regarding a flight; and a measurement report control unit configured to control a measurement report process on a reference signal transmitted from a base station device, on a basis of the information regarding the flight acquired by the acquisition unit.

(27)

A base station device including:

a reference signal transmitting unit configured to transmit a reference signal; and a control unit configured to acquire information regarding a flight and control a process based on measurement information reported from a terminal device that performs a measurement report process on the reference signal on a basis of the acquired information regarding the flight.

(28)

The base station device according to (27), in which the control unit generates setting information regarding the measurement report process on a basis of the information regarding the flight received from the terminal device, and notifies the terminal device.

(29)

The base station device according to (28), in which the setting information is related to a trigger for reporting the measurement information.

(30)

The base station device according to (28) or (29), in which the control unit is related to selection of the measurement report process to be performed.

(31)

A method including:

acquiring information regarding a flight; and controlling, by a processor, a measurement report process on a reference signal transmitted from a base station device, on a basis of the acquired information regarding the flight.

(32)

A method including:

transmitting a reference signal; and acquiring information regarding a flight and controlling a process based on measurement information reported from a terminal device that performs a measurement report process on the reference signal on a basis of the acquired information regarding the flight, by a processor.

(33)

A storage medium having a program stored therein, the program causing a computer to function as:

an acquisition unit configured to acquire information regarding a flight; and a measurement report control unit configured to control a measurement report process on a reference signal transmitted from a base station device, on a basis of the information regarding the flight acquired by the acquisition unit.

(34)

A storage medium having a program stored therein, the program causing a computer to function as:

a reference signal transmitting unit configured to transmit a reference signal; and a control unit configured to acquire information regarding a flight and control a process based on measurement information reported from a terminal device that performs a measurement report process on the reference signal on a basis of the acquired information regarding the flight.

REFERENCE SIGNS LIST

1 base station device
101 higher layer processing unit
1011 reference signal transmitting unit
1013 communication control unit
103 control unit
105 receiving unit
1051 decoding unit
1053 demodulating unit
1055 demultiplexing unit
1057 wireless receiving unit
1059 channel measuring unit
107 transmitting unit
1071 encoding unit
1073 modulating unit
1075 multiplexing unit
1077 wireless transmitting unit
1079 downlink reference signal generating unit
109 transceiving antenna
2 terminal device
201 higher layer processing unit 2011 acquisition unit
2013 measurement report control unit
203 control unit
205 receiving unit
2051 decoding unit
2053 demodulating unit
2055 demultiplexing unit
2057 wireless receiving unit
2059 channel measuring unit
207 transmitting unit
2071 encoding unit
2073 modulating unit
2075 multiplexing unit
2077 wireless transmitting unit
2079 uplink reference signal generating unit
209 transceiving antenna
210 flight device
211 driving unit
212 battery unit
213 sensor unit
214 flight control unit

The invention claimed is:

1. A processing device, comprising:
  circuitry configured to:
  acquire information regarding a flight of a flyable flight device, the information regarding the flight of the flyable flight device including at least an altitude of the flyable flight device;
  control a measurement report process on a reference signal transmitted from a base station device on a basis of the information regarding the flight acquired by the circuitry; and
  report measurement information to the base station device based on a comparison result of the altitude of the flyable flight device and a threshold,
  wherein
  the reference signal is beam-formed to target the flyable flight device and to follow movement of the flyable flight devices,
  the information regarding the flight of the flyable flight device further includes at least a highest altitude and a lowest altitude that the flyable flight device is configured to fly, remaining power in a battery of the flyable flight device, and a remaining flight time of the flyable flight device based on the remaining power in the battery of the flyable flight device,
  when the comparison result satisfies a predetermined condition, the measurement report process is performed, and
  when the comparison result does not satisfy the predetermined condition, the measurement report process is not performed.

2. The processing device according to claim 1, wherein the information regarding the flight includes positional information regarding the flight.

3. The processing device according to claim 1, wherein the information regarding the flight includes state information regarding the flight.

4. The processing device according to claim 1, wherein measurement information regarding the reference signal reported in the measurement report process includes information for radio resource management.

5. The processing device according to claim 1, wherein measurement information regarding the reference signal reported in the measurement report process includes channel state information.

6. The processing device according to claim 1, wherein measurement information regarding the reference signal reported in the measurement report process is reported using a predetermined uplink channel.

7. The processing device according to claim 1, wherein the threshold is set on a basis of an instruction from the base station device.

8. The processing device according to claim 1, wherein the circuitry performs a measurement report process selected from a plurality of measurement report processes that are selection candidates, on a basis of the information regarding the flight.

9. The processing device according to claim 1, wherein the circuitry acquires the information regarding the flight from the flyable flight device.

10. The processing device according to claim 1, wherein the information regarding the flight of the flyable flight device further includes a relative position from a site including a predetermined reference point.

11. A terminal device, comprising:
  circuitry configured to:
  acquire information regarding a flight of a flyable flight device, the information regarding the flight of the flyable flight device including at least an altitude of the flight;
  control a measurement report process on a reference signal transmitted from a base station device, on a basis of the information regarding the flight acquired by the circuitry; and
  report measurement information to the base station device based on a comparison result of the altitude of the flight and a threshold,
  wherein
  the reference signal is beam-formed to target the flyable flight device and to follow movement of the flyable flight device,
  the information regarding the flight of the flyable flight device further includes at least a highest altitude and a lowest altitude that the flyable flight device is configured to fly, remaining power in a battery of the flyable flight device, and a remaining flight time of the flyable flight device based on the remaining power in the battery of the flyable flight device,
  when the comparison result satisfies a predetermined condition, the measurement report process is performed, and
  when the comparison result does not satisfy the predetermined condition, the measurement report process is not performed.

12. A base station device, comprising:
  circuitry configured to:
  transmit a reference signal; and
  acquire information regarding a flight of a terminal device and receive measurement information reported from the terminal device that performs a measurement report process on the reference signal on a basis of the acquired information regarding the flight, the measurement information being reported to the base station device based on a comparison result of an altitude of the terminal device and a threshold, the altitude of the terminal device and a highest altitude and a lowest altitude that the terminal device is configured to fly being included in the information acquired by the circuitry,
  wherein the reference signal is beam-formed to target the terminal device and to follow movement of the terminal device, the information regarding the flight of the terminal device further includes a remaining power in a battery of the terminal device and a remaining flight time of the terminal device based on the remaining power in the battery of the terminal device, when the comparison result satisfies a predetermined condition, the measurement report process is performed, and when the comparison result does not satisfy the predetermined condition, the measurement report process is not performed.

13. The base station device according to claim 12, wherein the circuitry generates setting information regarding the measurement report process on a basis of the information regarding the flight received from the terminal device, and notifies the terminal device.

14. The base station device according to claim 13, wherein the setting information is related to a trigger for reporting the measurement information.

15. The base station device according to claim 13, wherein the circuitry selects the measurement report process to be performed.

16. A method, comprising:

acquiring information regarding a flight of a flyable flight device, the information regarding the flight of the flyable flight device including an altitude of the flyable flight device;

controlling a measurement report process on a reference signal transmitted from a base station device on a basis of the acquired information regarding the flight; and reporting measurement information to the base station device based on a comparison result of a value based on the acquired information regarding the flight and a threshold, wherein the reference signal is beam-formed to target the flyable flight device and to follow movement of the flyable flight device, the information regarding the flight of the flyable flight device further includes at least a highest altitude and a lowest altitude that the flyable flight device is configured to fly, remaining power in a battery of the flyable flight device, and a remaining flight time of the flyable flight device based on the remaining power in the battery of the flyable flight device, when the comparison result satisfies a predetermined condition, the measurement report process is performed, and when the comparison result does not satisfy the predetermined condition, the measurement report process is not performed.

\* \* \* \* \*